US012621427B2

(12) United States Patent
Lee et al.

(10) Patent No.: US 12,621,427 B2
(45) Date of Patent: May 5, 2026

(54) METHODS AND SYSTEMS FOR VISUAL FIELD TESTING USING DYNAMIC LIGHT POINT GRIDS IN VIRTUAL REALITY

(71) Applicant: Zenni Optical, Inc., Novato, CA (US)

(72) Inventors: Steven Lee, Barrington, IL (US); Julia Zhen, Novato, CA (US); ChyrSong Ting, Novato, CA (US); Matthew James Golino, Brookhaven, GA (US); Justin Paul Dempsey, Ottawa (CA); Jeffrey Joseph Fillingham, Dartmouth (CA)

(73) Assignee: Zenni Optical, Inc., Novato, CA (US)

( * ) Notice: Subject to any disclaimer, the term of this patent is extended or adjusted under 35 U.S.C. 154(b) by 0 days.

(21) Appl. No.: 18/820,146

(22) Filed: Aug. 29, 2024

(65) Prior Publication Data

US 2026/0067446 A1     Mar. 5, 2026

(51) Int. Cl.
    *H04N 13/383* (2018.01)
    *G06F 3/01* (2006.01)
    *H04N 13/327* (2018.01)
    *H04N 13/398* (2018.01)

(52) U.S. Cl.
    CPC ........... *H04N 13/383* (2018.05); *G06F 3/013* (2013.01); *H04N 13/327* (2018.05); *H04N 13/398* (2018.05)

(58) Field of Classification Search
    CPC .. H04N 13/383; H04N 13/327; H04N 13/398; G06F 3/013
    See application file for complete search history.

(56) References Cited

U.S. PATENT DOCUMENTS

| | | | |
|---|---|---|---|
| 2,352,500 A | 6/1944 | Shepard | |
| 4,861,156 A | 8/1989 | Terry | |
| 5,737,060 A | 4/1998 | Kasha, Jr. | |
| 5,767,940 A | 6/1998 | Hayashi et al. | |
| 6,592,222 B2 | 7/2003 | Massengill et al. | |
| 7,784,948 B2 | 8/2010 | Nozawa et al. | |
| 10,238,280 B2 | 3/2019 | Maeda et al. | |
| 10,610,093 B2 | 4/2020 | Green | |
| 11,426,107 B2 | 8/2022 | Gibbons et al. | |
| 11,633,097 B1 | 4/2023 | Ziff et al. | |
| 11,768,594 B2 | 9/2023 | Cameron | |

(Continued)

FOREIGN PATENT DOCUMENTS

| | | |
|---|---|---|
| CN | 2904944 Y | 5/2007 |
| CN | 109431445 A | 3/2019 |

(Continued)

*Primary Examiner* — Thai Q Tran
*Assistant Examiner* — Jose M Mesa
(74) *Attorney, Agent, or Firm* — Morgan, Lewis & Bockius LLP

(57) ABSTRACT

A virtual eye test can be performed for visual field testing using a dynamic grid of light points in a virtual reality (VR) environment. The test can be conducted using an electronic device with a head-mounted display (HMD) and a camera. The device can generate and render a VR user interface in a three-dimensional virtual environment, simulating test scenarios with a dynamic grid of light points. The device can continuously track eye movements in response to one or more visual stimuli and analyze the detection and identification of light points to assess visual detection across the visual field.

20 Claims, 62 Drawing Sheets

(56)                  References Cited

U.S. PATENT DOCUMENTS

| | | |
|---|---|---|
| 11,793,403 B2 | 10/2023 | Tran et al. |
| 12,210,149 B2 | 1/2025 | Jin et al. |
| 2019/0008441 A1 | 1/2019 | Guzik |
| 2019/0298166 A1 | 10/2019 | Smith et al. |
| 2019/0328305 A1 | 10/2019 | Wood et al. |
| 2019/0350452 A1 | 11/2019 | Lewis |
| 2020/0097076 A1* | 3/2020 | Alcaide ................... G06F 3/016 |
| 2021/0045628 A1* | 2/2021 | Bennett ................ A61B 3/0041 |
| 2021/0386285 A1* | 12/2021 | Walsh .................... A61B 3/085 |
| 2022/0125299 A1* | 4/2022 | Abou Shousha ...... A61B 3/024 |
| 2022/0354413 A1 | 11/2022 | Rah |

FOREIGN PATENT DOCUMENTS

| | | |
|---|---|---|
| GR | 1005651 B | 9/2007 |
| HU | 185600 B | 2/1985 |
| JP | H0626538 B2 | 4/1994 |
| JP | 2000079095 A | 3/2000 |
| JP | 2001275968 A | 10/2001 |
| JP | 2001286442 A | 10/2001 |
| JP | 3259920 B2 | 2/2002 |
| JP | 2002051981 A | 2/2002 |
| JP | 2003038440 A | 2/2003 |
| JP | 2003079574 A | 3/2003 |
| JP | 2012100758 A | 5/2012 |
| JP | 5007435 B2 | 8/2012 |
| WO | 1994013192 A1 | 6/1994 |
| WO | 2011022428 A2 | 2/2011 |
| WO | 2016165272 A1 | 10/2016 |
| WO | 2017070704 A2 | 4/2017 |
| WO | 2021018224 A1 | 2/2021 |
| WO | 2022111663 A1 | 6/2022 |

* cited by examiner

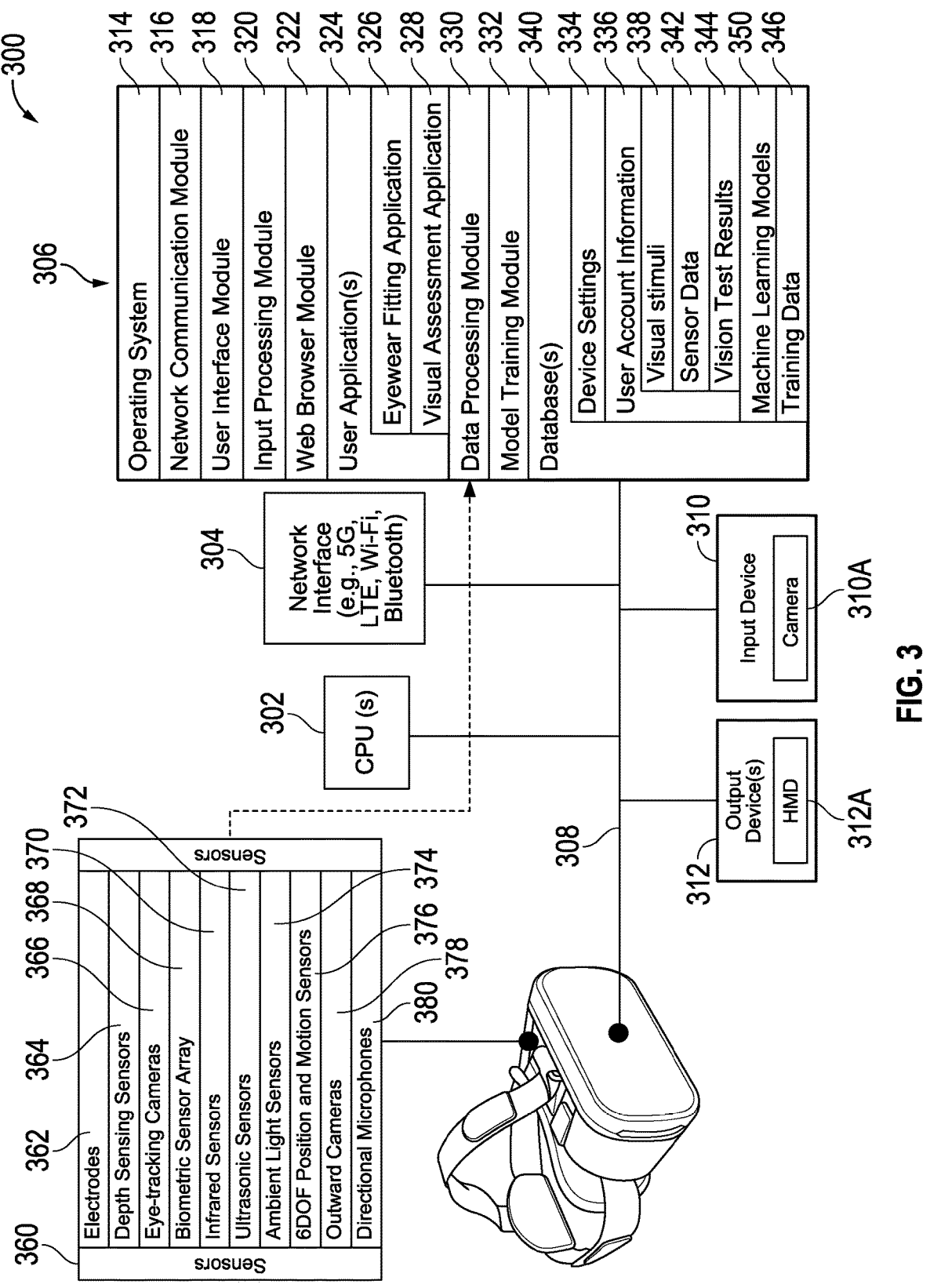

Operating System — 314
Network Communication Module — 316
User Interface Module — 318
Input Processing Module — 320
Web Browser Module — 322
User Application(s) — 324
Eyewear Fitting Application — 326
Visual Assessment Application — 328
Data Processing Module — 330
Model Training Module — 332
Database(s) — 340
Device Settings — 334
User Account Information — 336
Visual stimuli — 338
Sensor Data — 342
Vision Test Results — 344
Machine Learning Models — 350
Training Data — 346

304
Network Interface (e.g., 5G, LTE, Wi-Fi, Bluetooth)

302
CPU (s)

310
Input Device
Camera
310A

312
Output Device(s)
HMD
312A

308

360 Sensors
Electrodes — 360
Depth Sensing Sensors — 362
Eye-tracking Cameras — 364
Biometric Sensor Array — 366
Infrared Sensors — 368
Ultrasonic Sensors — 370
Ambient Light Sensors — 372
6DOF Position and Motion Sensors — 374
Outward Cameras — 376
Directional Microphones — 378

380

610

620

810

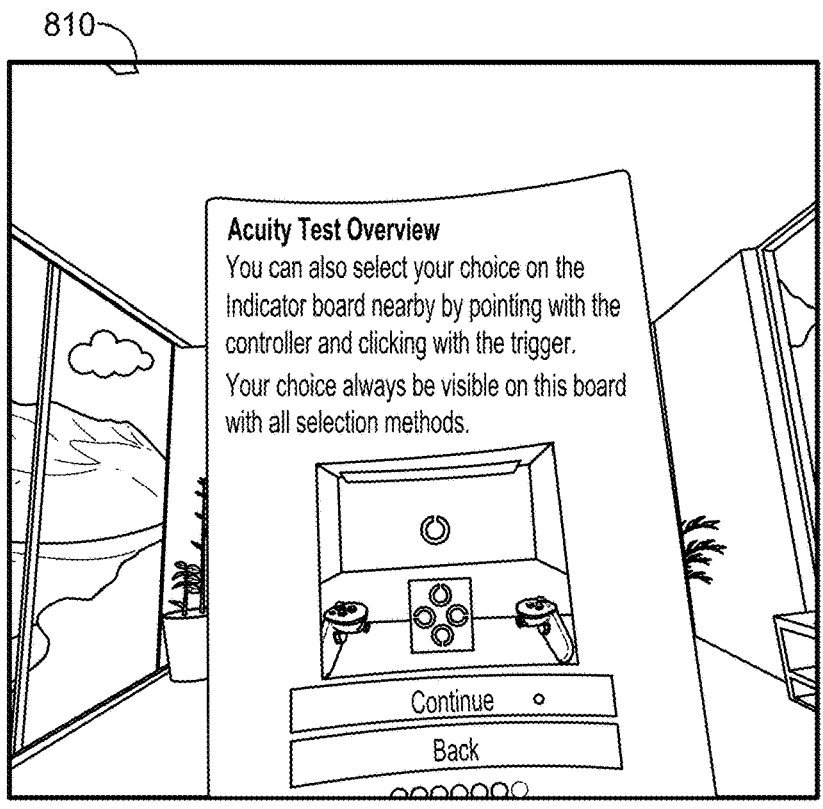

Acuity Test Overview

You can also select your choice on the Indicator board nearby by pointing with the controller and clicking with the trigger.

Your choice always be visible on this board with all selection methods.

Continue    ○

Back

Acuity Test Overview

To select the "upwards" orientation, either:

Point the controller at the top quadrant of the wall above the letter, then press the trigger.
OR
Tilt the joystick upwards and then press the trigger to submit.

Continue    ○

Back

910
912     914
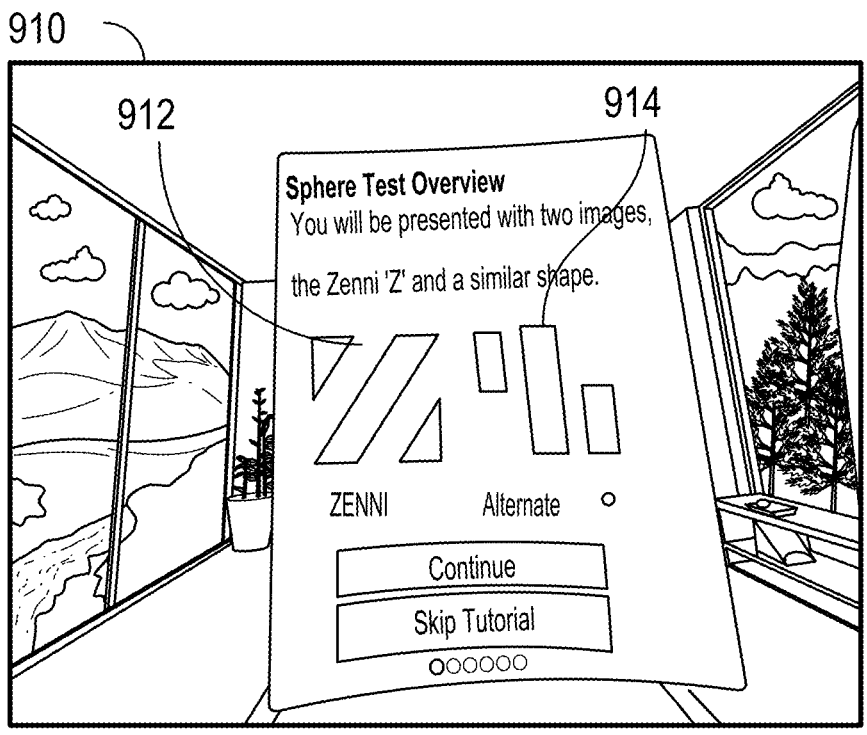
FIG. 9A
920
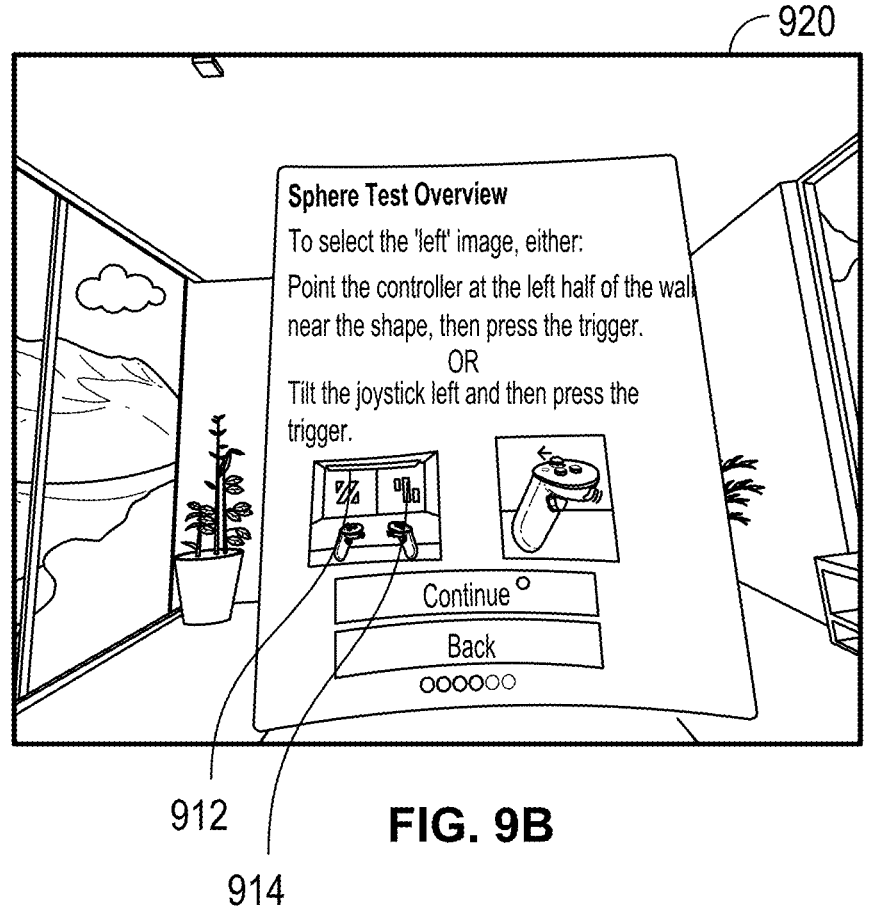
912     FIG. 9B
914

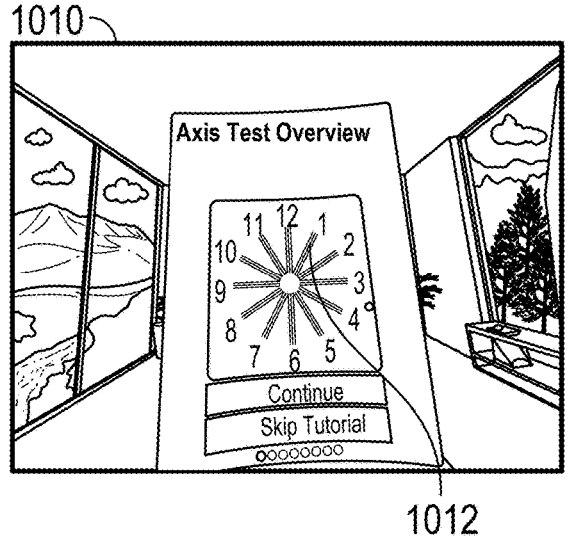
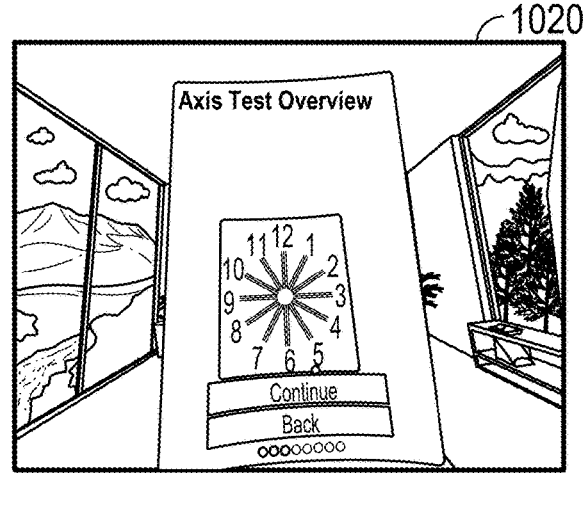
FIG. 10A          FIG. 10B
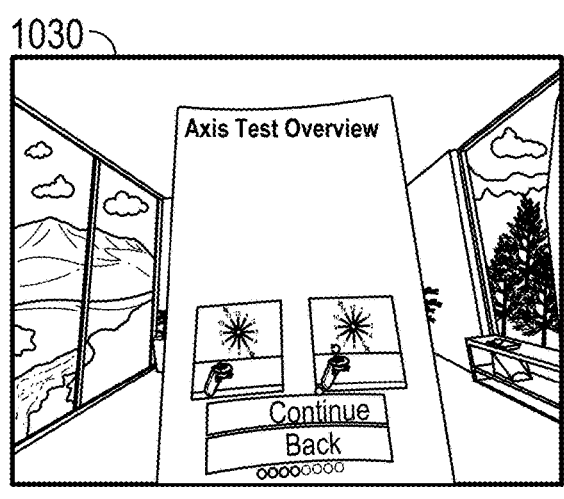
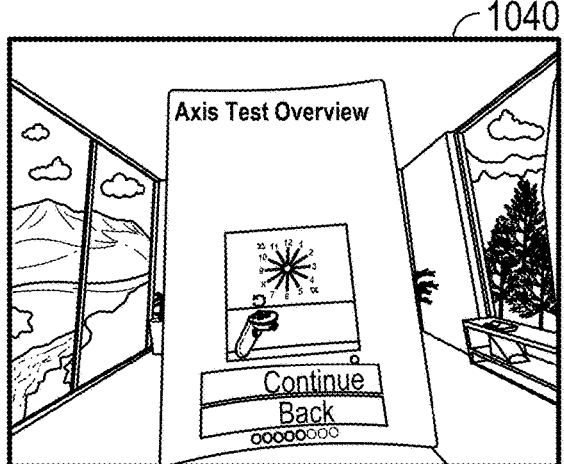
FIG. 10C          FIG. 10D

1050

1060

Vision Test
System 1100

1102 — Processor(s)

1128 — Camera(s) and/
or Sensor(s)

1126

1124 — Memory

1104 — HMD

Display — 1106

Lenses — 1108

Physical
structure — 1110

Camera,
Sensors — 1112

Audio — 1114

Processor(s) — 1116

1122 — Input Device(s)

1120 — Battery

1118 — Communication
interface(s)

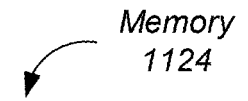
*Memory 1124*
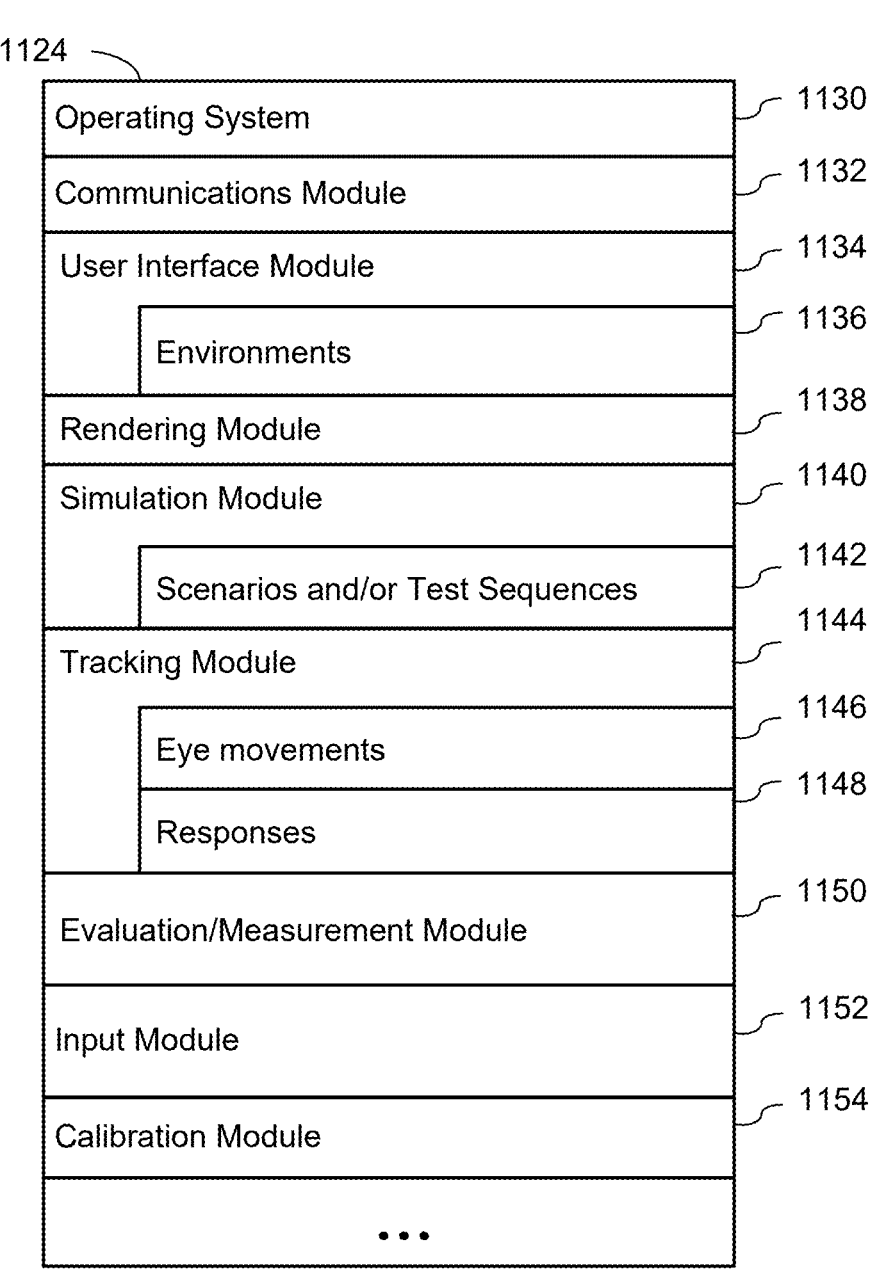
1124
| | |
|---|---|
| Operating System | 1130 |
| Communications Module | 1132 |
| User Interface Module | 1134 |
|     Environments | 1136 |
| Rendering Module | 1138 |
| Simulation Module | 1140 |
|     Scenarios and/or Test Sequences | 1142 |
| Tracking Module | 1144 |
|     Eye movements | 1146 |
|     Responses | 1148 |
| Evaluation/Measurement Module | 1150 |
| Input Module | 1152 |
| Calibration Module | 1154 |
| • • • | |
FIG. 11B

Figure 12A:
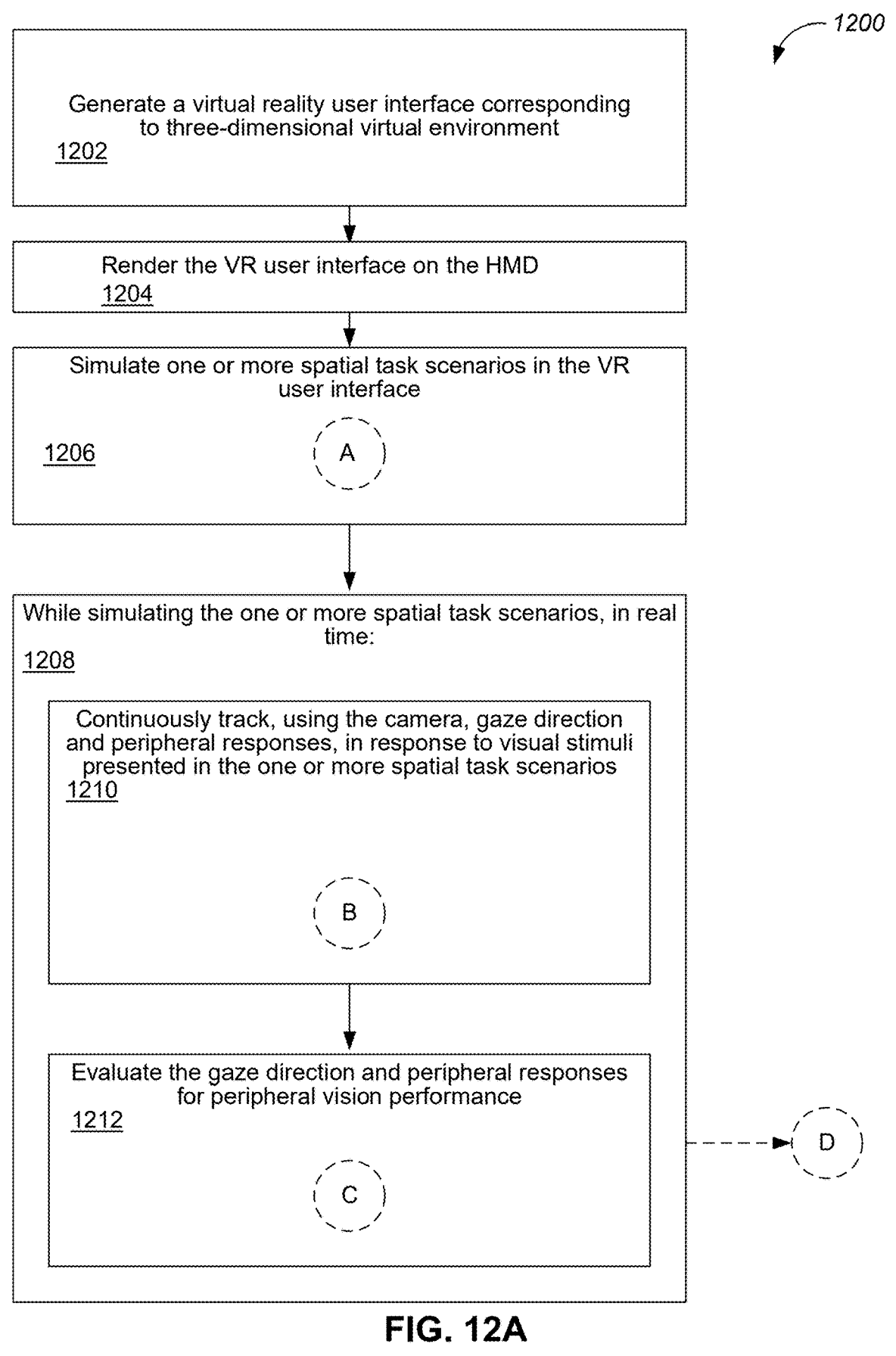

1200

Generate a virtual reality user interface corresponding to three-dimensional virtual environment
1202

Render the VR user interface on the HMD
1204

Simulate one or more spatial task scenarios in the VR user interface

1206     A

While simulating the one or more spatial task scenarios, in real time:
1208

Continuously track, using the camera, gaze direction and peripheral responses, in response to visual stimuli presented in the one or more spatial task scenarios
1210

B

Evaluate the gaze direction and peripheral responses for peripheral vision performance
1212

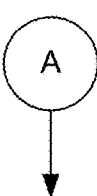

The one or more spatial task scenarios require detection and reaction to the stimuli appearing in a peripheral field of view
1214

The one or more spatial task scenarios include one or more tasks selected from the group consisting of: identifying objects that appear at the edges of visual field, tracking multiple moving targets across a wide area, and navigating through complex environments that require peripheral awareness to avoid obstacles
1216

The one or more spatial task scenarios include one or more tasks for assessing different aspects of peripheral vision, including field extent, reaction time to peripheral stimuli, and the ability to process and respond to peripheral information while maintaining central focus
1218

The one or more spatial task scenarios include a task for identifying peripheral objects for assessing field extent, a task for tracking multiple moving targets for assessing reaction time, and a task for navigation requiring peripheral vision to assess the ability to process and respond to peripheral information
1220

Simulating the one or more spatial task scenarios include changing scenarios every few seconds to a minute, wherein duration of each scenario is a few seconds to a minute, wherein at least 5-10 scenarios are simulated
1222

Simulating the one or more spatial task scenarios include one or more tasks that progressively challenge different aspects of peripheral vision with parameters including object size, speed, and trajectory
1224

FIG. 12B

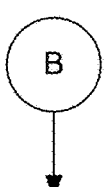

Tracking is performed using one or more infrared cameras capable of capturing detailed eye movements and peripheral responses with high accuracy and minimal latency
1226

FIG. 12C

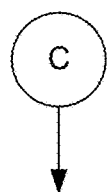

Evaluating for peripheral vision performance includes evaluating extent by measuring a maximum angle at which objects are detected while focusing on a central point
1228

Evaluating for peripheral vision performance includes evaluating accuracy by assessing correctness and reaction time to stimuli in the peripheral areas
1230

FIG. 12D

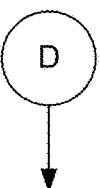

Compile results of the evaluation into a comprehensive report that highlights peripheral vision capabilities, identifying any deficiencies that could indicate conditions, including glaucoma, retinitis pigmentosa, or other visual field defects
1232

Establish baseline performance metrics by comparing user data with profiles of individuals with normal vision and those with known conditions affecting peripheral vision
1234

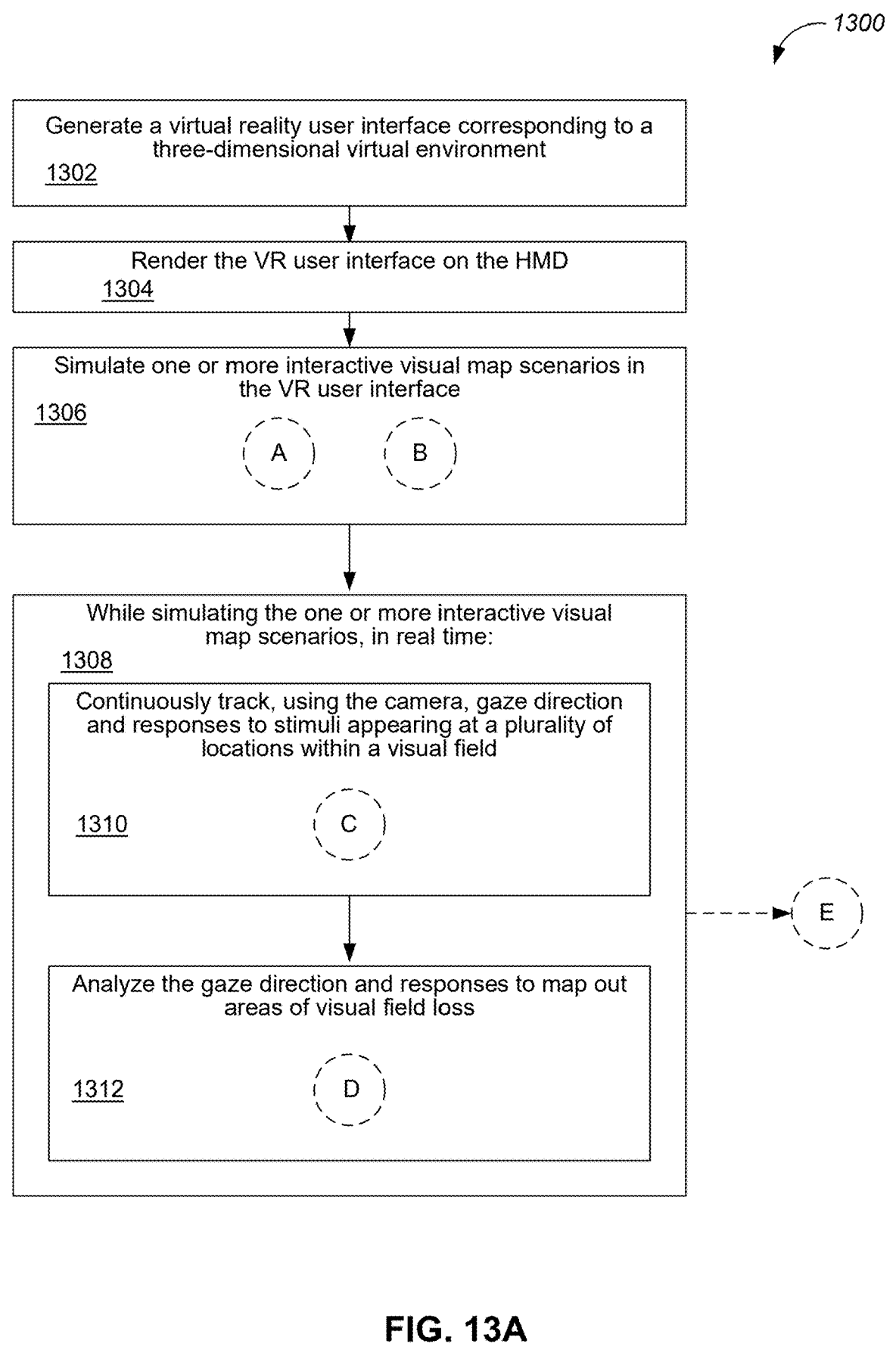

Generate a virtual reality user interface corresponding to a three-dimensional virtual environment
1302

Render the VR user interface on the HMD
1304

Simulate one or more interactive visual map scenarios in the VR user interface
1306

( A )    ( B )

While simulating the one or more interactive visual map scenarios, in real time:
1308

Continuously track, using the camera, gaze direction and responses to stimuli appearing at a plurality of locations within a visual field 1310    ( C )

( E )

Analyze the gaze direction and responses to map out areas of visual field loss 1312    ( D )

FIG. 13A

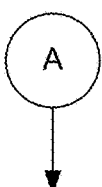

The one or more interactive visual map scenarios includes tasks selected from the group consisting of: identifying visual targets appearing randomly on a map, following moving objects across different regions of a visual field, and responding to changes in a visual environment
1314

The one or more interactive visual map scenarios includes tasks that require detection and reaction to stimuli at edges and within central and peripheral areas of vision
1318

Visual maps for the one or more interactive visual map scenarios includes graphical representations of a visual field, illustrating areas of normal vision, reduced sensitivity, and blind spots
1320

Visual maps for the one or more interactive visual map scenarios includes interactive visual maps that adapt to user responses, presenting a stimuli at various locations, to thereby map out areas of sensitivity and loss
1322

Simulating the one or more interactive visual map scenarios includes displaying one or more stimuli in a predetermined manner, thereby ensuring coverage of an entire visual field
1324

Simulating the one or more interactive visual map scenarios includes displaying one or more stimuli in a randomized way to prevent prediction
1326

FIG. 13B

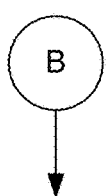
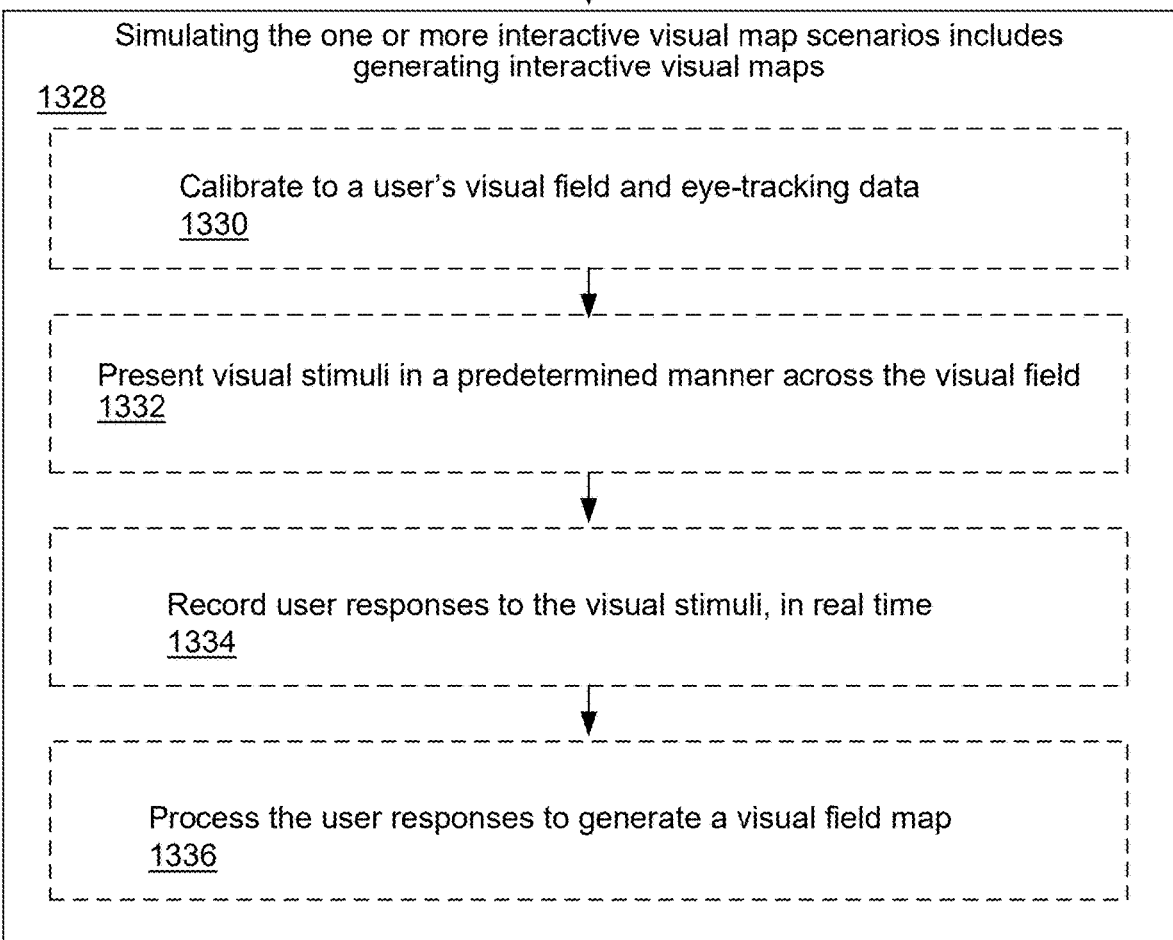
Simulating the one or more interactive visual map scenarios includes generating interactive visual maps
1328
Calibrate to a user's visual field and eye-tracking data
1330
Present visual stimuli in a predetermined manner across the visual field
1332
Record user responses to the visual stimuli, in real time
1334
Process the user responses to generate a visual field map
1336
FIG. 13C

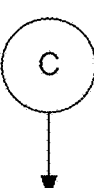

Tracking the gaze direction and responses to stimuli includes tracking, using one or more eye-tracking sensors, gaze direction, fixation stability, saccadic movements, and pupil reactions
1338

The tracking is performed using one or more infrared cameras capable of capturing detailed eye movements and peripheral responses with high accuracy and minimal latency
1340

FIG. 13D

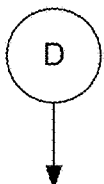

Analyze the gaze direction and responses includes evaluating an ability to perceive and respond to visual stimuli across a field of view
1342

Analyze the gaze direction and responses includes comparing user performance to baseline metrics, identifying delayed, inaccurate, or absent responses, to map out visual field loss
1344

FIG. 13E

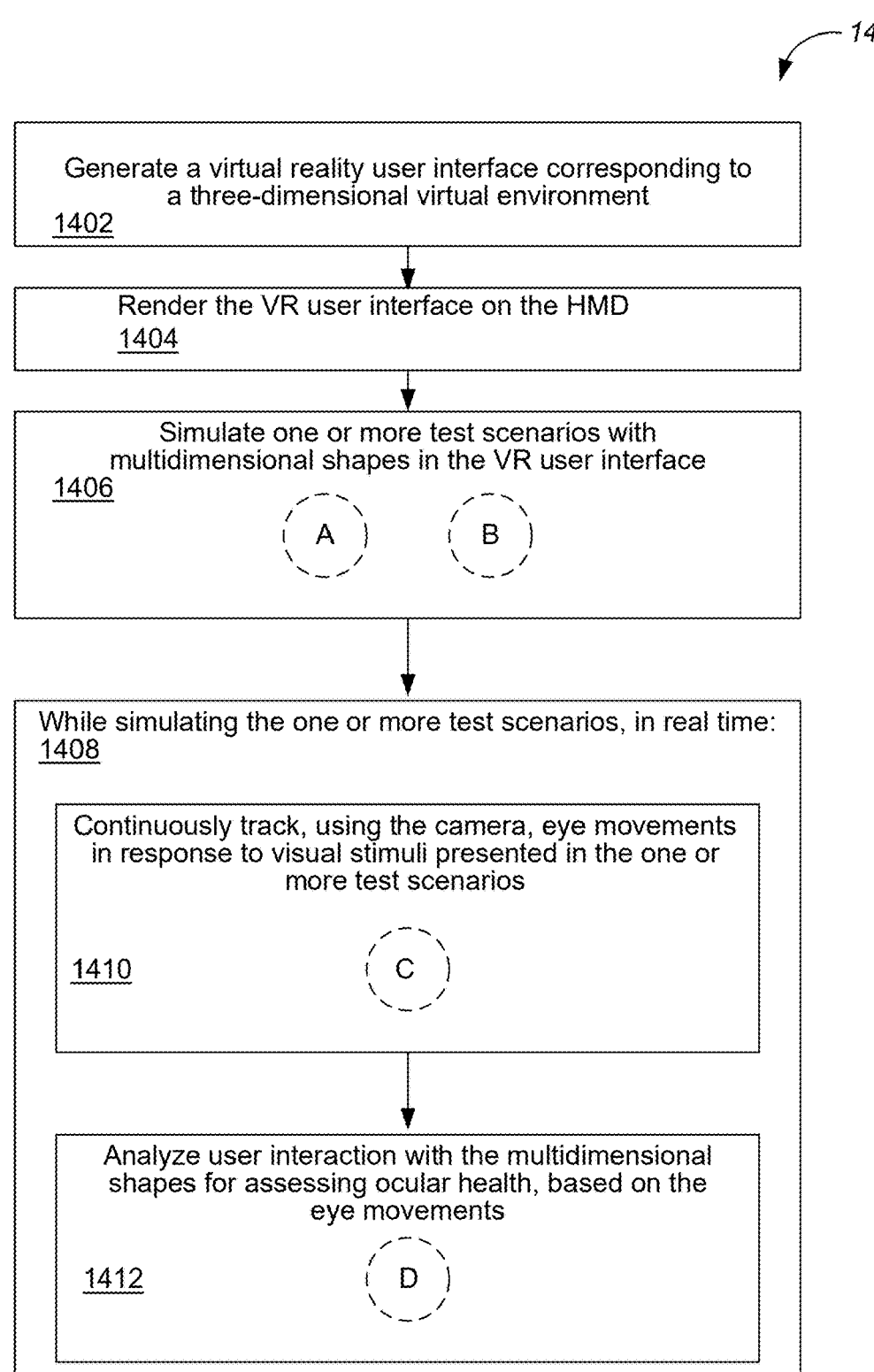

*1400*

Generate a virtual reality user interface corresponding to a three-dimensional virtual environment
1402

Render the VR user interface on the HMD
1404

Simulate one or more test scenarios with multidimensional shapes in the VR user interface
1406

A    B

While simulating the one or more test scenarios, in real time:
1408

Continuously track, using the camera, eye movements in response to visual stimuli presented in the one or more test scenarios

1410     C

Analyze user interaction with the multidimensional shapes for assessing ocular health, based on the eye movements

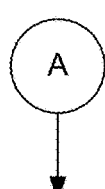

Simulating the one or more test scenarios includes generating a plurality of interactive 3D shapes within the virtual environment
1414

Generating the interactive 3D shapes includes selecting one or more shapes from a group consisting of polyhedra, tesseracts, and custom objects
1416

Generating the interactive 3D shapes includes generating one or more interactive shapes programmed to rotate, resize and align in space
1418

The plurality of interactive 3D shapes allow users to manipulate the shapes through gaze direction and hand movements
1420

The plurality of interactive 3D shapes includes symmetric shapes
1422

FIG. 14B

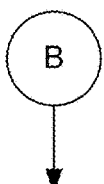

Simulating the one or more test scenarios includes generating and displaying a plurality of interactive tasks, including manipulating 3D shapes to fit into predetermined patterns, matching shapes based on depth cues, and performing precision tasks that require fine eye-hand coordination.
1424

Simulating the one or more test scenarios includes allowing a user to rotate, resize and align shapes
1426

Simulating the one or more test scenarios includes providing depth cues via overlap and relative size for distance estimation
1428

The one or more test scenarios includes one or more precision tasks requiring fine alignment and exact matching of shapes.
1430

The one or more test scenarios includes one or more tasks revealing strabismus, amblyopia, convergence insufficiency, and other similar issues, through user performance metrics.
1432

FIG. 14C

Tracking eye movements includes using one or more eye-tracking sensors to monitor gaze direction, fixation points, and saccadic movements
1434

Tracking eye movements includes mapping gaze direction, fixation points and saccadic movements to visual acuity, depth perception, and eye coordination
1436

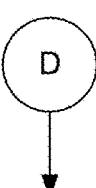

Analyzing user interaction with the multidimensional shapes includes assessing visual acuity via clarity of shape edges at different sizes
1438

Analyzing user interaction with the multidimensional shapes includes assessing depth perception via accurate perception of shape dimensions
1440

Analyzing user interaction with the multidimensional shapes includes assessing eye coordination via smooth and coordinated eye movements
1442

Analyzing user interaction with the multidimensional shapes includes assessing pattern matching and obstacle navigation, for ocular health tracking
1444

Analyzing the user interaction incldues assessing ocular health parameters including visual acuity, depth perception, and eye coordination
1446

Analyzing the user interaction includes analyzing accuracy, response time, and consistency of the user interactions
1448

FIG. 14E

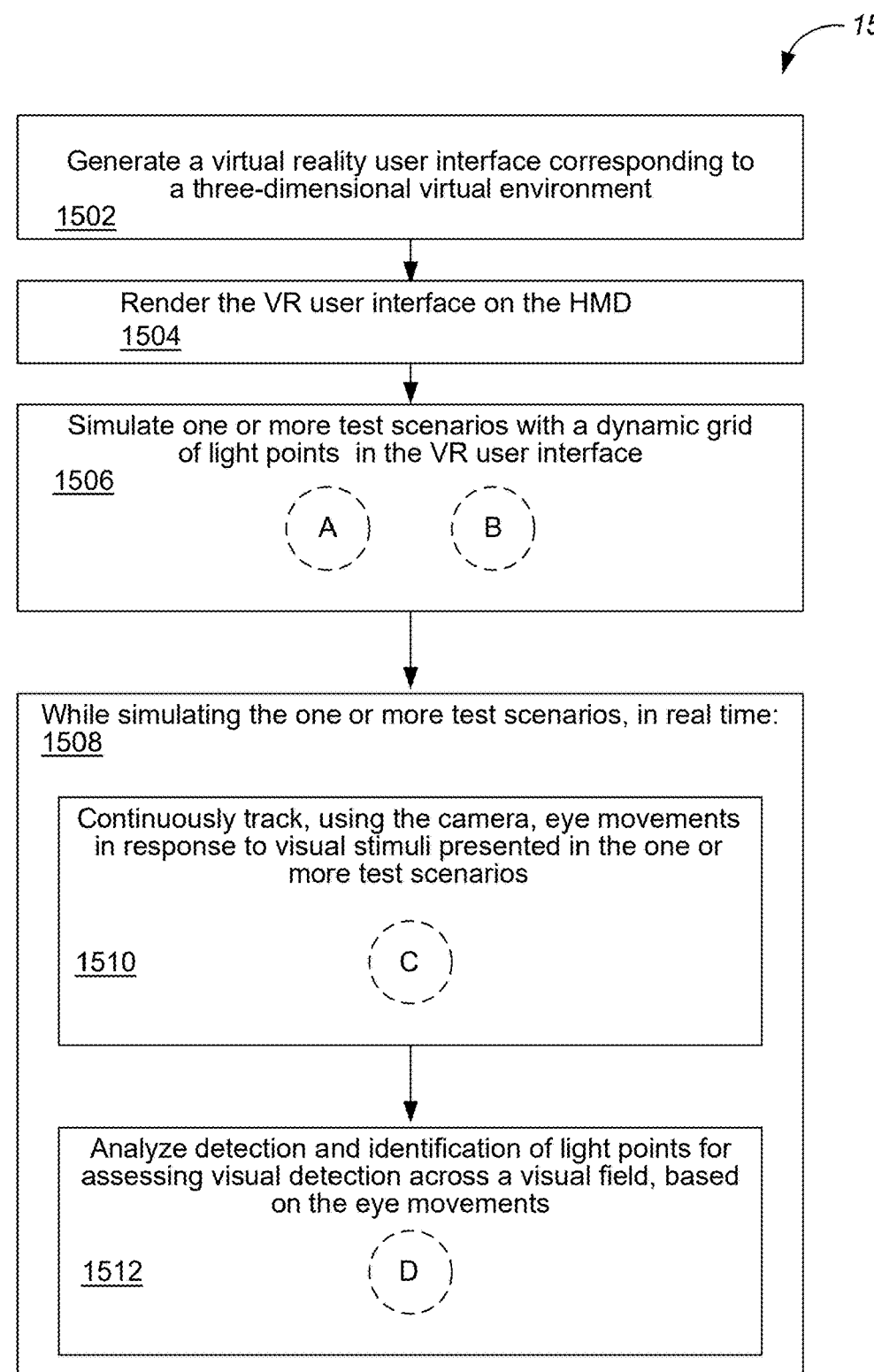

*1500*

Generate a virtual reality user interface corresponding to a three-dimensional virtual environment
1502

Render the VR user interface on the HMD
1504

Simulate one or more test scenarios with a dynamic grid of light points in the VR user interface
1506

A    B

While simulating the one or more test scenarios, in real time:
1508

Continuously track, using the camera, eye movements in response to visual stimuli presented in the one or more test scenarios

1510    C

Analyze detection and identification of light points for assessing visual detection across a visual field, based on the eye movements

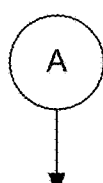

The visual stimuli includes light points that appear randomly across a defined grid
1514

The one or more test scenarios includes scenarios where light points of different intensities and sizes appear at random locations within a grid.
1516

The one or more test scenarios includes one or more scenarios to test different aspects of the visual field, including central and peripheral vision, under a plurality of lighting conditions
1518

Simulating the one or more test scenarios includes calibrating using a control group of users with predetermined visual field profiles to establish baseline performance metrics and validating accuracy of visual field assessment, prior to assessing the visual detection across the visual field
1520

The one or more test scenarios require identification of light points within milliseconds to a few seconds
1522

FIG. 15B

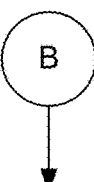

Simulating the one or more test scenarios includes generating an interactive grid of light points by calibrating to a user's visual field, presenting a dynamic gird, and displaying one or more light points randomly in the dynamic grid
1524

The dynamic grid includes uniform and random grids
1526

The one or more test scenarios includes generating and displaying a plurality of light points having varying intensities and sizes
1528

FIG. 15C

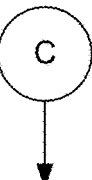

Continuously track the eye movements includes continuously monitoring gaze direction and fixation points, while recording responses to each light point
1530

Continuously tracking the eye movements includes mapping gaze direction and fixation points via high -precision eye-tracking sensors that capture accuracy and speed of visual detection
1532

Continuously track a predetermined gesture or pressing a button when detecting a light point and recording reaction time and accuracy, in addition to tracking gaze direction and fixation points
1534

FIG. 15D

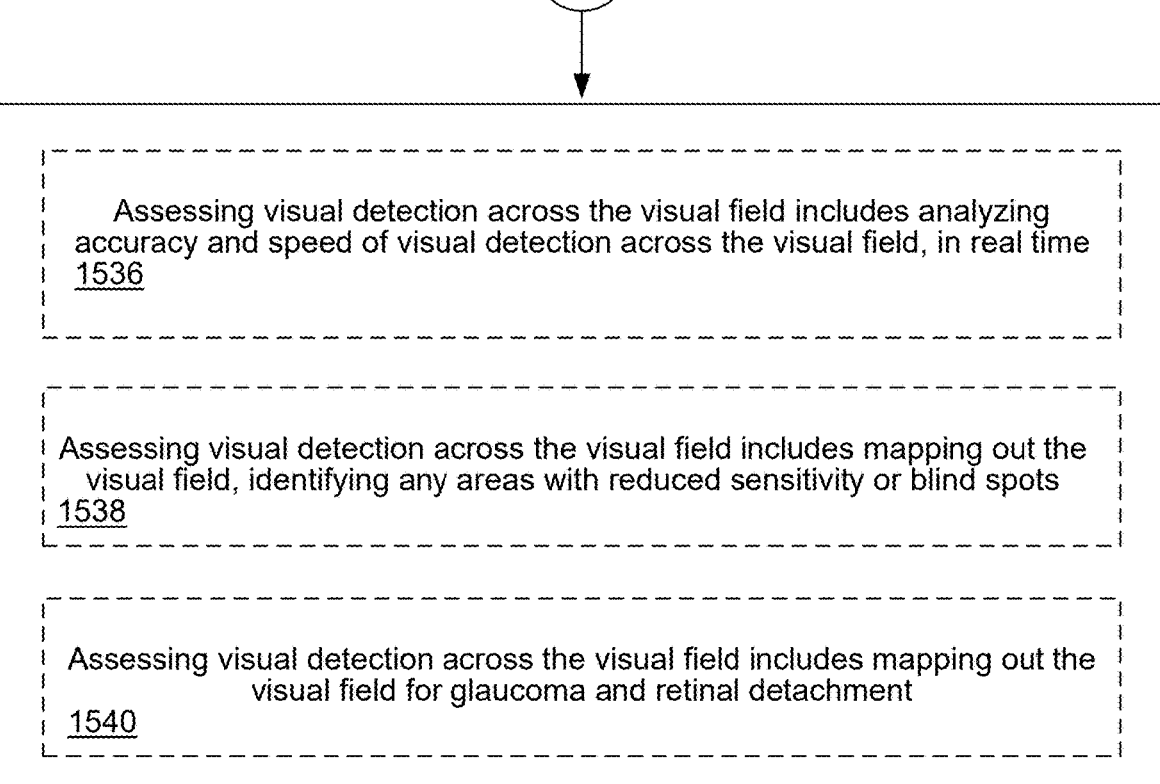

Assessing visual detection across the visual field includes analyzing accuracy and speed of visual detection across the visual field, in real time
1536

Assessing visual detection across the visual field includes mapping out the visual field, identifying any areas with reduced sensitivity or blind spots
1538

Assessing visual detection across the visual field includes mapping out the visual field for glaucoma and retinal detachment
1540

FIG. 15E

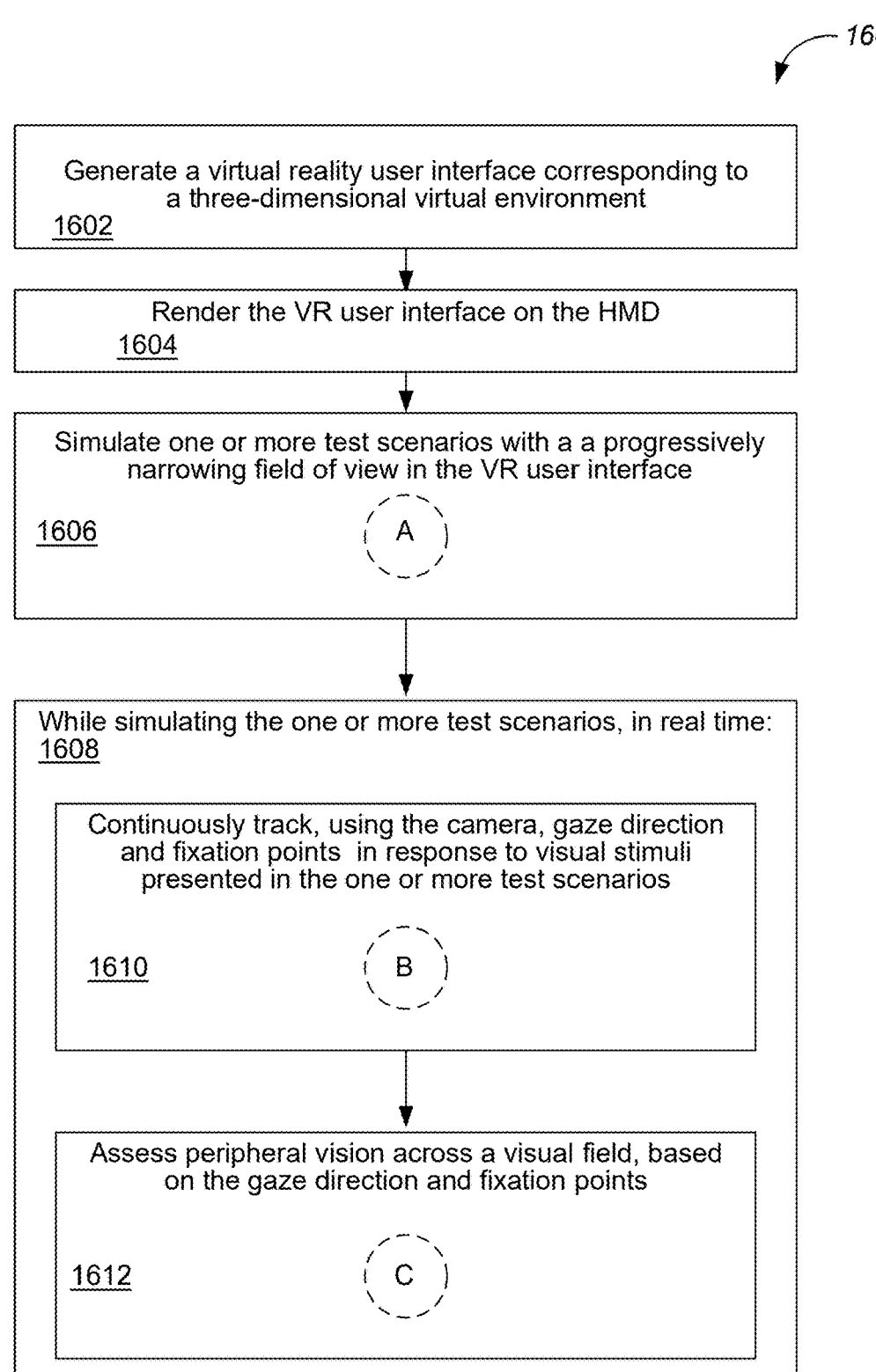

1600

Generate a virtual reality user interface corresponding to a three-dimensional virtual environment
1602

Render the VR user interface on the HMD
1604

Simulate one or more test scenarios with a a progressively narrowing field of view in the VR user interface 1606        ( A )

While simulating the one or more test scenarios, in real time:
1608

Continuously track, using the camera, gaze direction and fixation points in response to visual stimuli presented in the one or more test scenarios 1610        ( B )

Assess peripheral vision across a visual field, based on the gaze direction and fixation points 1612        ( C )

FIG. 16A

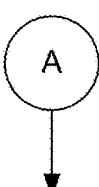

Simulating the one or more test scenarios includes adjusting a visible area in real-time, thereby simulating a constricting visual field to challenge peripheral vision capabilities
1614

The one or more test scenarios includes one or more scenarios where objects or light points appear at edges of a visual field and move towards a center as a visible area decreases
1616

Simulating the one or more test scenarios includes calibrating using a control group of users with predetermined peripheral vision profiles to establish baseline performance metrics and validating accuracy of visual field assessment, prior to assessing the visual detection across the visual field
1618

The one or more test scenarios includes a field of view that narrows in a controlled manner, with a predetermined progression based on test objectives and a speed that challenges a user without causing excessive strain
1620

FIG. 16B

Continuously track the gaze direction and fixation points includes tracking reaction time, accuracy, and a point at which stimuli are no longer detected
1622

Analyzing peripheral vision includes generating a detailed map of peripheral vision, identifying any areas with reduced sensitivity or blind spots
1624

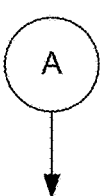

The photorealistic virtual environment  includes one or more scenes selected from the group consisting of: a virtual living room, park, and city street, which provide a realistic context for visual challenges
1714

FIG. 17B

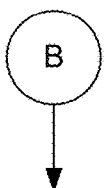

The one or more real-world scenarios includes a plurality of interactive tasks selected from the group consisting of: reaching for and manipulating virtual objects, judging distances between objects, and navigating through complex environments that require accurate depth perception
1716

The one or more real-world scenarios include scenarios where users interact with virtual objects, judge spatial relationships, and navigate through virtual environments that require precise depth perception and eye coordination
1718

Simulating the one or more real-world scenarios includes calibrating using a control group of users with predetermined binocular vision profiles to establish baseline performance metrics and validating accuracy of visual field assessment, prior to assessing the depth perception, stereopsis and eye coordination
1720

FIG. 17C

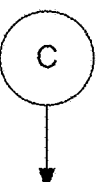

Simulating the one or more real-world scenarios includes one or more tasks for testing depth perception, stereopsis, and eye coordination
1722

The one or more tasks for depth perception testing require distinguishing between objects at different distances, one or more tasks
1724

The one or more tasks for stereopsis testing require assessing a three-dimensional structure of objects
1726

The one or more tasks for eye coordination testing require tracking objects that move independently in the environment
1728

FIG. 17D

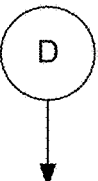

Assessing depth perception, stereopsis and eye coordination includes recording the gaze direction to ensure correct focus, and monitoring convergence and divergence to assess an ability of eyes to work together
1730

Assessing depth perception, stereopsis and eye coordination includes computing one or more metrics including a distance at which the eyes converge or diverge, reaction times, and stability
1732

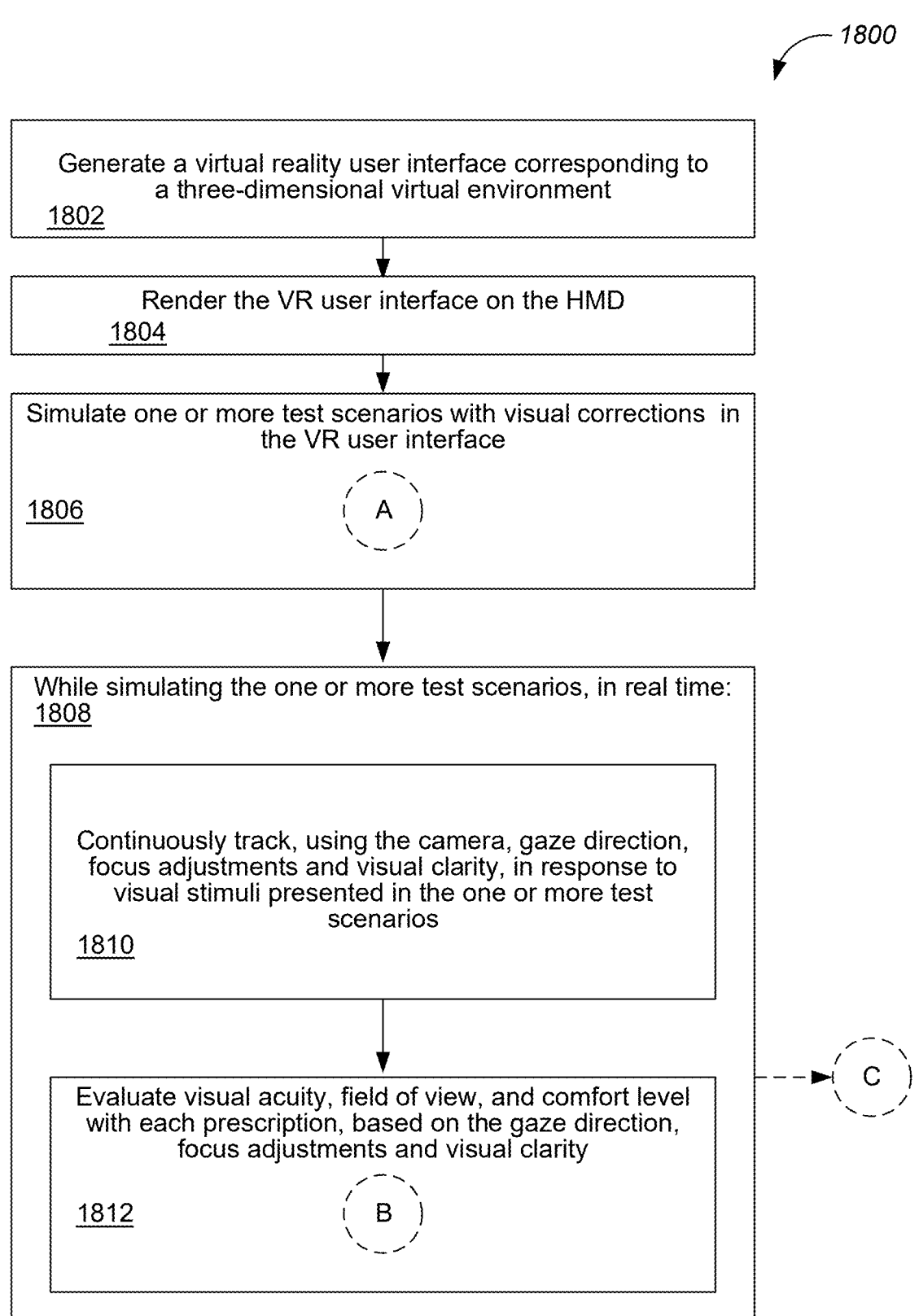

Generate a virtual reality user interface corresponding to a three-dimensional virtual environment
1802

Render the VR user interface on the HMD
1804

Simulate one or more test scenarios with visual corrections in the VR user interface 1806          ( A )

While simulating the one or more test scenarios, in real time:
1808

Continuously track, using the camera, gaze direction, focus adjustments and visual clarity, in response to visual stimuli presented in the one or more test scenarios
1810

Evaluate visual acuity, field of view, and comfort level with each prescription, based on the gaze direction, focus adjustments and visual clarity 1812          ( B )

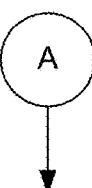

Simulating the one or more test scenarios includes adjusting a visual field to replicate effects of different lens prescriptions
1814

Simulating the one or more test scenarios includes generating and displaying simulations that recreate optical effects of different prescriptions, including changes in focal length, magnification, and distortion
1816

The one or more test scenarios includes one or more scenarios where users experience the impact of various prescription strengths and types, including single vision, bifocal and progressive fields, on their visual fields
1818

The one or more test scenarios comprises one or more scenarios to test adaptation to and functioning with different prescriptions, when engaging in reading, driving, or performing everyday activities in the virtual environment
1820

Simulating the one or more test scenarios comprises calibrating using a control group of users with predetermined prescription needs to establish baseline performance metrics and validating accuracy of the simulation, prior to evaluating the visual acuity, field of view, and comfort level
1822

The one or more test scenarios comprises reading text at different distances for assessing clarity and comfort, navigating a virtual city for evaluating visual performance while moving through complex environments, or performing everyday tasks including cooking, driving, and office work to gauge real-world effectiveness of prescriptions
1824

FIG. 18B

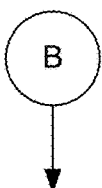

Evaluating the visual acuity, field of view, and comfort level includes evaluating visual acuity by measuring clarity of vision at various distances
1826

Evaluating the visual acuity, field of view, and comfort level includes assessing field of view by tracking the extent of the visual field with different lens prescriptions
1828

Evaluating the visual acuity, field of view, and comfort level includes correlating user feedback on comfort with objective data on gaze stability and focus adjustments
1830

Evaluating the visual acuity, field of view, and comfort level includes detecting visual distortions through deviations in expected gaze patterns and increased correction attempts by the user
1832

Evaluating the visual acuity, field of view, and comfort level comprises detecting discomfort as indicated by frequent adjustments, prolonged fixation on certain areas, or user-reported discomfort
1834

FIG. 18C

Generate a report outlining visual performance with each prescription, highlighting any issues including visual distortions, discomfort, or suboptimal correction, and providing one or more recommendations for further optometric consultation if necessary <u>1836</u>

2000

2002

2004

2006

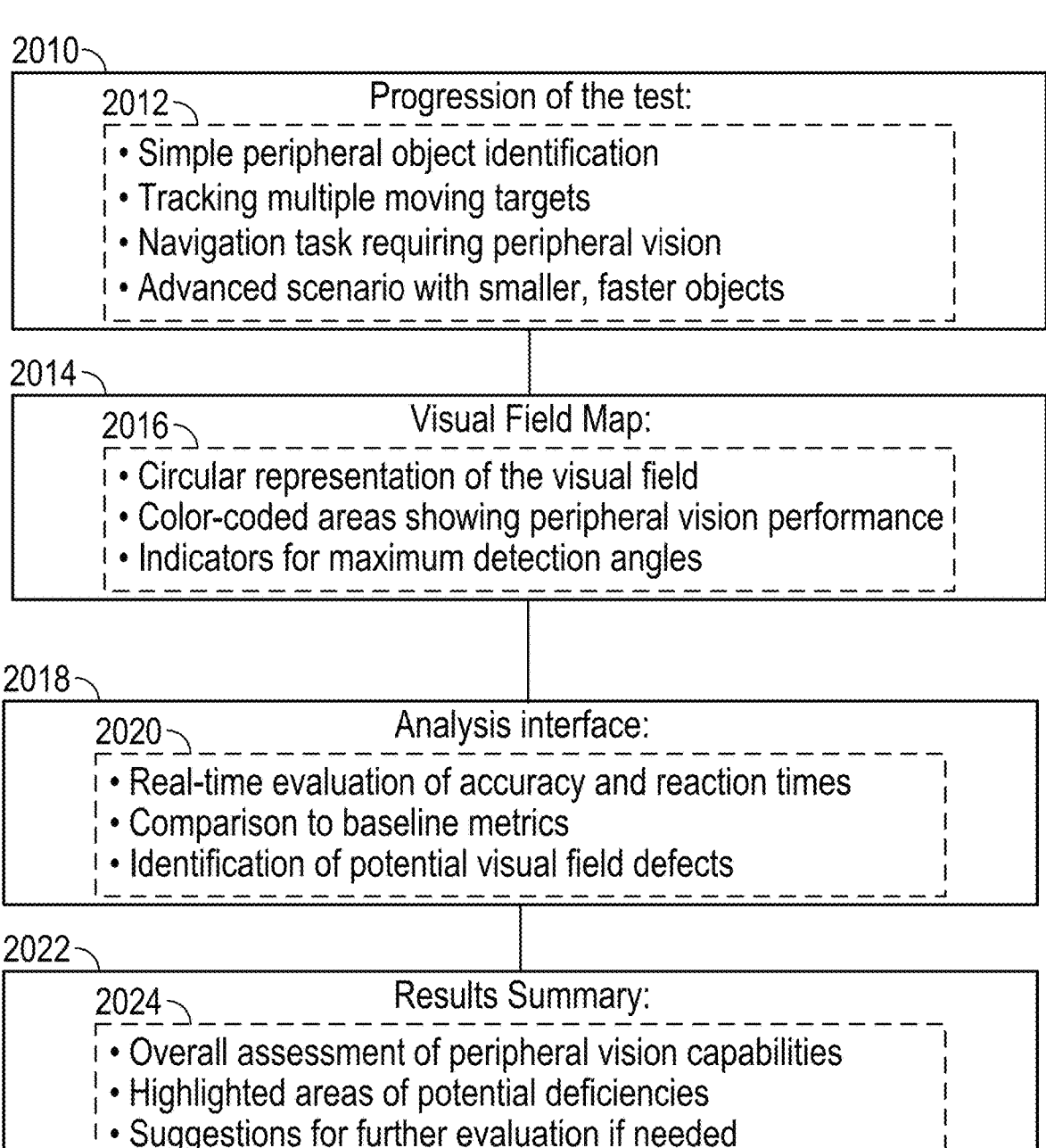

2008

2010

Progression of the test:

2012
- Simple peripheral object identification
- Tracking multiple moving targets
- Navigation task requiring peripheral vision
- Advanced scenario with smaller, faster objects

2014

Visual Field Map:

2016
- Circular representation of the visual field
- Color-coded areas showing peripheral vision performance
- Indicators for maximum detection angles

2018

Analysis interface:

2020
- Real-time evaluation of accuracy and reaction times
- Comparison to baseline metrics
- Identification of potential visual field defects

2022

Results Summary:

2024
- Overall assessment of peripheral vision capabilities
- Highlighted areas of potential deficiencies
- Suggestions for further evaluation if needed

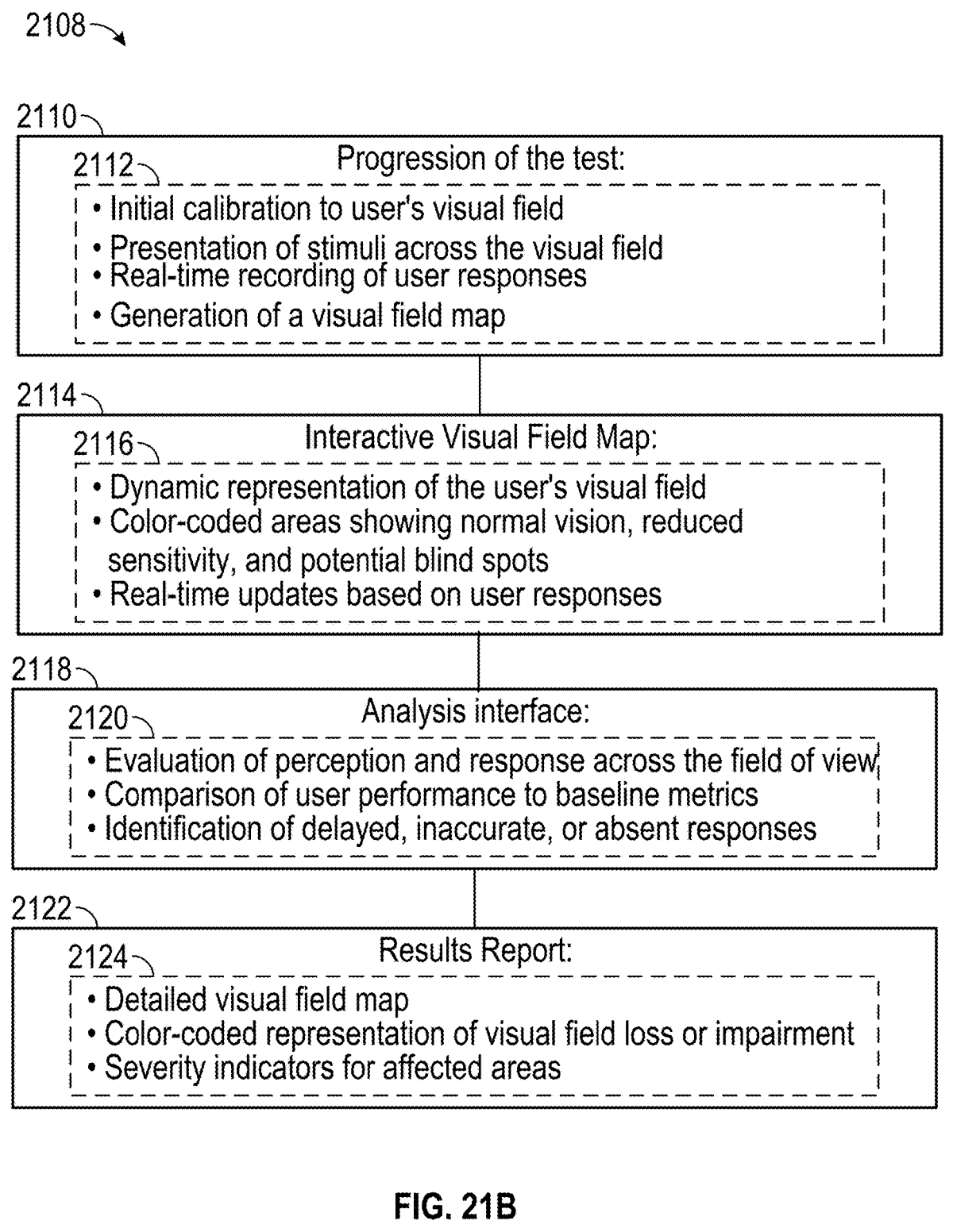

Progression of the test:

2112
- Initial calibration to user's visual field
- Presentation of stimuli across the visual field
- Real-time recording of user responses
- Generation of a visual field map

2114

Interactive Visual Field Map:

2116
- Dynamic representation of the user's visual field
- Color-coded areas showing normal vision, reduced sensitivity, and potential blind spots
- Real-time updates based on user responses

2118

Analysis interface:

2120
- Evaluation of perception and response across the field of view
- Comparison of user performance to baseline metrics
- Identification of delayed, inaccurate, or absent responses

2122

Results Report:

2124
- Detailed visual field map
- Color-coded representation of visual field loss or impairment
- Severity indicators for affected areas

FIG. 21B

2200
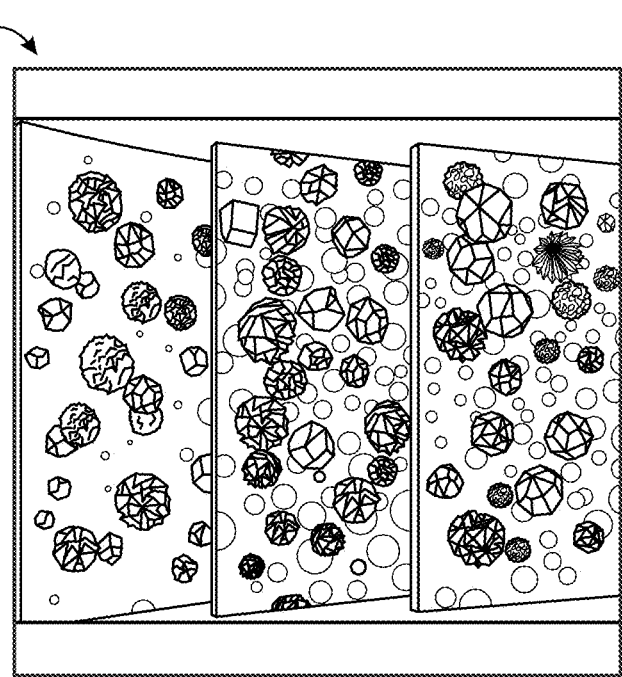
FIG. 22A
2202
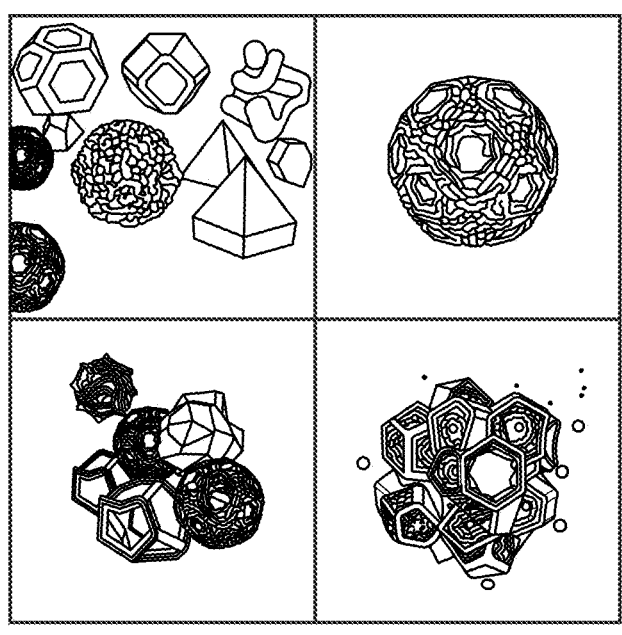
FIG. 22B

Figure 22C:
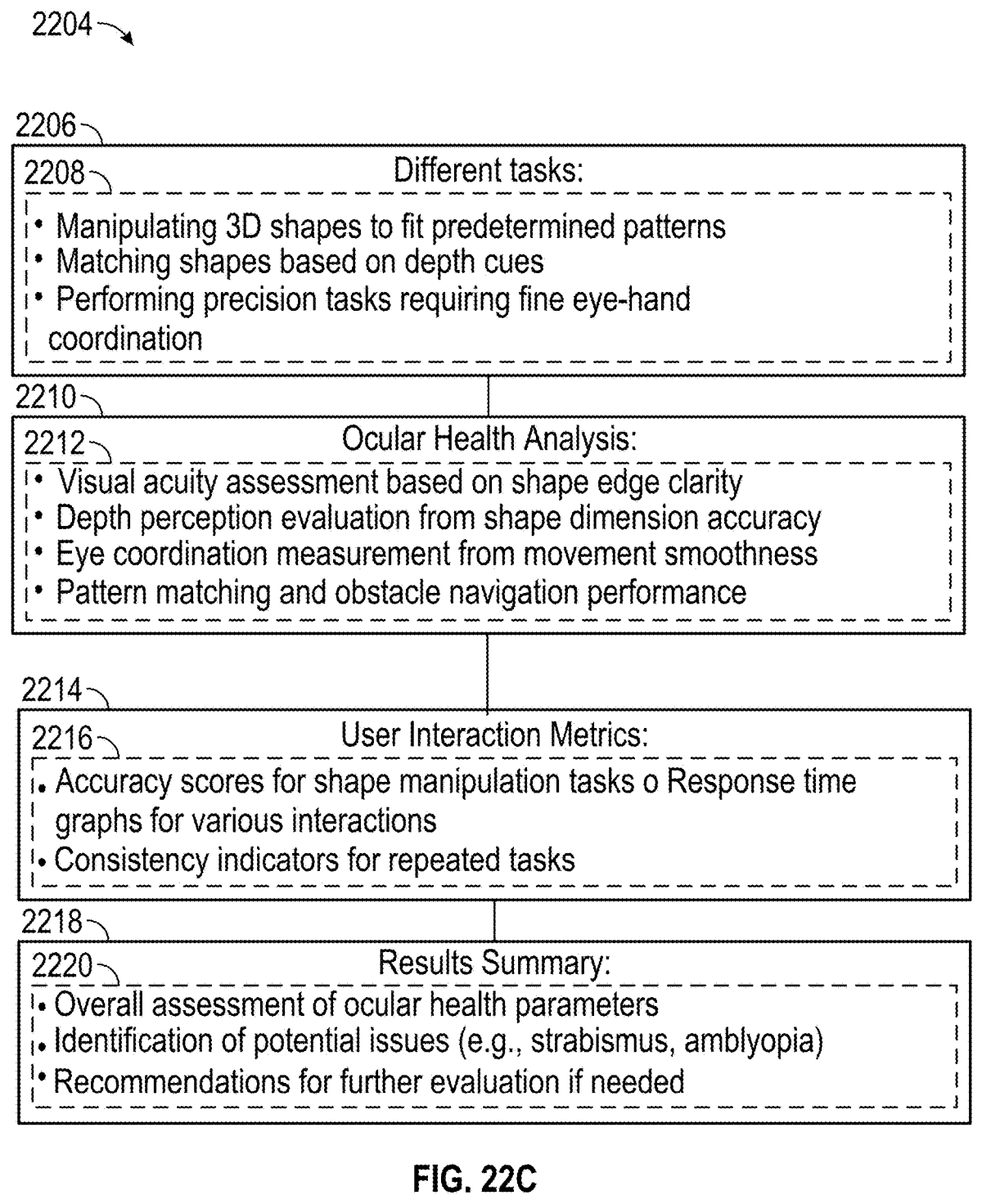

2204

2206

Different tasks:

2208
- Manipulating 3D shapes to fit predetermined patterns
- Matching shapes based on depth cues
- Performing precision tasks requiring fine eye-hand coordination

2210

Ocular Health Analysis:

2212
- Visual acuity assessment based on shape edge clarity
- Depth perception evaluation from shape dimension accuracy
- Eye coordination measurement from movement smoothness
- Pattern matching and obstacle navigation performance

2214

User Interaction Metrics:

2216
- Accuracy scores for shape manipulation tasks o Response time graphs for various interactions
- Consistency indicators for repeated tasks

2218

Results Summary:

2220
- Overall assessment of ocular health parameters
- Identification of potential issues (e.g., strabismus, amblyopia)
- Recommendations for further evaluation if needed

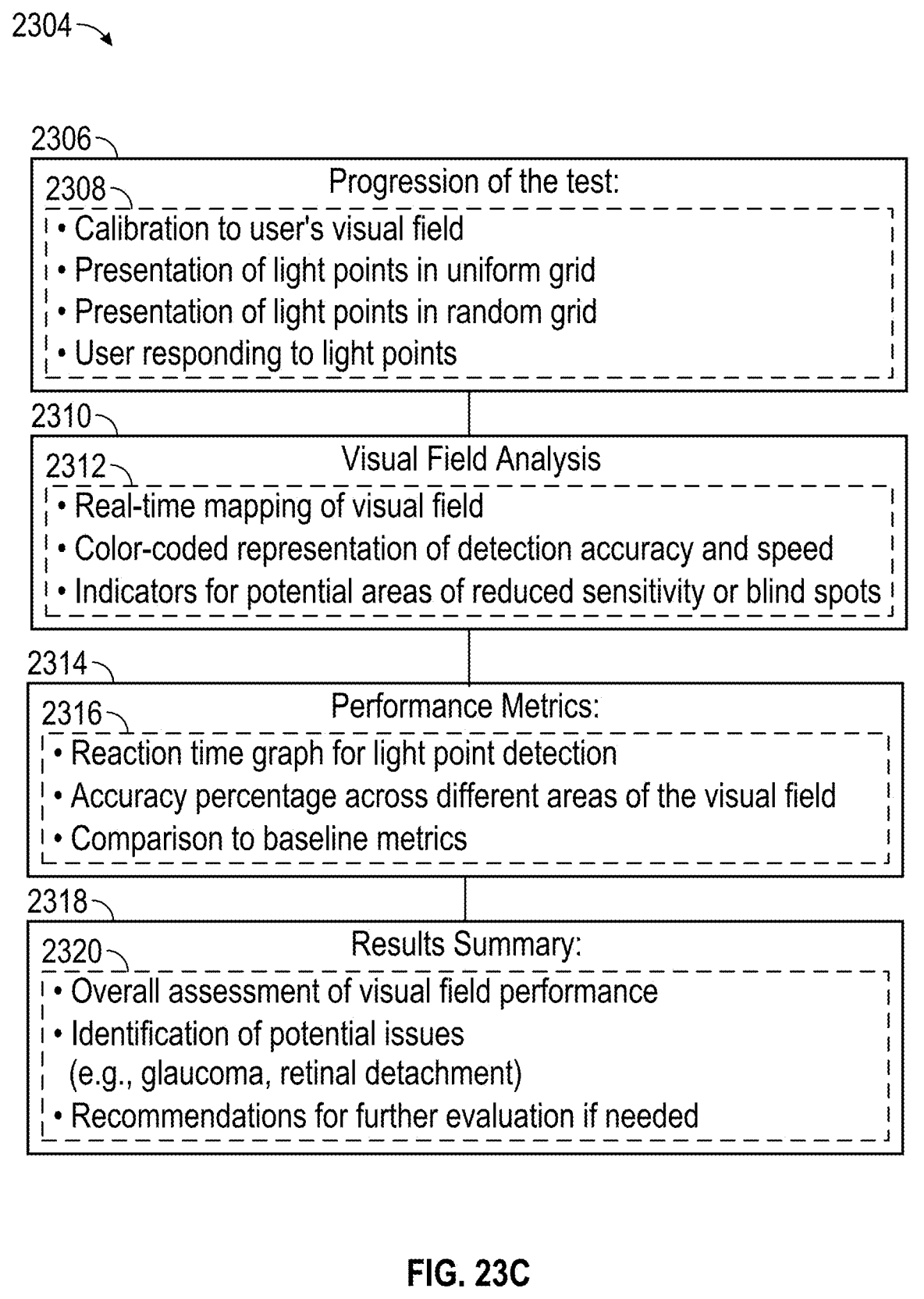

2308         Progression of the test:
- Calibration to user's visual field
- Presentation of light points in uniform grid
- Presentation of light points in random grid
- User responding to light points

2310

2312         Visual Field Analysis
- Real-time mapping of visual field
- Color-coded representation of detection accuracy and speed
- Indicators for potential areas of reduced sensitivity or blind spots

2314

2316         Performance Metrics:
- Reaction time graph for light point detection
- Accuracy percentage across different areas of the visual field
- Comparison to baseline metrics

2318

2320         Results Summary:
- Overall assessment of visual field performance
- Identification of potential issues
  (e.g., glaucoma, retinal detachment)
- Recommendations for further evaluation if needed

FIG. 23C

2400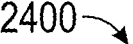
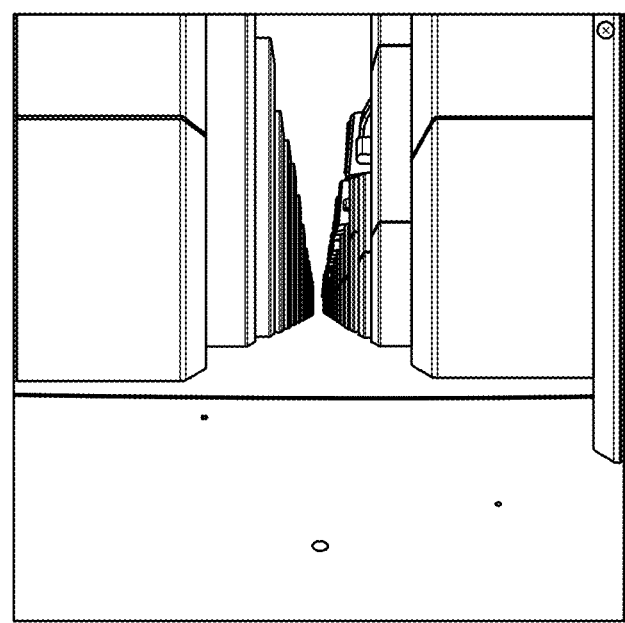
FIG. 24A
2402
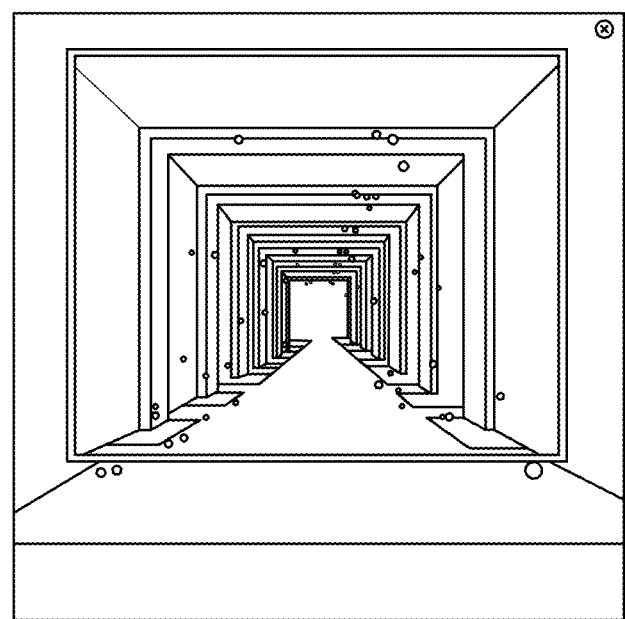
FIG. 24B

2404

2406

2408    Progression of the test:
- Full field of view
- Slightly narrowed field of view
- Significantly narrowed field of view
- Maximally narrowed field of view

2410

2412    Peripheral Vision Map:
- Circular representation of the visual field
- Color-coded areas showing peripheral vision performance
- Indicators for areas of reduced sensitivity or blind spots

2414

2416    Performance Analysis:
- Reaction time graph for peripheral stimuli detection
- Accuracy percentage at different field of view sizes
- Point at which stimuli are no longer detected

2418

2420    Results Summary:
- Overall assessment of peripheral vision capabilities
- Comparison to baseline metrics
- Recommendations for further evaluation if needed

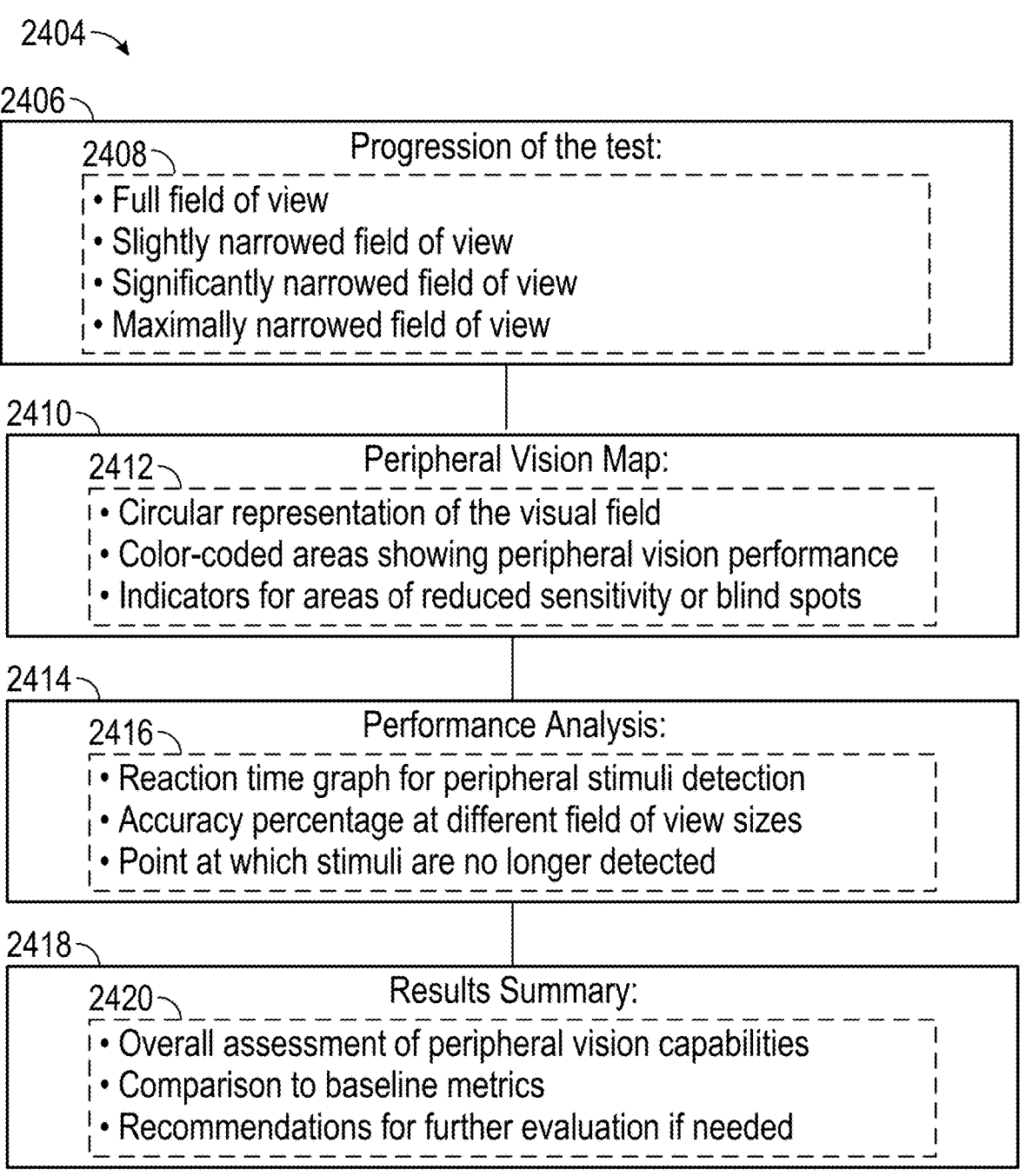

Figure 25B:
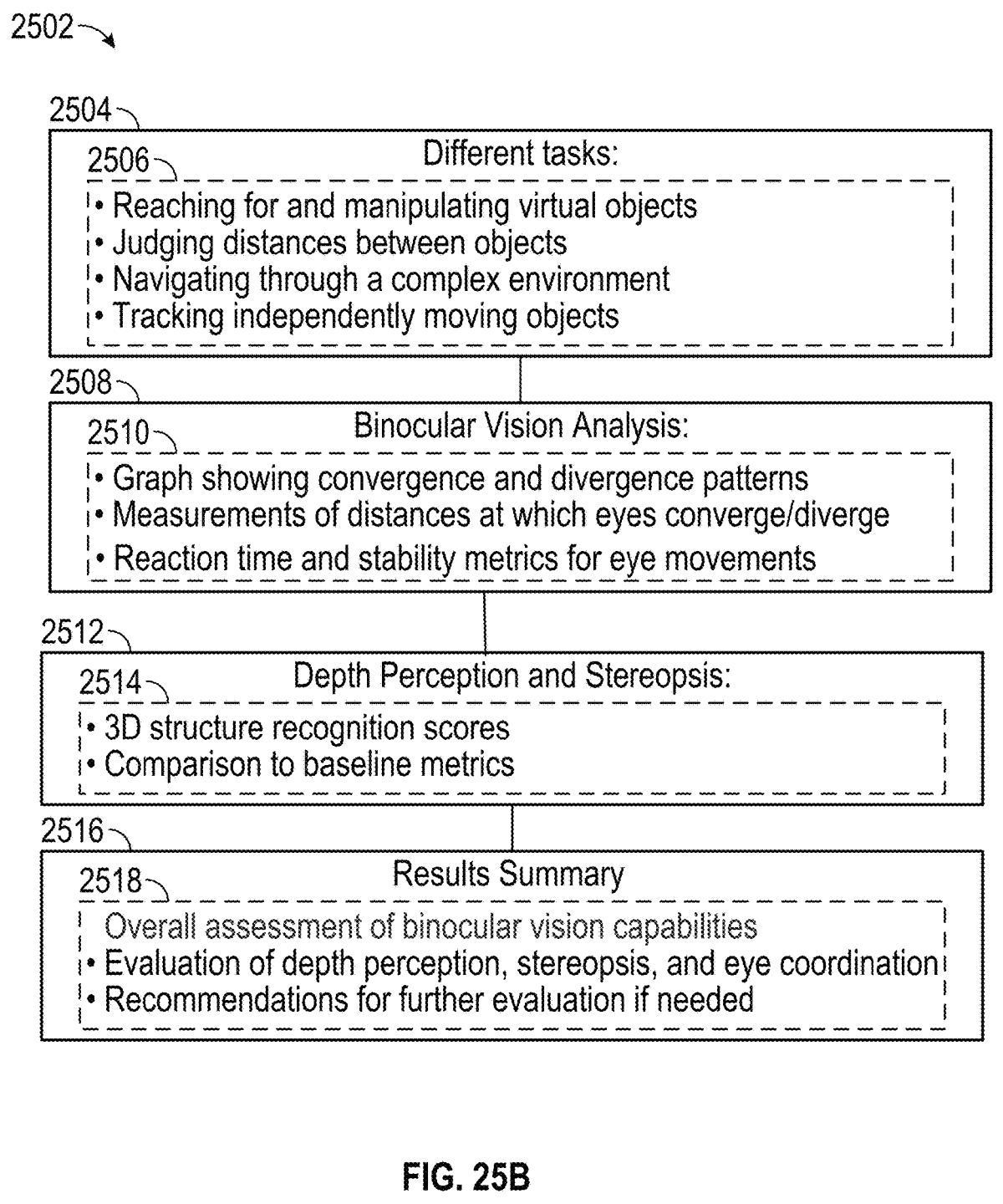

2506 Different tasks:
- Reaching for and manipulating virtual objects
- Judging distances between objects
- Navigating through a complex environment
- Tracking independently moving objects

2508

2510 Binocular Vision Analysis:
- Graph showing convergence and divergence patterns
- Measurements of distances at which eyes converge/diverge
- Reaction time and stability metrics for eye movements

2512

2514 Depth Perception and Stereopsis:
- 3D structure recognition scores
- Comparison to baseline metrics

2516

2518 Results Summary
- Overall assessment of binocular vision capabilities
- Evaluation of depth perception, stereopsis, and eye coordination
- Recommendations for further evaluation if needed

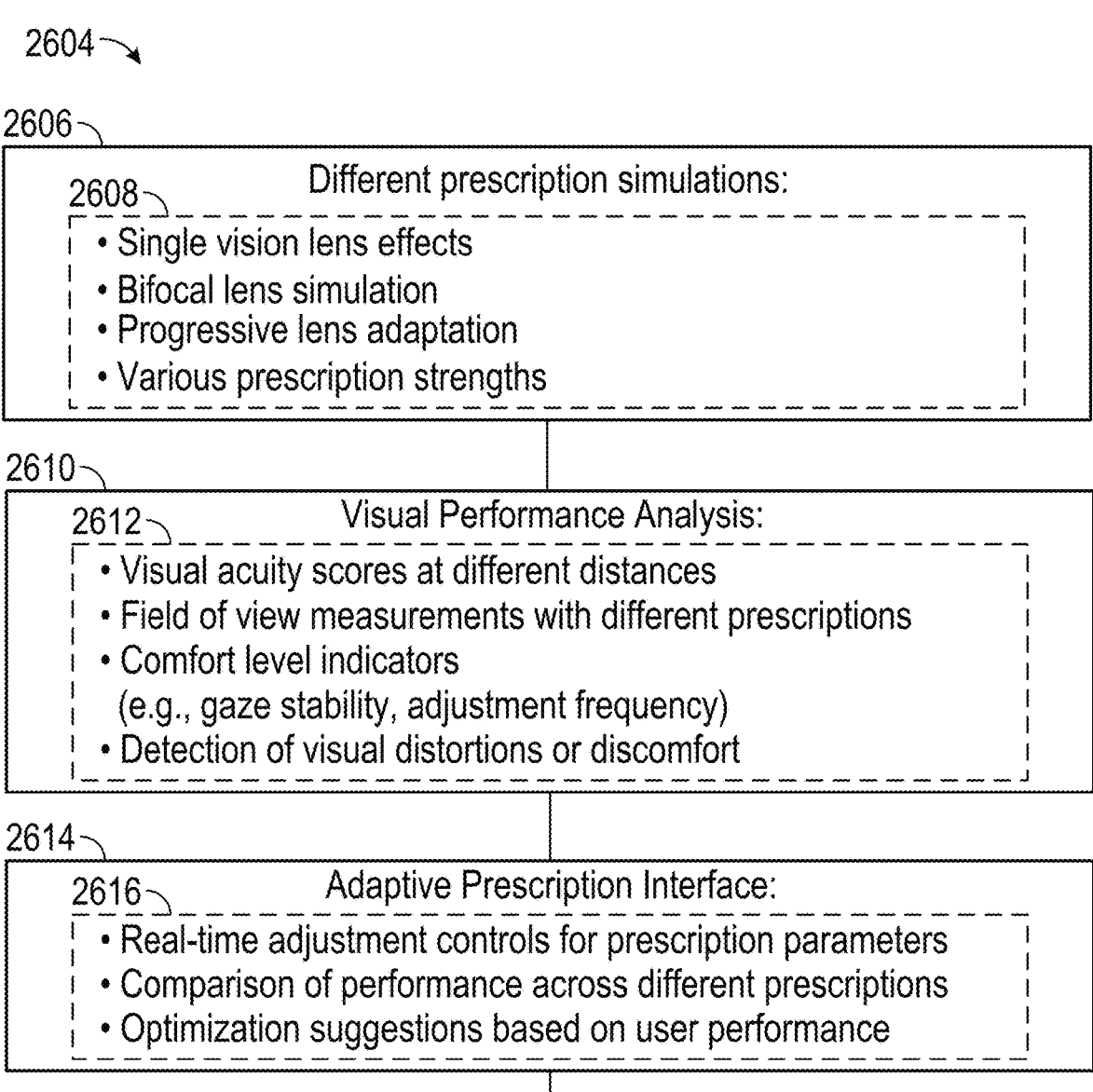

2604

2606

Different prescription simulations:

2608
- Single vision lens effects
- Bifocal lens simulation
- Progressive lens adaptation
- Various prescription strengths

2610

Visual Performance Analysis:

2612
- Visual acuity scores at different distances
- Field of view measurements with different prescriptions
- Comfort level indicators
  (e.g., gaze stability, adjustment frequency)
- Detection of visual distortions or discomfort

2614

Adaptive Prescription Interface:

2616
- Real-time adjustment controls for prescription parameters
- Comparison of performance across different prescriptions
- Optimization suggestions based on user performance

2618

Results and Recommendations:

2620
- Summary of visual performance with each prescription
- Highlighted issues
  (e.g., distortions, discomfort, suboptimal correction)
- Recommendations for further optometric consultation

FIG. 26C

METHODS AND SYSTEMS FOR VISUAL FIELD TESTING USING DYNAMIC LIGHT POINT GRIDS IN VIRTUAL REALITY

TECHNICAL FIELD

The present inventions relate to vision test technology. More specifically, methods, systems, devices, and non-statutory computer-readable storage media are applied to implement vision testing in an extended reality environment.

BACKGROUND

Traditional visual assessment methods have been the cornerstone of evaluating eye health and vision for many years. These methods are typically conducted in clinical environments, where specialized equipment and standardized procedures are used to ensure accurate and reliable results. The parameters for these assessments are generally fixed, reflecting the controlled nature of the clinical setting.

Over time, these techniques have become the accepted standard for diagnosing and monitoring visual conditions, forming the basis of routine eye care practices in medical offices, hospitals, and specialized eye care facilities. Despite their widespread use, these methods have traditionally been limited to professional settings, where they can be conducted under the supervision of trained healthcare providers using dedicated equipment.

SUMMARY

The present disclosure relates to innovative methods and systems that can revolutionize vision care, making vision testing and other exams more accessible and affordable for patients. Additionally, it is contemplated that the principles and features of the present disclosure can be implemented in numerous other applications of display technology, including headsets, heads-up displays, and other micro-displays (e.g., microLED and microOLED) to address challenges and limitations inherent in such products and their uses.

In accordance with at least some embodiments disclosed herein is the realization that traditional methods for visual assessment do not allow for dynamic adjustment of test parameters, leading to less accurate assessments, nor can they be implemented to test eyes and vision at home using household devices in a consistent and environment-locked manner.

Some embodiments are directed to a method of implementing a virtual vision test at an electronic device including a head-mounted display (HMD) and a camera. The method includes executing a user application configured to enable the virtual vision test; generating a virtual reality (VR) user interface corresponding to a three-dimensional (3D) virtual environment; focusing the camera on an eye area of a user wearing the electronic device; displaying, on the user interface, a visual stimulus corresponding to the virtual vision test; while displaying the visual stimulus, in real time, capturing a sequence of eye images using the camera of the electronic device; determining eye movement information including a temporal sequence of eyeball positions based on the sequence of eye images; and comparing the visual stimulus and the eye movement information to determine an eye health condition.

In some embodiments, a user application can be implemented by a head-mounted display configured to create a customized extended reality (XR) environment for a user engaged on an XR information platform. Products may be rendered for the user in a three-dimension format in the XR environment, thereby facilitating eyewear selection and fitting. The XR can be an umbrella term encapsulating Augmented Reality (AR), Virtual Reality (VR), Mixed Reality (MR), and everything in between. In this application, any embodiments that apply a VR system can be implemented using an AR or MR system as well.

Some embodiments are directed to a method of implementing a virtual eye test for peripheral vision. The method is performed at an electronic device including a head-mounted display and a camera. The method includes generating a virtual reality (VR) user interface corresponding to a three-dimensional virtual environment. The method also includes rendering the VR user interface on the HMD. The method also includes simulating one or more spatial task scenarios in the VR user interface. The method also includes, while simulating the one or more spatial task scenarios, in real time: continuously tracking, using the camera, gaze direction and peripheral responses in response to one or more visual stimuli presented in the one or more spatial task scenarios; and evaluating the gaze direction and peripheral responses for peripheral vision performance.

Some embodiments are directed to a method of implementing a virtual eye test for assessing visual field loss with interactive visual maps. The method is performed at an electronic device including a head-mounted display and a camera. The method includes generating a virtual reality (VR) user interface corresponding to a three-dimensional virtual environment. The method also includes rendering the VR user interface on the HMD. The method also includes simulating one or more interactive visual map scenarios in the VR user interface. The method also includes, while simulating the one or more interactive visual map scenarios, in real time: continuously tracking, using the camera, gaze direction and responses in response to one or more stimuli appearing at a plurality of locations within a visual field; and analyzing the gaze direction and responses to map out areas of visual field loss.

Some embodiments are directed to a method of implementing a virtual eye test for assessing ocular health by analyzing user interaction with multidimensional shapes. The method is performed at an electronic device including a head-mounted display and a camera. The method includes generating a virtual reality (VR) user interface corresponding to a three-dimensional virtual environment. The method also includes rendering the VR user interface on the HMD. The method also includes simulating one or more test scenarios with multidimensional shapes in the VR user interface. The method also includes, while simulating the one or more test scenarios, in real time: continuously tracking, using the camera, eye movements in response to one or more stimuli appearing at a plurality of locations within a visual field; and analyzing user interaction with the multidimensional shapes for assessing ocular health, based on the eye movements.

Some embodiments are directed to a method of implementing a virtual eye test for visual field testing using a grid of light points. The method is performed at an electronic device including a head-mounted display and a camera. The method includes generating a virtual reality (VR) user interface corresponding to a three-dimensional virtual environment. The method also includes rendering the VR user interface on the HMD. The method also includes simulating one or more test scenarios with a dynamic grid of light points in the VR user interface. The method also includes, while simulating the one or more test scenarios, in real time: continuously tracking, using the camera, eye movements in response to one or more visual stimuli presented in the one or more test scenarios; and analyzing detection and identification of light points for assessing visual detection across a visual field, based on the eye movements.

Some embodiments are directed to a method of implementing a virtual eye test for testing peripheral vision through a progressive narrowing field of view. The method is performed at an electronic device including a head-mounted display and a camera. The method includes generating a virtual reality (VR) user interface corresponding to a three-dimensional virtual environment. The method also includes rendering the VR user interface on the HMD. The method also includes simulating one or more test scenarios with a progressively narrowing field of view in the VR user interface. The method also includes, while simulating the one or more test scenarios, in real time: continuously tracking, using the camera, gaze direction and fixation points in response to one or more visual stimuli presented in the one or more test scenarios; and assessing peripheral vision across a visual field, based on the gaze direction and fixation points.

Some embodiments are directed to a method of implementing a virtual eye test for binocular vision. The method is performed at an electronic device including a head-mounted display and a camera. The method includes generating a virtual reality (VR) user interface corresponding to a three-dimensional virtual environment. The method also includes rendering the VR user interface on the HMD. The method also includes simulating one or more real-world scenarios in the VR user interface. The method also includes, while simulating the one or more real-world scenarios, in real time: continuously tracking, using the camera, gaze direction, convergence and divergence in response to one or more visual stimuli presented in the one or more test scenarios; and assessing depth perception, stereopsis and eye coordination for binocular vision based on the gaze direction, convergence and divergence.

Some embodiments are directed to a method of implementing a virtual eye test for testing effects of prescription glasses. The method is performed at an electronic device including a head-mounted display and a camera. The method includes generating a virtual reality (VR) user interface corresponding to a three-dimensional virtual environment. The method also includes rendering the VR user interface on the HMD. The method also includes simulating one or more test scenarios with visual corrections in the VR user interface. The method also includes, while simulating the one or more test scenarios, in real time: continuously tracking, using the camera, gaze direction, focus adjustments and visual clarity in response to one or more visual stimuli presented in the one or more test scenarios; and evaluating visual acuity, field of view, and comfort level with each prescription, based on the gaze direction, focus adjustments and visual clarity.

Some embodiments are directed to a system for implementing a virtual vision test. The system includes a head-mounted display including a display, one or more lenses, and one or more cameras. The system also includes one or more processors and memory. The memory stores one or more programs configured to be executed by the one or more processors. The one or more programs include instructions for a user interface module configured to generate a virtual reality (VR) user interface corresponding to a three-dimensional virtual environment. The one or more programs include instructions for a rendering module configured to render the VR user interface on the HMD, integrating VR user interface elements with the three-dimensional virtual environment. The one or more programs include instructions for a simulation module configured to simulate one or more spatial task scenarios in the VR user interface, including generating and managing environments that require spatial reasoning and navigation skills. The one or more programs include instructions for a tracking module configured to continuously track, using at least one of the one or more cameras, gaze direction and peripheral responses to one or more stimuli presented in the one or more spatial task scenarios at high frequencies, monitor gaze direction and responses to one or more stimuli appearing at multiple locations within the visual field, and/or track eye movements in response to one or more visual stimuli presented in various test scenarios, including scenarios with multidimensional shapes and dynamic grids of light points. The one or more programs include instructions for an evaluation module configured to evaluate peripheral vision performance based on the gaze direction and peripheral responses, analyze gaze direction and responses to map out areas of visual field loss, analyze user interaction with multidimensional shapes for assessing ocular health, based on the eye movements, analyze detection and identification of light points for assessing visual detection across a visual field, based on the eye movements, and/or assess depth perception, stereopsis, and eye coordination for binocular vision based on the gaze direction, convergence and divergence.

In another aspect, a non-transitory computer readable storage medium is provided, according to some embodiments. The medium stores one or more programs for execution by one or more processors of a computer system, the one or more programs including instructions for performing any of the methods described herein.

In another aspect, an electronic device is provided, according to some embodiments. The electronic device includes an HMD, a camera, one or more processors, and memory for storing one or more programs for execution by the one or more processors, the one or more programs including instructions for performing any of the methods described herein.

Additional features and advantages of the subject technology will be set forth in the description below, and in part will be apparent from the description, or may be learned by practice of the subject technology. The advantages of the subject technology will be realized and attained by the structure particularly pointed out in the written description and embodiments hereof as well as the appended drawings.

It is to be understood that both the foregoing general description and the following detailed description are exemplary and explanatory and are intended to provide further explanation of the subject technology.

BRIEF DESCRIPTION OF THE FIGURES

Various features of illustrative embodiments of the inventions are described below with reference to the drawings. The illustrated embodiments are intended to illustrate, but not to limit, the inventions.

FIG. 3 is a block diagram of a computer system (e.g., including a headset device) configured to implement vision assessment or eyewear fitting, in accordance with some embodiments.

FIGS. 8A-8D include four diagrams of example graphical user interfaces rendered to determine a visual acuity score in a virtual environment created by a headset device, in accordance with some embodiments.

FIGS. 9A-9C include three diagrams of example graphical user interfaces rendered to determine a nearsighted or farsighted power in a virtual environment created by a headset device, in accordance with some embodiments.

FIGS. 10A-10F include six diagrams of example graphical user interfaces rendered to determine eye stigmatism in a virtual environment created by a headset device, in accordance with some embodiments.

FIGS. 11A-11C are diagrams showing an example vision test system, in accordance with some embodiments.

FIGS. 12A-12E show a flow diagram of an example process for implementing a virtual eye test for peripheral vision, according to some embodiments.

FIGS. 13A-13F show a flow diagram of an example process for implementing a virtual eye test for assessing visual field loss with interactive visual maps, according to some embodiments.

FIGS. 14A-14E show a flow diagram of an example process for implementing a virtual eye test for assessing ocular health by analyzing user interaction with multidimensional shapes, according to some embodiments.

FIGS. 15A-15E show a flow diagram of an example process for implementing a virtual eye test for visual field, according to some embodiments.

FIGS. 16A-16D show a flow diagram of an example process for testing peripheral vision through a progressively narrowing field of view, according to some embodiments.

FIGS. 17A-17E show a flow diagram of an example process for binocular vision, according to some embodiments.

FIGS. 18A-18D show a flow diagram of an example process for implementing a virtual eye test for testing effects of prescription glasses, according to some embodiments.

FIG. 20B is a block diagram of example components for VR peripheral vision test with spatial tasks, according to some embodiments.

FIG. 21B is a block diagram of example components for VR visual field loss assessment with interactive maps, according to some embodiments.

FIGS. 22A and 22B show example visual scenarios for VR ocular health assessment, according to some embodiments.

FIG. 22C is a block diagram of example components for VR ocular health assessment, according to some embodiments.

FIG. 23C is a block diagram of example components for VR ocular health assessment, according to some embodiments.

FIGS. 24A and 24B show example visual scenarios for VR system for testing peripheral vision through a progressively narrowing field of view, according to some embodiments.

FIG. 24C is a block diagram of example components for VR system for testing peripheral vision through a progressively narrowing field of view, according to some embodiments.

FIG. 25B is a block diagram of example components for VR system for testing binocular vision with 3D objects in naturalistic environments, according to some embodiments.

FIG. 26C is a block diagram of example components for VR system for simulating and assessing effects of prescription glasses on diverse visual fields, according to some embodiments.

DETAILED DESCRIPTION

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Figure 1:
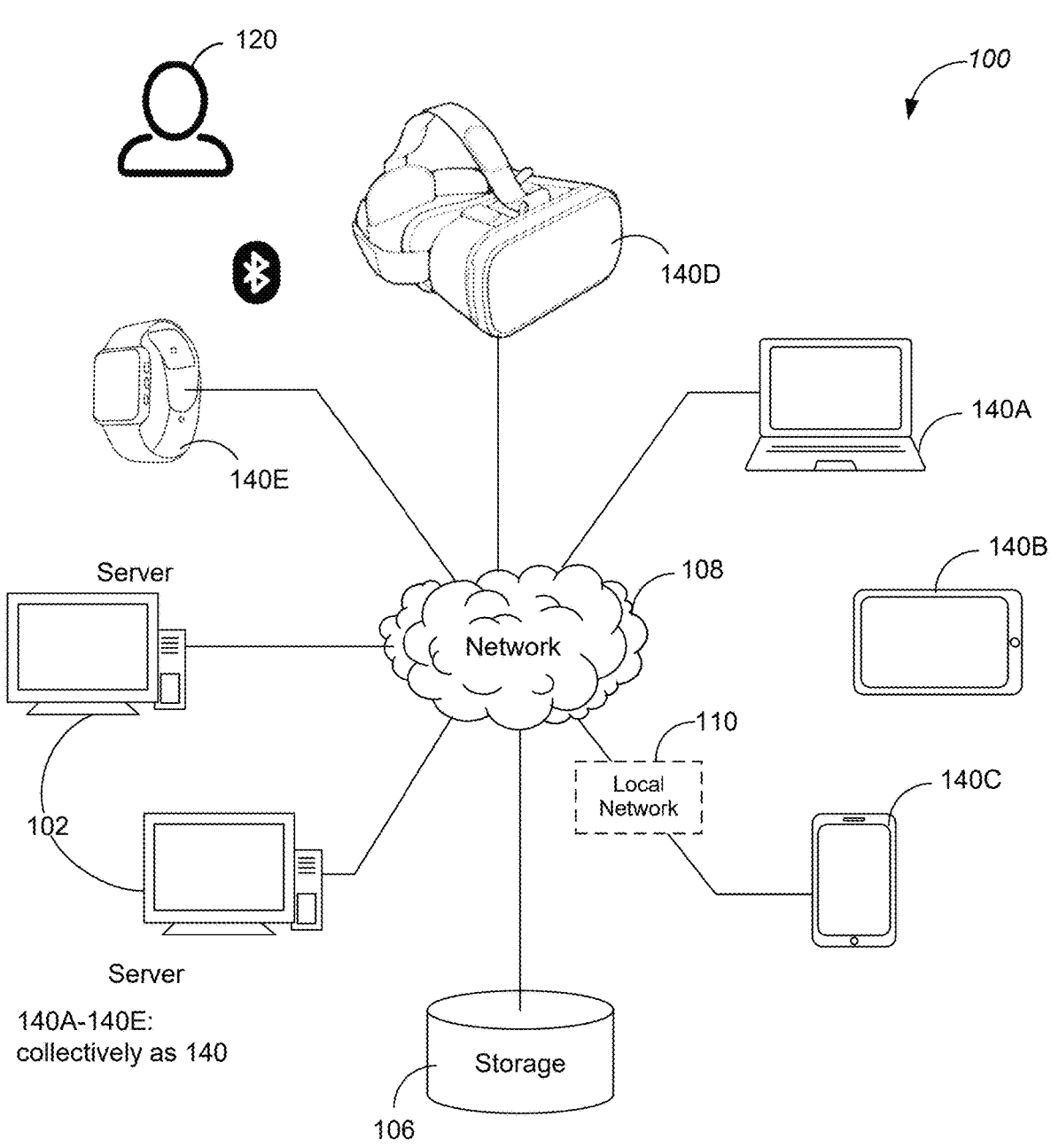
FIG. 1 is an example data processing environment having one or more servers communicatively coupled to one or more computer devices (e.g. includes an headset device), in accordance with some embodiments.

FIG. 1 is an example data processing environment 100 having one or more servers 102 communicatively coupled to one or more computer devices 140 (e.g. includes an headset device 140D), in accordance with some embodiments. The one or more computer devices 140 are electronic devices having computational capabilities, and may be, for example, desktop computers 140A, tablet computers 140B, mobile phones 140C, or intelligent, multi-sensing, network-connected home devices (e.g., a depth camera, a visible light camera). In some embodiments, the one or more computer devices 140 include a headset device 140D (also called a head-mounted display 140D) configured to render extended reality content. In some embodiments, the one or more computer devices 140 include a wireless wearable device 140E (e.g., a smart watch, a fitness band) configured to track health data (e.g., heart rate, quality of sleep) and activity data (e.g., steps walked, stairs climbed) of a user wearing the device 140E. Each computer device 140 can collect data or user inputs, executes user applications, and present outputs on its user interface. The collected data or user inputs can be processed locally at the computer device 140 and/or remotely by the server(s) 102. The one or more servers 102 provides system data (e.g., boot files, operating system images, and user applications) to the computer devices 140, and in some embodiments, processes the data and user inputs received from the computer device(s) 140 when the user applications are executed on the computer devices 140. In some embodiments, the data processing environment 100 further includes a storage 106 for storing data related to the servers 102, computer devices 140, and applications executed on the computer devices 140. For example, storage 106 may store video content, static visual content, and/or audio data.

The one or more servers 102 can enable real-time data communication with the computer devices 140 that can be remote from each other or from the one or more servers 102. Further, in some embodiments, the one or more servers 102 can implement data processing tasks that are not completed locally by the computer devices 140.

For example, the computer devices 140 include a game console (e.g., the headset device 140D) that executes an interactive online gaming application. The game console receives a user instruction and sends it to a game server 102 with user data. The game server 102 generates a stream of video data based on the user instruction and user data, and provides the stream of video data for display on the game console and other computer devices that can be engaged in the same game session with the game console.

The one or more servers 102, one or more computer devices 140, and storage 106 can be communicatively coupled to each other via one or more communication networks 108, which are the medium used to provide communications links between these devices and computers connected together within the data processing environment 100. The one or more communication networks 108 may include connections, such as wire, wireless communication links, or fiber optic cables. Examples of the one or more communication networks 108 include local area networks (LAN), wide area networks (WAN) such as the Internet, or a combination thereof. The one or more communication networks 108 are, optionally, implemented using any known network protocol includes various wired or wireless protocols, such as Ethernet, Universal Serial Bus (USB), FIRE-WIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol. A connection to the one or more communication networks 108 may be established either directly (e.g., using 1G/4G connectivity to a wireless carrier), or through a network interface 110 (e.g., a router, switch, gateway, hub, or an intelligent, dedicated whole-home control node), or through any combination thereof. As such, the one or more communication networks 108 can represent the Internet of a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other electronic systems that route data and messages.

In some embodiments, the headset device 140D can be communicatively coupled to a data processing environment 100. The headset device 140D includes one or more cameras (e.g., a visible light camera, a depth camera), a microphone, a speaker, one or more inertial sensors (e.g., gyroscope, accelerometer), and a display. In some situations, the camera captures hand gestures of a user wearing the headset device 140D. In some situations, the microphone records ambient sound includes user's voice commands.

In some embodiments, the headset device 140D is communicatively coupled to one or more servers 102, and enables a centralized vision test management platform with the one or more servers 102. This vision test management platform may aggregate data (e.g., one or more visual stimuli 338, sensor data 342, vision test results 344) from a plurality of user accounts associated with a plurality of users, analyze the aggregated data, and track vision health trends for individual users or user groups. In some embodiments, data are communicated between a headset device 140D and a server 102 in an encrypted format. In some embodiments, the vision test management platform is coupled to a global health database storing epidemiological data, and configured to cross-reference the data collected from its user accounts with the epidemiological data to identify an emerging pattern and a public health concern.

For example, a teenager's vision data was collected and analyzed during an extended duration of time (e.g., 10 years) to identify an individual vision development trend, and cross-referenced with an average vision development trend extracted from the global health database. A doctor can rely on a cross-referencing result to determine whether the individual vision development trend is normal or whether the teenager's eyesight drops faster than average teenagers. As such, various embodiments of the vision test management platform integrates biometric data and global health analytics and provides a secure, personalized, and interactive environment for vision testing, which improves precision and user experience of vision assessments and contributes to broader public health monitoring and research initiatives.

Figure 2:
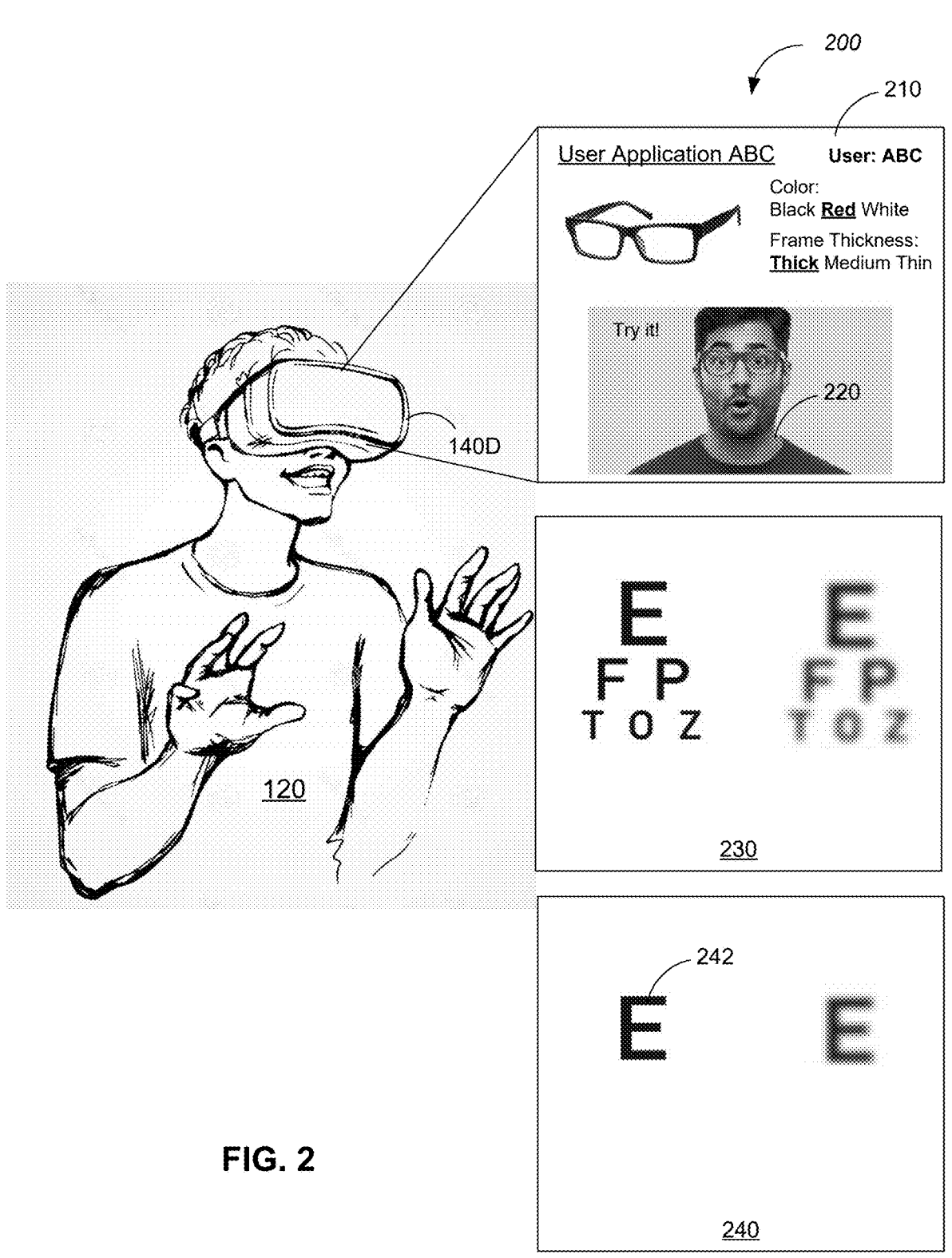
FIG. 2 is an environment in which a computer device (e.g., a headset device) is applied to facilitate visual assessment or eyewear fitting, in accordance with some embodiments.

FIG. 2 is an environment 200 in which a computer device 140 (e.g., a headset device 140D) is applied to facilitate visual assessment or eyewear fitting, in accordance with some embodiments. The XR headset device 140D may be communicatively coupled within the data processing environment 100. The XR headset device 140D may include one or more cameras (e.g., a visible light camera, a depth camera), a microphone, a speaker, one or more inertial sensors (e.g., gyroscope, accelerometer), and a display. In some situations, the camera captures hand gestures of a user wearing the XR headset device 140D. In some situations, the microphone records ambient sound includes user's voice commands. The XR headset device 140D may execute a client-side eyewear fitting application 326 or a client-side visual assessment application 328 (FIG. 3) via a user account associated with a user 120 (e.g., an optometrist user, an optician user, a patient user). In some embodiments, a computer device 140 (e.g., a mobile phone 140C) distinct from the XR headset device 140D can be used to implement the client-side eyewear fitting application 326 or visual assessment application 328 (FIG. 3).

In some embodiments, a first user interface 210 can be displayed on a computer device 140 (e.g., the headset device 140D) associated with the user 120. In some embodiments, an eyewear can be tried on or displayed as being worn by a 2D or 3D image 220 of the user 120. The server 102 or computer device 140 receives, from the first user interface 210, a user feedback message indicating an issue, requesting further improvement, or confirming a fit. In some embodiments, a second user interface 230 can be displayed on a computer device 140 associated with the user 120. The second user interface 230 includes a plurality of optotypes (e.g., six optotypes E, F, P, T, O, and Z) having different sizes. In some embodiments, a third user interface 240 can be displayed on a computer device 140 associated with the user 120. The second user interface 230 can display a temporal sequence of optotypes having respective sizes. Each optotype of a corresponding size can be displayed at one time.

FIG. 3 is a block diagram of a computer system 300 (e.g., including a headset device 140D, a server, or a combination thereof) configured to implement vision assessment or eyewear fitting, in accordance with some embodiments. The computer system 300 typically, includes one or more processing units (CPUs) 302, one or more network interfaces 304, memory 306, and one or more communication buses 308 for interconnecting these components (sometimes called a chipset). The computer system 300 includes one or more input devices 310 that facilitate user input, such as a keyboard, a mouse, a voice-command input unit or microphone, a touch screen display, a touch-sensitive input pad, a gesture capturing camera, or other input buttons or controls. Furthermore, in some embodiments, the computer device 140 of the computer system 300 uses a microphone for voice recognition or an eye tracking camera 366 for tracking eyeball movement. In some embodiments, the computer device 140 includes one or more optical cameras (e.g., an RGB camera), scanners, or photo sensor units for capturing images. The computer system 300 also includes one or more output devices 312 that enable presentation of user interfaces 210 and display content includes one or more speakers and/or one or more visual displays.

The computer system 300 includes one or more sensors 360, which further includes one or more of: a plurality of electrodes 362, one or more depth sensing sensors 364, one or more eye tracking cameras 366, a biometric sensor array 368, one or more infrared sensors 370, one or more ultra-sonic sensors 372, one or more ambient sensors 374, one or more motion sensors (e.g., six degree of freedom (6DOF) position and motion sensors 376, one or more outward camera 378, and one or more directional microphones 380. It is noted that the one or more sensors 360 are also included in the input device 310 and used to collect data to the computer system 300.

Memory 306 includes high-speed random-access memory, such as DRAM, SRAM, DDR RAM, or other random-access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some embodiments, memory 306, or the non-transitory computer readable storage medium of memory 306, stores the following programs, modules, and data structures, or a subset or superset thereof:

Operating system 314 including procedures for handling various basic system services and for performing hard-ware dependent tasks;

Network communication module 316 for connecting each server 102 or computer device 140 to other devices (e.g., server 102, computer device 140, or storage 106) via one or more network interfaces 304 (wired or wireless) and one or more communication networks 108, such as the Internet, other wide area networks, local area networks, metropolitan area networks, and so on;

User interface module 318 for enabling presentation of information (e.g., a graphical user interface for appli-cation(s) 324, widgets, websites and web pages thereof, and/or games, audio and/or video content, text, etc.) at each computer device 140 via one or more output devices 312 (e.g., displays, speakers, etc.);

Input processing module 320 for detecting one or more user inputs or interactions from one of the one or more input devices 310 and interpreting the detected input or interaction;

Web browser module 322 for navigating, requesting (e.g., via HTTP), and displaying websites and web pages thereof includes a web interface for logging into a user account associated with a computer device 140 or another electronic device, controlling the computer device if associated with the user account, and editing and reviewing settings and data that are associated with the user account;

One or more user applications 324 for execution by the computer system 300 (e.g., games, social network applications, smart home applications, extended reality application, and/or other web or non-web-based appli-cations for controlling another electronic device and reviewing data captured by such devices), where in some embodiments, an eyewear fitting application 326 can be executed to implement eyewear fitting, and has a plurality of user accounts associated with a plurality of users 120 (e.g., technician users and eyewear users), and in some embodiments, a visual assessment appli-cation 328 can be executed to evaluate eyesight of a patient user, and has a plurality of user accounts asso-ciated with a plurality of users 120 (e.g., an optometrist user, a patient user);

Data processing module 330 for processing data associ-ated with the user applications 324, e.g., using machine learning models 350;

Model training Module 332 for obtaining training data 346 and training machine learning models 350; and One or more databases 340 for storing at least data including one or more of:

Device settings 334 including common device settings (e.g., service tier, device model, storage capacity, processing capabilities, communication capabilities, etc.) of the computer system 300;

User account information 336 for the one or more user applications 324, e.g., user names, security questions, account history data, user preferences, and predefined account settings, where in some embodiments, the user account information 336 includes facial measurements and one or more virtual fitting parameters associated with associated with a user account of an eye fitting application 326, and in some embodiments, the user account information 336 includes one or more visual stimuli 338, sensor data 342, and vision test results 344 associated with a user account of a visual assessment application 328; and Machine learning models 350 including parameters (e.g., weights, biases) used to implement vision test or select eyewear for eyewear users.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise rearranged in various embodiments. In some embodiments, memory 306, optionally, stores a subset of the modules and data structures identified above. Furthermore, memory 306, optionally, stores additional modules and data structures not described above.

Figure 4:
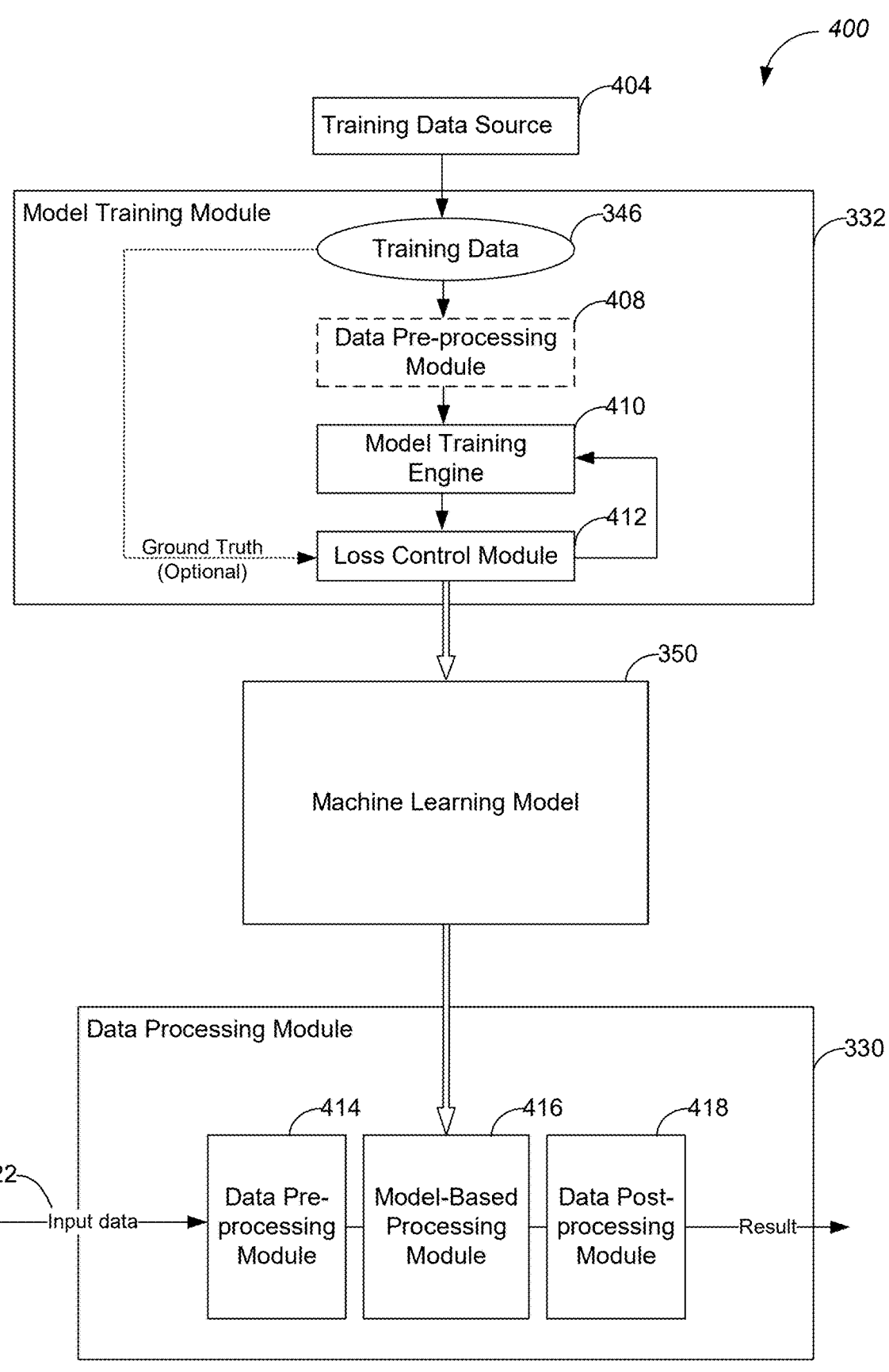
FIG. 4 is a block diagram of a machine learning system for training and applying machine learning models (e.g., for glass making), in accordance with some embodiments.

FIG. 4 is a block diagram of a machine learning system 400 for training and applying machine learning models 350 (e.g., for glass making), in accordance with some embodiments. The machine learning system 400 includes a model training module 332 establishing one or more machine learning models 350 and a data processing module 330 for processing input data 422 using the machine learning model 350. In some embodiments, both the model training module 332 and the data processing module 330 are located within a computer device 140 (e.g., a VR headset), while a training data source 404 provides training data 346 to the computer device 140. In some embodiments, the training data source 404 is the data obtained from the computer device 140 itself, from a server 102, from storage 106, or from another electronic device or computer device 140. Alternatively, in some embodiments, the model training module 332 is located at a server 102, and the data processing module 330 is located in a computer device 140. The server 102 trains the machine learning model 350 and provides the trained models 350 to the computer device 140 to process real-time input data 422 detected by the computer device 140. In some embodiments, the training data 346 provided by the training data source 404 include a standard dataset widely used to train machine learning models 350. The input data 422 further includes sensor data. Further, in some embodiments, a subset of the training data 346 is modified to augment the training data 346. The subset of modified training data is used in place of or jointly with the subset of training data 346 to train the machine learning models 350.

In some embodiments, the model training module 332 includes a model training engine 410, and a loss control module 412. Each machine learning model 350 is trained by the model training engine 410 to process corresponding input data 422 to implement a respective task. Specifically, the model training engine 410 receives the training data 346 corresponding to a machine learning model 350 to be trained, and processes the training data to build the machine learning model 350. In some embodiments, during this process, the loss control module 412 monitors a loss function comparing the output associated with the respective training data item to a ground truth of the respective training data item. In these embodiments, the model training engine 410 modifies the machine learning models 350 to reduce the loss, until the loss function satisfies a loss criteria (e.g., a comparison result of the loss function is minimized or reduced below a loss threshold). The machine learning models 350 are thereby trained and provided to the data processing module 330 of a computer device 140 to process real-time input data 422 from the computer device 140.

In some embodiments, the model training module 402 further includes a data pre-processing module 408 configured to pre-process the training data 346 before the training data 346 is used by the model training engine 410 to train a machine learning model 350.

For example, an image pre-processing module 408 is configured to format patients' eye images in the training data 346 into a predefined image format. For example, the preprocessing module 408 may normalize the images to a fixed size, resolution, or contrast level. In another example, an image pre-processing module 408 extracts a region of interest (ROI) corresponding to an eye area.

In some embodiments, the model training module 332 uses supervised learning in which the training data 346 is labelled and includes a desired output for each training data item (also called the ground truth in some situations). In some embodiments, the desirable output is labelled manually by people or labelled automatically by the model training model 332 before training. In some embodiments, the model training module 332 uses unsupervised learning in which the training data 346 is not labelled. The model training module 332 is configured to identify previously undetected patterns in the training data 346 without pre-existing labels and with little or no human supervision. Additionally, in some embodiments, the model training module 332 uses partially supervised learning in which the training data is partially labelled.

In some embodiments, the data processing module 330 includes a data pre-processing module 414, a model-based processing module 416, and a data post-processing module 418. The data pre-processing modules 414 pre-processes input data 422 based on the type of the input data 422. In some embodiments, functions of the data pre-processing modules 414 are consistent with those of the pre-processing module 408, and convert the input data 422 into a predefined data format that is suitable for the inputs of the model-based processing module 416. The model-based processing module 416 applies the trained machine learning model 350 provided by the model training module 332 to process the pre-processed input data 422. In some embodiments, the model-based processing module 416 also monitors an error indicator to determine whether the input data 422 has been properly processed in the machine learning model 350. In some embodiments, the processed input data is further processed by the data post-processing module 418 to create a preferred format or to provide additional information that can be derived from the processed input data. The data processing module 330 uses the processed input data to make eyewear glasses for a patient user.

Examples of the machine learning model 350 include, but are not limited to, an eye trajectory model, an eye position model, an ocular microtremor model, a response analysis model, a response analysis model, a biomedical data model, and medical information models.

Figures 5A, 5B:
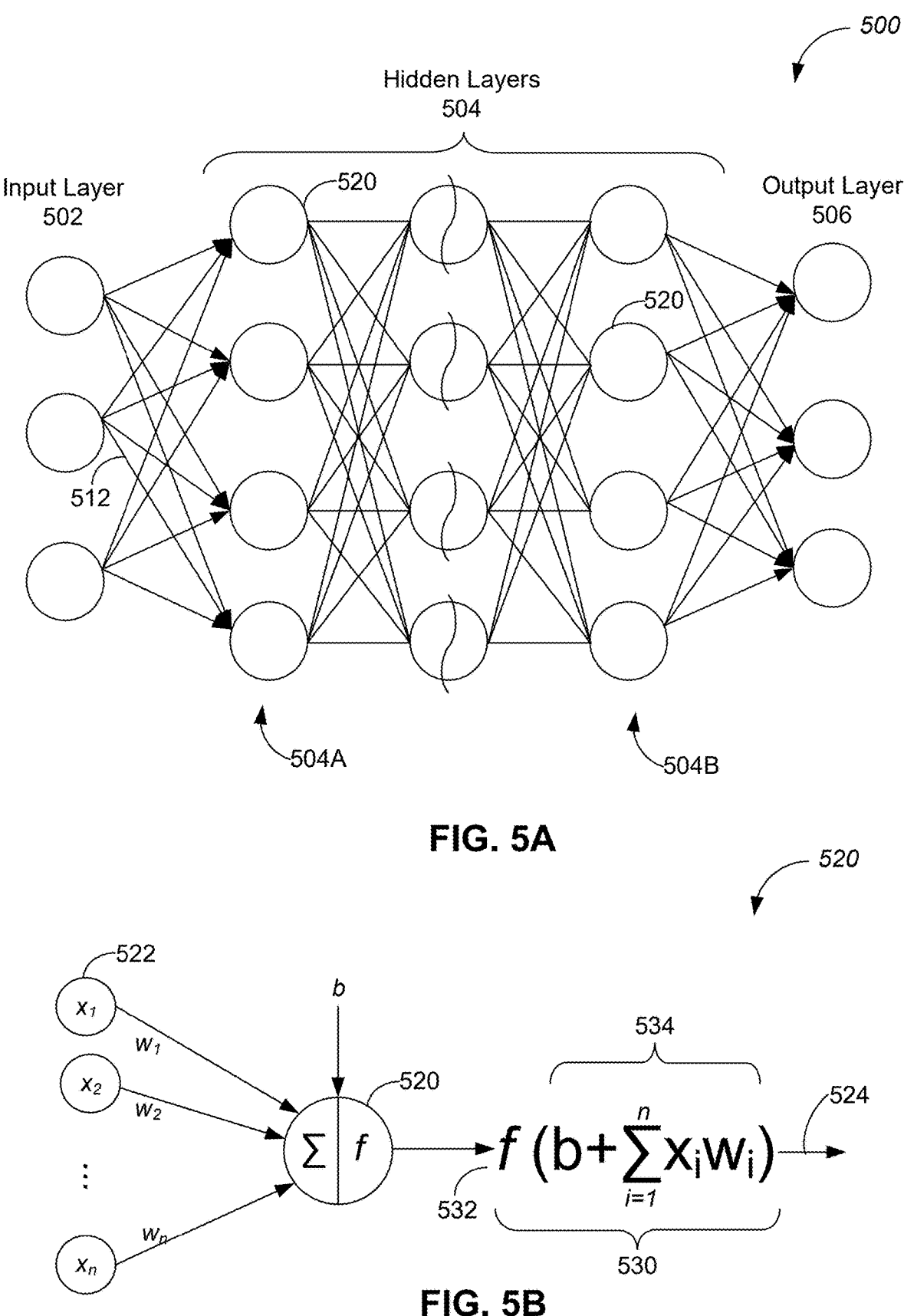
FIG. 5A is a structural diagram of an example neural network applied to process input data in a machine learning model, in accordance with some embodiments.
FIG. 5B is an example node in the neural network, in accordance with some embodiments.

FIG. 5A is a structural diagram of an example neural network 500 applied to process input data in a machine learning model 350, in accordance with some embodiments, and FIG. 5B is an example node 520 in the neural network 500, in accordance with some embodiments. It should be noted that this description is used as an example only, and other types or configurations may be used to implement the embodiments described herein. The machine learning model 350 is established based on the neural network 500. A corresponding model-based processing module 416 applies the machine learning model 350 including the neural network 500 to process input data 422 that has been converted to a predefined data format. The neural network 500 includes a collection of nodes 520 that are connected by links 512. Each node 520 receives one or more node inputs 522 and applies a propagation function 530 to generate a node output 524 from the one or more node inputs. As the node output 524 is provided via one or more links 512 to one or more other nodes 520, a weight w associated with each link 512 is applied to the node output 524. Likewise, the one or more node inputs 522 are combined based on corresponding weights $w_1$, $w_2$, $w_3$, and $w_4$ according to the propagation function 530. In an example, the propagation function 530 is computed by applying a non-linear activation function 532 to a linear weighted combination 534 of the one or more node inputs 522.

The collection of nodes 520 is organized into layers in the neural network 500. In general, the layers include an input layer 502 for receiving inputs, an output layer 506 for providing outputs, and one or more hidden layers 504 (e.g., layers 504A and 504B) between the input layer 502 and the output layer 506. A deep neural network has more than one hidden layer 504 between the input layer 502 and the output layer 506. In the neural network 500, each layer is only connected with its immediately preceding and/or immediately following layer. In some embodiments, a layer is a "fully connected" layer because each node in the layer is connected to every node in its immediately following layer. In some embodiments, a hidden layer 504 includes two or more nodes that are connected to the same node in its immediately following layer for down sampling or pooling the two or more nodes. In particular, max pooling uses a maximum value of the two or more nodes in the layer for generating the node of the immediately following layer.

In some embodiments, a convolutional neural network (CNN) is applied in a machine learning model 350 to process input data. The CNN employs convolution operations and belongs to a class of deep neural networks. The hidden layers 504 of the CNN include convolutional layers. Each node in a convolutional layer receives inputs from a receptive area associated with a previous layer (e.g., nine nodes). Each convolution layer uses a kernel to combine pixels in a respective area to generate outputs.

For example, the kernel may be to a 3×3 matrix including weights applied to combine the pixels in the respective area surrounding each pixel. Video or image data is pre-processed to a predefined video/image format corresponding to the inputs of the CNN. In some embodiments, the pre-processed video or image data is abstracted by the CNN layers to form a respective feature map. In this way, video and image data can be processed by the CNN for video and image recognition or object detection.

In some embodiments, a recurrent neural network (RNN) is applied in the machine learning model 350 to process input data 422. Nodes in successive layers of the RNN follow a temporal sequence, such that the RNN exhibits a temporal dynamic behavior. In an example, each node 520 of the RNN has a time-varying real-valued activation. It is noted that in some embodiments, two or more types of input data are processed by the data processing module 330, and two or more types of neural networks (e.g., both a CNN and an RNN) are applied in the same machine learning model 350 to process the input data jointly.

The training process is a process for calibrating all of the weights wi for each layer of the neural network 500 using training data 346 that is provided in the input layer 502. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propagation, a margin of error of the output (e.g., a loss function) is measured (e.g., by a loss control module 412), and the weights are adjusted accordingly to decrease the error. The activation function 532 can be linear, rectified linear, sigmoidal, hyperbolic tangent, or other types. In some embodiments, a network bias term b is added to the sum of the weighted outputs 534 from the previous layer before the activation function 532 is applied. The network bias b provides a perturbation that helps the neural network 500 avoid over fitting the training data. In some embodiments, the result of the training includes a network bias parameter b for each layer.

Figure 6A:
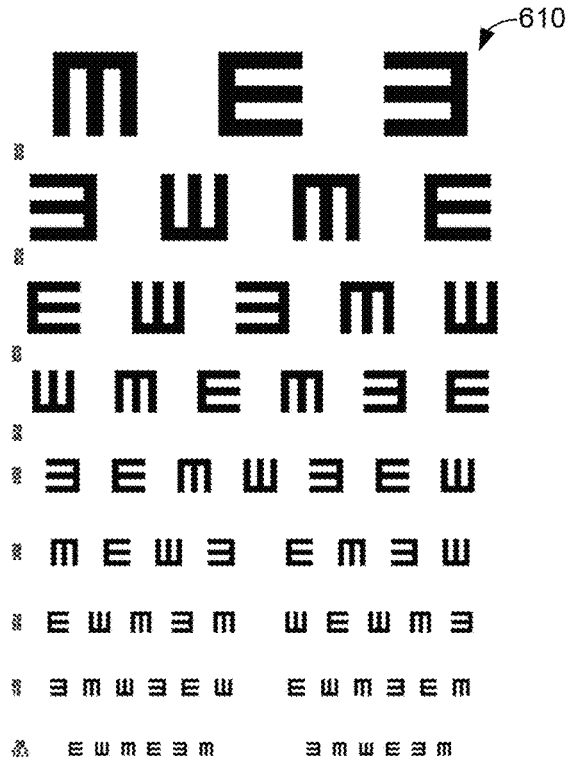
FIG. 6A is an example "tumbling E" chart applied in a visual acuity test.
Figure 6B:
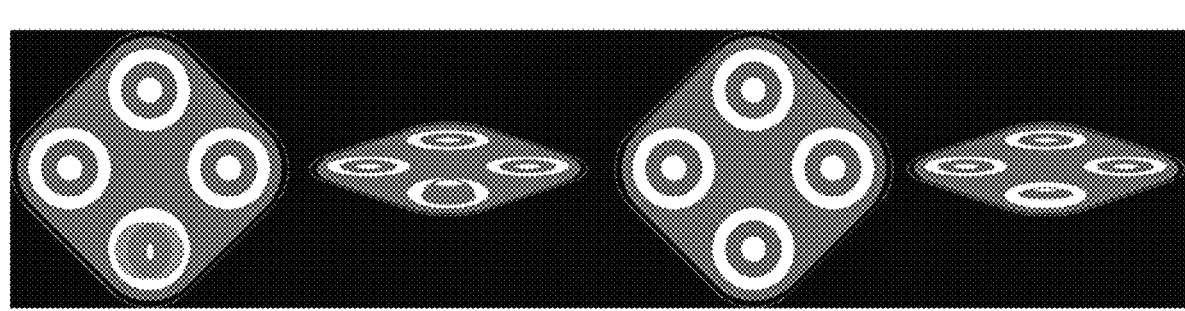
FIGS. 6B-6E are example patterns applied in an astigmatism test, a stereopsis test, a visual field test, and a color blindness test, in accordance with some embodiments.
Figure 6C:
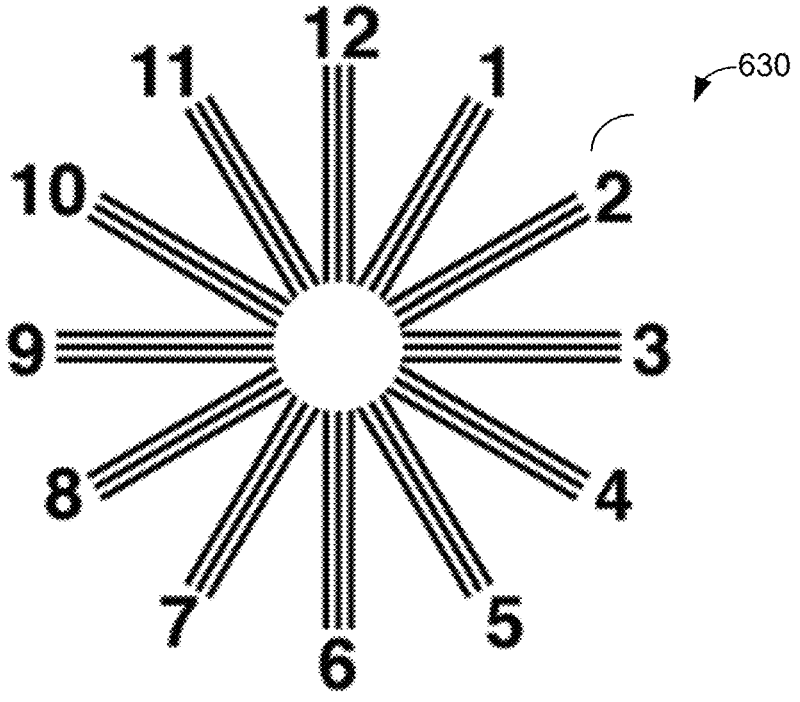
Figure 6D:
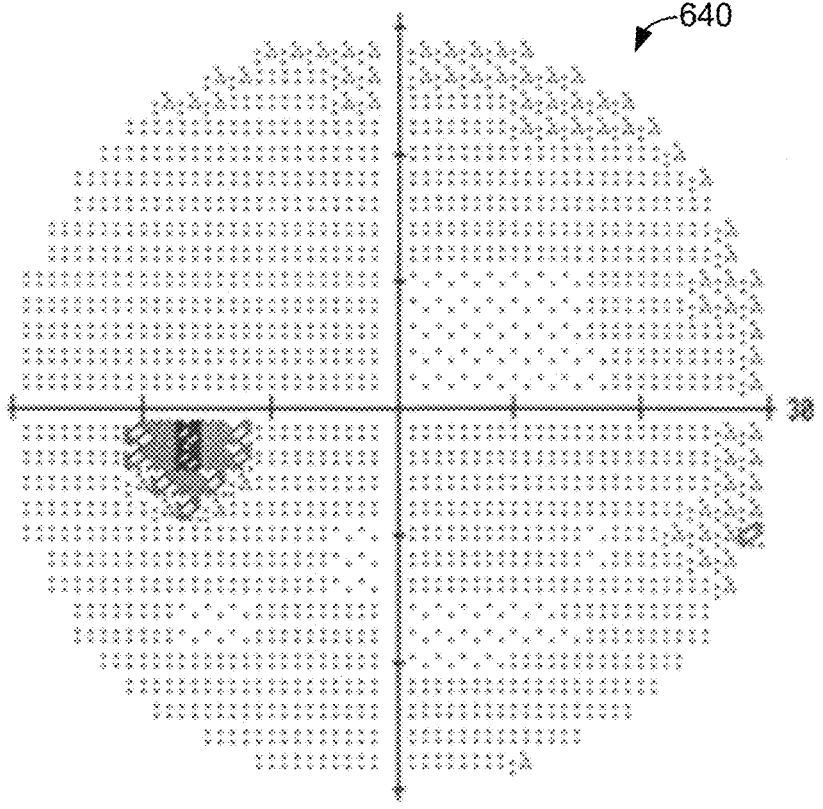
Figure 6E:
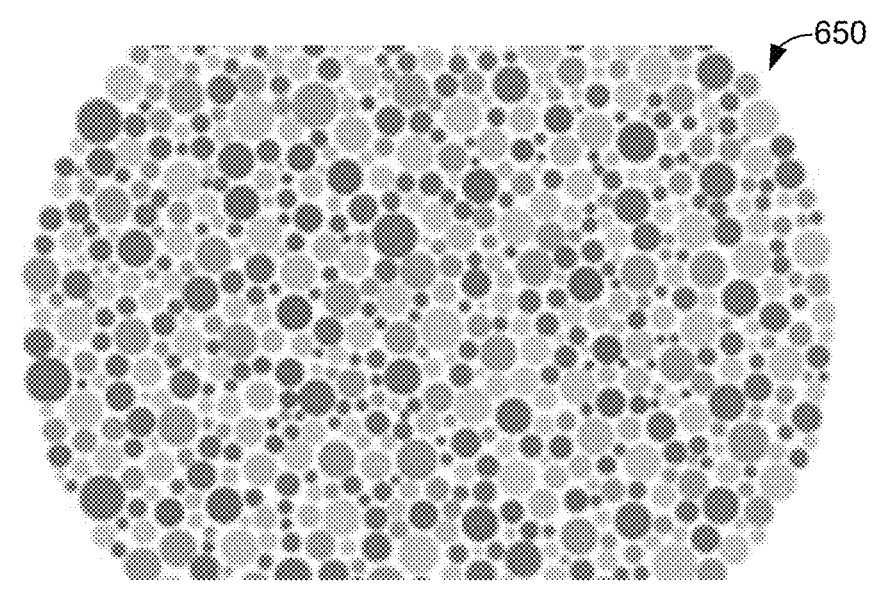

In some embodiments of the present disclosure, a vision test is implemented in a headset device 140D configured to display a user interface creating a three-dimensional (3D) virtual environment. Examples of a vision test implemented in the 3D virtual environment include, but are not limited to a visual acuity test, a visual field test, a visual depth test, a color blindness test, a retinoscopy, a test for stereopsis, a refraction test, an astigmatism test, and a contact lens exam. FIG. 6A is an example "tumbling E" chart 610 applied in a visual acuity test, in accordance with some embodiments. FIGS. 6B, 6C, 6D, and 6E are example patterns 620, 630, 640, and 650 applied in an astigmatism test, a stereopsis test, a visual field test, and a color blindness test, in accordance with some embodiments.

Figure 7:
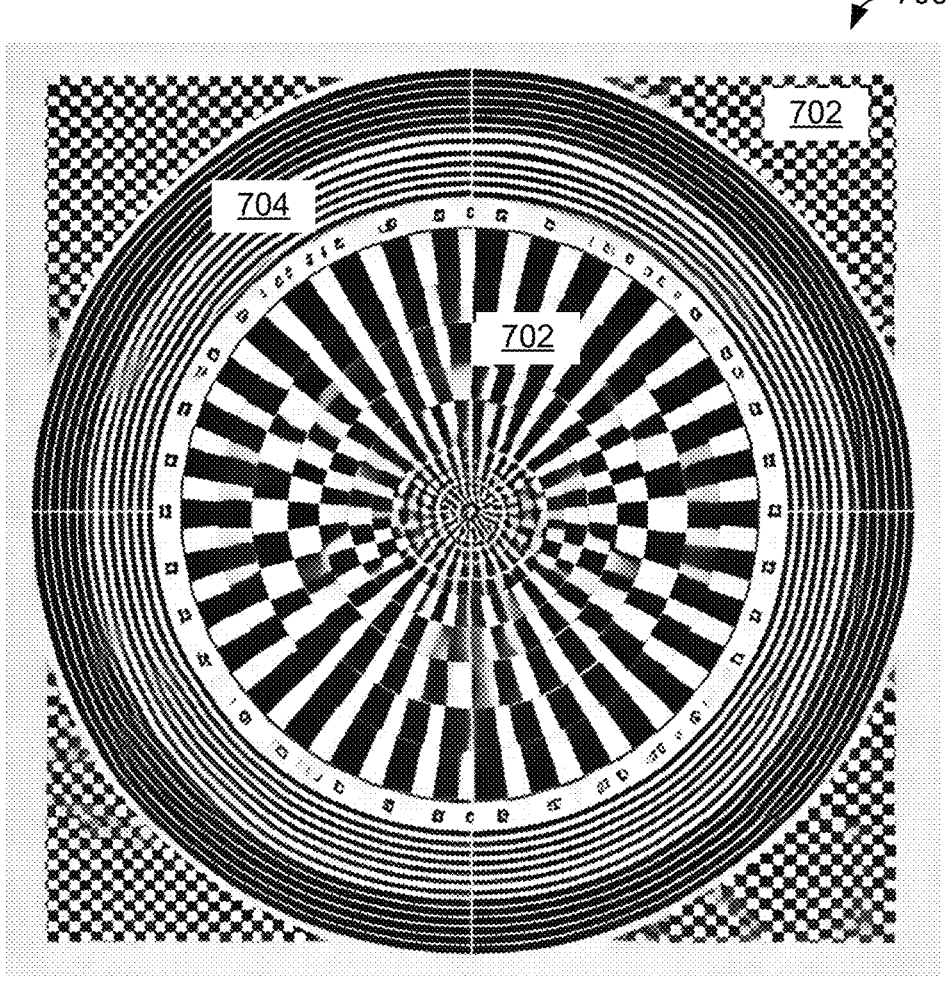
FIG. 7 is another example visual pattern applied to test visual acuity and astigmatism, in accordance with some embodiments.
Figure 8C:
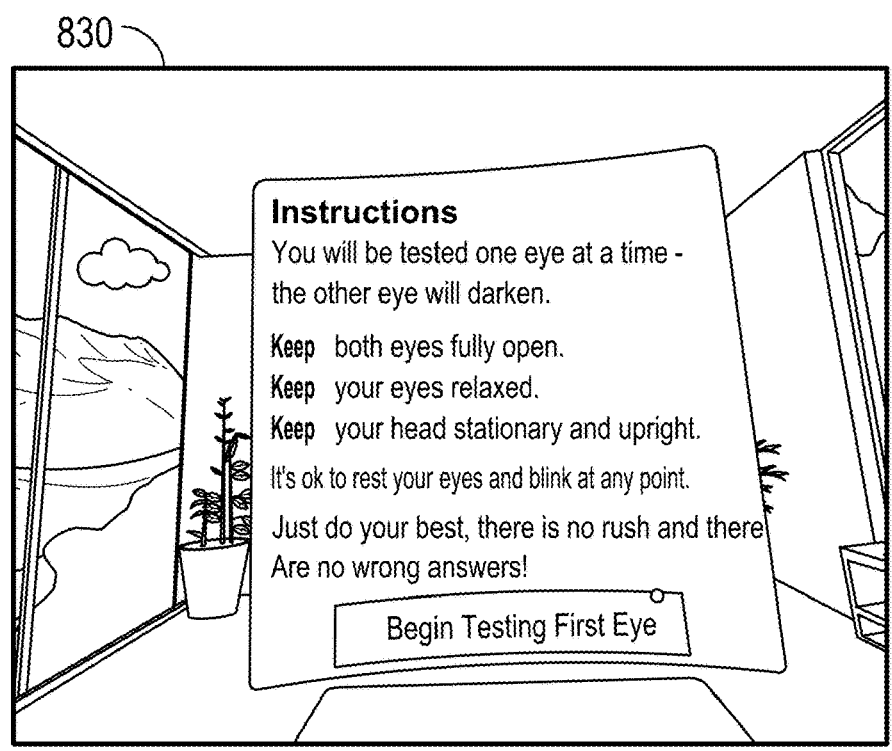
Figure 8D:
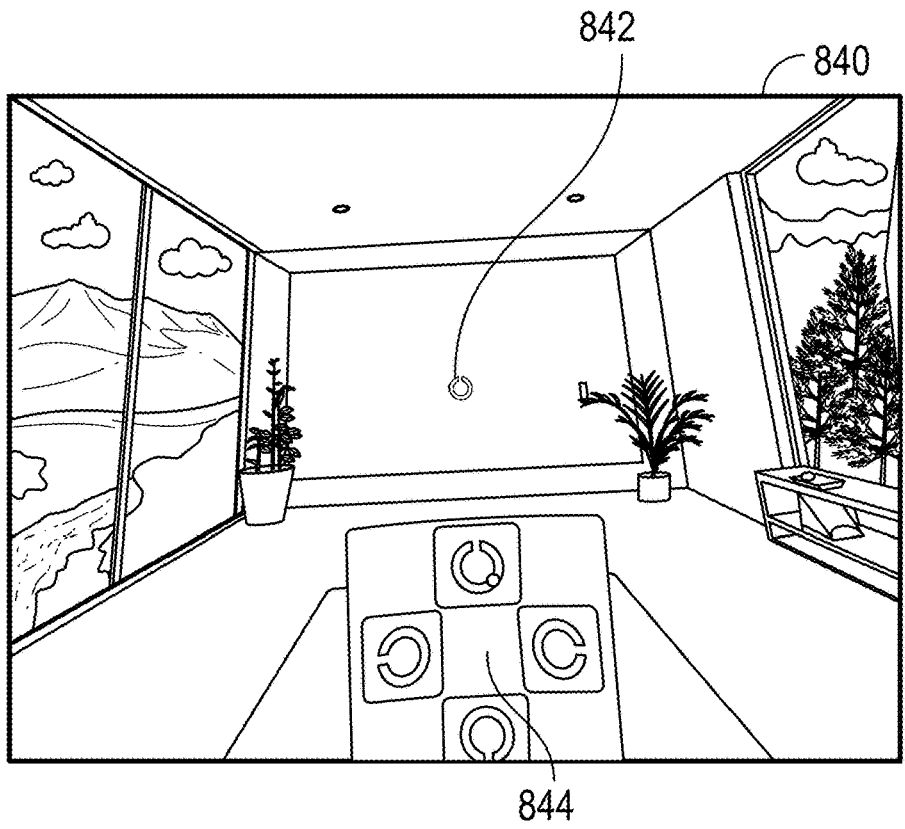

FIG. 7 is another example visual pattern 700 applied to test visual acuity and astigmatism, in accordance with some embodiments. The visual pattern 700 integrates a grid pattern 702 and concentric rings 704. The grid pattern 702 may include evenly spaced horizontal and vertical lines, creating a checkerboard pattern. The grid pattern 702 may be configured to identify distortions in straight lines, which can indicate issues with visual acuity and astigmatism. The concentric rings 704 may expand outward from a center of the visual pattern 700 and can assist in detecting radial distortions, which are common indicators of astigmatism. The visual pattern 700 may be depicted in high-contrast black and white, which ensures maximum clarity and reduces the potential for color-related distortions, making it easier to detect any visual impairment or defect.

FIGS. 8A-8D include four diagrams of example graphical user interfaces 810, 820, 830, and 840 rendered to determine a visual acuity score in a virtual environment created by a headset device 140D, in accordance with some embodiments. The user interface 810 displays an information page including instructions on controlling a headset device 140D to select one of a plurality of optotype candidates to match a target optotype displayed in the virtual environment. The user interface 820 displays an information page including two optional ways of using the controller to select the one of the plurality of optotype candidates. The user interface 830 displays an information page including general guidelines on a visual acuity assessment process. The user interface 840 displays an optotype 842 that is projected on a screen that has a first distance L1 from a user's position in the virtual environment. In a second distance L2 near the user, a selection panel 844 including a plurality of optotype candidates is displayed, prompting the user to select one of the optotype candidates that matches the optotype 842. In some embodiments, in response to a user selection of the one of the optotype candidates, the optotype 842 displayed in the first distance L1 is updated with a new optotype 842. Further, in some embodiments, the new optotype 842 spins at a fast rate for a shortened duration of time (e.g., 2 seconds), before it settles in place of the original optotype 842. In an example, the optotype 842 spins and gradually shrinks in size during the shortened duration of time.

Figure 9C:
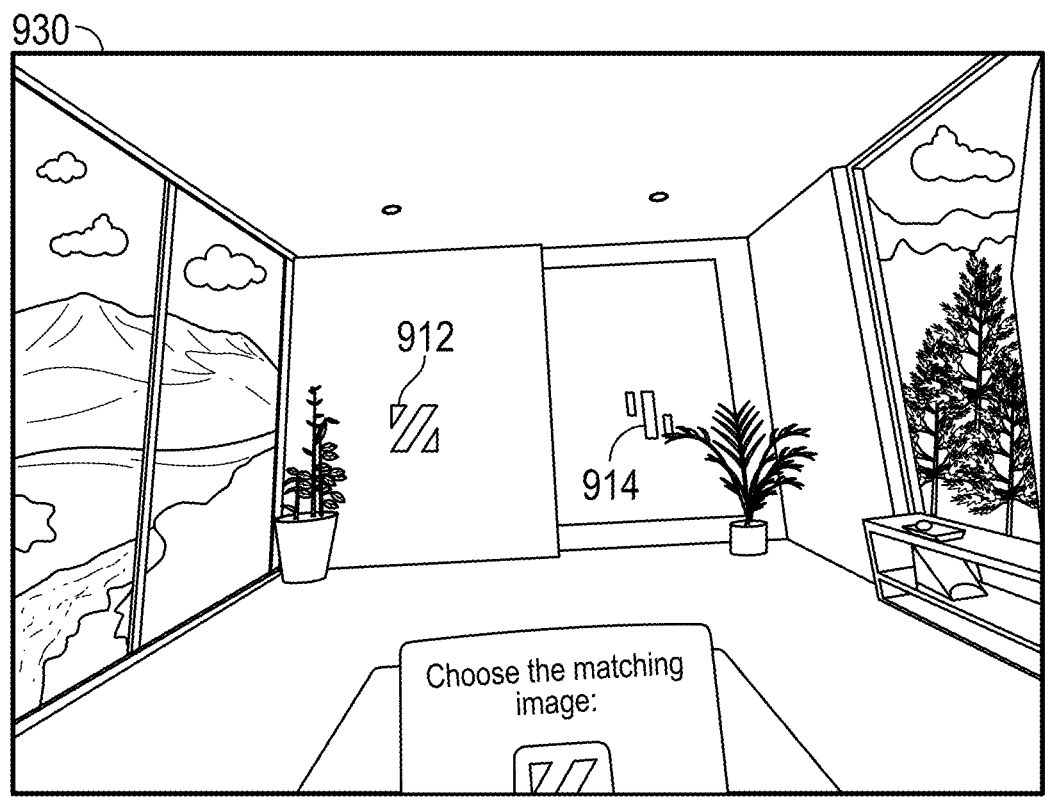
Figure 10E:
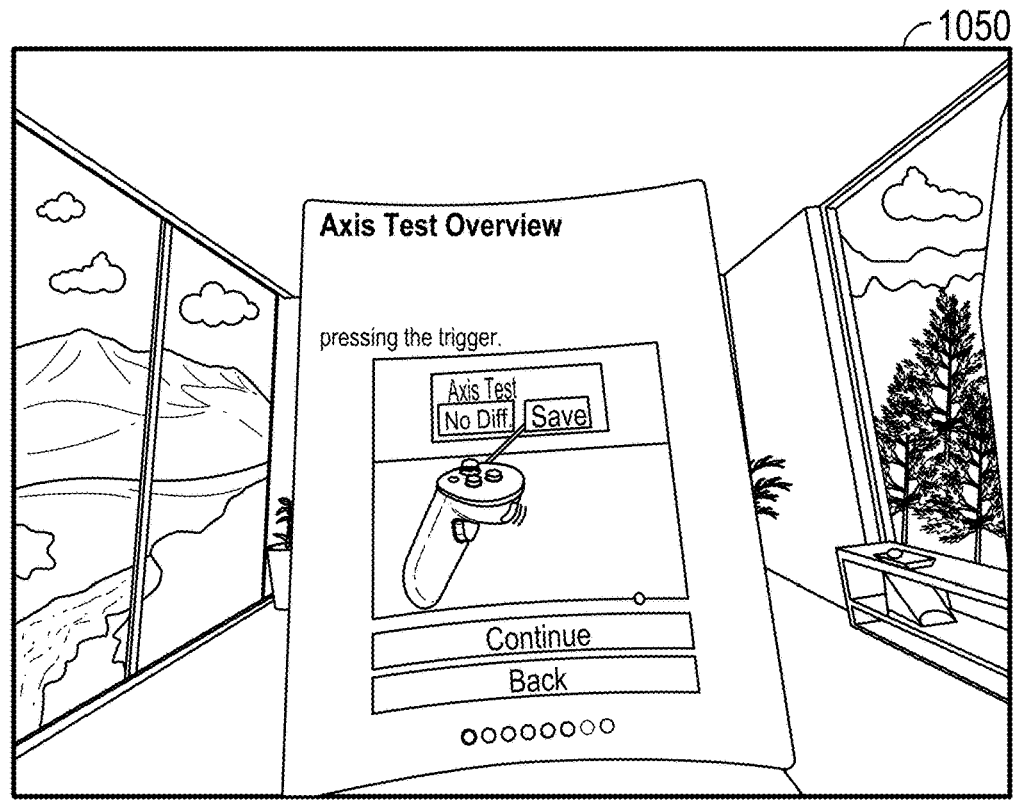
Figure 10F:
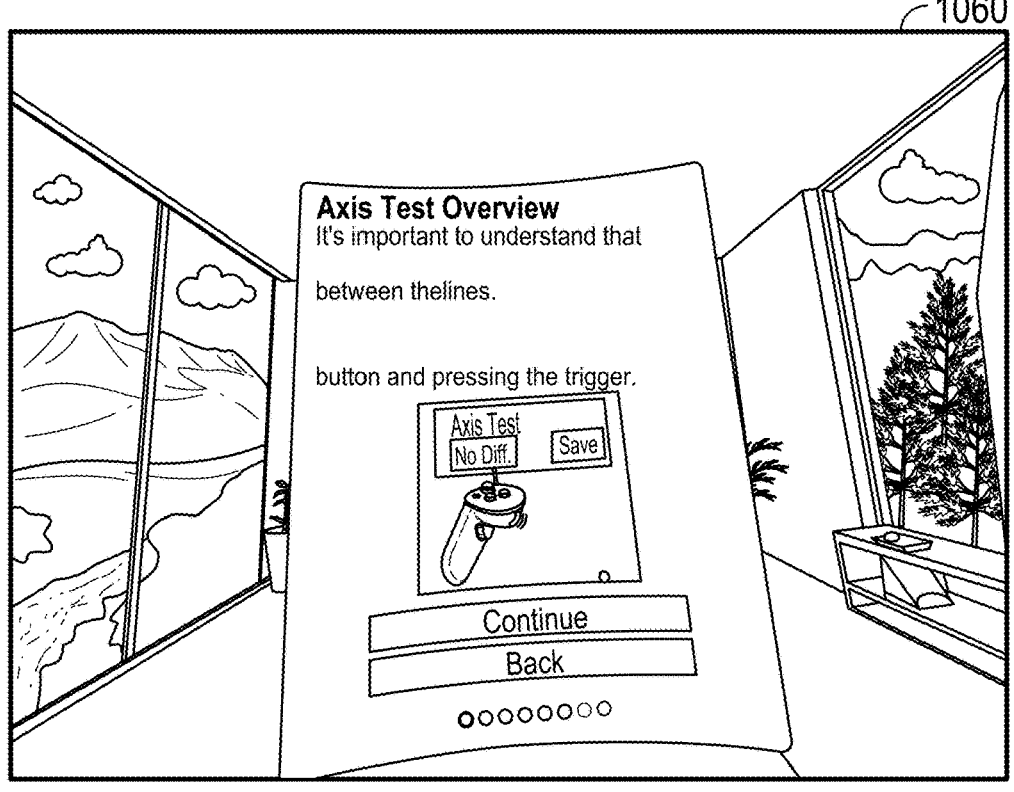

FIGS. 9A-9C include three diagrams of example graphical user interfaces 910, 920, and 930 rendered to determine a nearsighted or farsighted power in a virtual environment created by a headset device 140D, in accordance with some embodiments. The user interface 910 displays an information page explaining that two target optotypes 912 and 914 are displayed in the virtual environment. The user interface 920 displays an information page including two optional ways of using the controller to select one of the two target optotypes 912 and 914. The user interface 930 displays two target optotypes 912 and 914 that are projected on a screen that has a first distance L1 from a user's position in the virtual environment. In this example, the target optotype 912 located on the left is highlighted (e.g., by being displayed in a colored background). In a second distance L2 near the user, a confirmation panel 932 is displayed, prompting the user to select one of the two target optotypes 912 and 914. In some embodiments, in response to a user selection of the one of the two target optotypes 912 and 914, the two target optotypes 912 and 914 displayed in the first distance L1 is updated with a new pair of two target optotypes 912 and 914. Further, in some embodiments, each optotype 912 or 914 spins at a fast rate for a shortened duration of time (e.g., 2 seconds), before it settles in place of the original optotype 912 or 914. In an example, the optotype 912 or 914 spins and gradually shrinks in size during the shortened duration of time.

FIGS. 10A-10F include six diagrams of example graphical user interfaces 1010, 1020, 1030, 1040, 1050, and 1060 rendered to determine eye stigmatism in a virtual environment created by a headset device 140D, in accordance with some embodiments. The user interface 1010 displays an information page explaining that a clock diagram of converging numbered lines 1012 (which is a type of optotype) is displayed in the virtual environment. The user interface 1020 displays an information page explaining what is selected on the clock diagram of converging numbered lines 1012 displayed in the virtual environment. The user interface 1030 displays an information page including two optional ways of using the controller to select lines on the clock diagram of converging numbered lines 1012. The user interface 1040 displays an information page explaining a situation having equally clear lines on the clock diagram of converging numbered lines 1012. The user interface 1050 displays an information page including an instruction using the controller to submit a selection. The user interface 1060 displays an information page including an instruction using the controller to indicate that no difference is observed on the clock diagram of converging numbered lines 1012.

Some embodiments of a VR system are configured to enhance administration and experience of vision tests. The VR system includes a headset device 140D equipped with a display (sometimes referred to as a head-mounted display (HMD)). In some embodiments, the headset device 140D includes and one or more sensors for tracking one or more of eye movement, head orientation, and/or hand gestures of a user wearing the headset device 140D. In some embodiments, the headset device 140D is configured to execute a vision assessment application 328 configured to adaptively manage a sequence of vision tests based on the user's condition. In some embodiments, the headset device 140D is communicatively coupled to a server 102 configured to execute a server-side module for the vision assessment application 328, thereby managing the sequence of vision tests jointly with a device-side module of the vision assessment application 328 executed on the headset device. The vision assessment application 328 is configured to generate a virtual reality (VR) user interface corresponding to a three-dimensional (3D) virtual environment and render one or more visual stimuli 338 in this 3D virtual environment. A range of different vision tests are conducted based on the one or more visual stimuli within an immersive VR space.

In some embodiments, a headset device 140D includes one or more processors 302 and memory 306 storing instructions to execute the vision assessment application 328 for rendering one or more visual stimuli 338 in an output device 312 (e.g., a display) and processing sensor data 342 collected from the sensors 360 in response to the one or more visual stimuli 338. The sensor data 342 may be processed to determine vision test results 344 (e.g., eye movement patterns, response times, and visual perception accuracy) for the user. Further, in some embodiments, VR technology facilitates a personalized control scheme for navigating the vision tests. The personalized control scheme enables the user to interact with the test environment through intuitive hand gestures and eye movements, thereby providing a natural and engaging testing experience. The vision tests may be customized based on individual users' requirements and accommodate a wide range of vision impairments.

In some embodiments, the vision test results 344 are used to generate comprehensive reports on the user's visual performance. For example, the headset device 140D employs a deep learning model that correlates micro-expression data with vision test results 344 to provide holistic assessment of the user's ocular health. In some situations, the vision test results 344 are applied to identify vision conditions of the user and track changes of the vision conditions over time, thereby offering valuable insights to healthcare providers. In various embodiments of this application, eye images are captured and used to determine eye movement information automatically and without user intervention, which is an efficient solution to provide reliable supplemental information that cannot be provided by the user's active responses to one or more visual stimuli.

Example Vision Test System

Figure 11A:
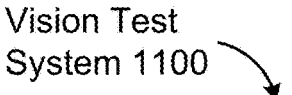

FIG. 11A is a diagram showing an example vision test system 1100, in accordance with some embodiments. The vision test system 1100 is implemented using a computer device (e.g., headset device 140D). The computer device includes one or more processors 1102, memory 1124 storing instructions to be implemented by the processor(s) 1102, a head-mounted display 1104, one or more network or other communications interfaces 1118, and one or more communication buses 1126 for interconnecting these and other optional components. The communication buses 1126 may include circuitry that interconnects and controls communications between system components. The HMD 1104 includes a display 1106 (e.g., one or more high-resolution screens), one or more lenses 1108 (to focus and/or shape display images), cameras and/or sensors 1112 (e.g., outward camera 378, eye-tracking camera 366), and/or a physical structure 1110 (e.g., a structure that holds the components and configured to be worn on a head).

The HMD 1104 optionally includes audio devices 1114 and one or more processors 1116 (instead of or in addition to the processors 1102, to implement instructions in the memory 1124). One or more cameras and/or sensors 1128 may be optionally included in some embodiments, instead of or in addition to the cameras and/or sensors 1112 integrated within the HMD 1104. In some embodiments, the computer device also includes one or more input devices 1122 (e.g., controllers and/or hand-tracking sensors). In some embodiments, the computer device also includes a battery 1120 (e.g., for standalone headsets). In some embodiments, the input device/mechanism 1122 includes a keyboard. In some embodiments, the input device/mechanism 1122 includes a "soft" keyboard, which is displayed as needed on the display 1106, for example, to enable a user to "press keys" that appear on the display 1106. In various embodiments, the communication interface(s) 1118 includes Wi-Fi, Bluetooth, and/or wired connections.

In some embodiments, the memory 1124 includes high-speed random-access memory, such as DRAM, SRAM, DDR RAM, and/or other random-access solid state memory devices. In some embodiments, the memory 1124 includes non-volatile memory, such as one or more magnetic disk storage devices, optical disk storage devices, flash memory devices, or other non-volatile solid state storage devices. In some embodiments, the memory 1124 includes one or more storage devices remotely located from the processor(s) 1102. The memory 1124, or alternatively the non-volatile memory device(s) within the memory 1124, comprises a computer readable storage medium.

Memory for headsets include, for example, Random-Access Memory (RAM), such as Low Power Double Data Rate RAM (LPDDR), used for running the operating system, applications, and/or handling real-time data processing. Memory 1124 may also include storage memory, such as flash memory, similar to smartphones (e.g., eMMC or UFS), for storing the operating system, applications, and/or user data. Video memory, often integrated with the GPU in mobile chipsets, can be used to handle graphics processing tasks. Cache memory, such as Static RAM (SRAM), can be used for high-speed memory used by the processors 1102 for quick data access.

Figure 11C:
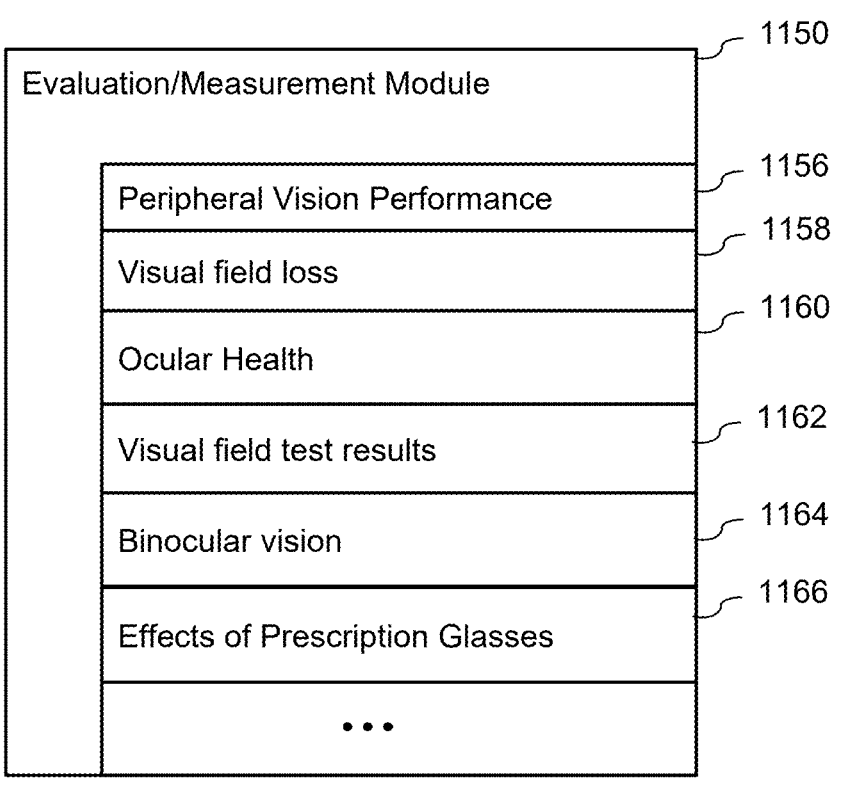

Referring to FIG. 11B, in some embodiments, the memory 1124, or the computer readable storage medium of the memory 1124, stores the following programs, modules, and data structures, or a subset thereof:

an operating system 1130, which includes procedures for handling various basic system services and for performing hardware dependent tasks;

a communications module 1132, which is used for connecting the computing device to other computers and devices via the one or more communication network interfaces 1118 (wired or wireless) and/or via one or more communication networks, such as the Internet, other wide area networks, local area networks, metropolitan area networks, and so on;

a user interface module 1134 (sometimes referred to as the UI module 1134) for managing user interaction with VR/AR environments 1136 and/or having system controls. This can include home environment, allowing users to launch apps, adjust settings, and/or navigate menus using virtual pointers or hand gestures;

a rendering module 1138 for handling the creation and/or display of 3D graphics in real-time. This can include a rendering pipeline, for example Unity's VR rendering pipeline, for optimizing frame rates and/or reducing latency for smooth VR/AR experiences;

a simulation module 1140 for creating and/or managing the rules, physics, and/or behaviors within the virtual environment. This can, for example, include PhysX in VR games, simulating realistic object interactions and gravity effects. The simulation module 1140 includes one or more scenarios 1142;

a tracking module 1144 for processing sensor data to determine the position and orientation of the headset and/or controllers. The tracking module can track eye movements 1146 and/or response times 1148. In some embodiments, the eye movements 1146 includes dynamic focus adjustments;

an evaluation and/or measurement module 1150 for analyzing user interactions and/or system performance for optimization and/or adaptation and feedback to determine and/or measure, referring to FIG. 11C, for example, peripheral vision performance 1156, visual field loss 1158, ocular health 1160, visual field test results 1162, binocular vision 1164, and/or effects of prescription glasses 1166;

an input module 1152 for interpreting and/or processing user input from various sources (e.g., controllers, hand tracking, voice commands). This module can include hand tracking software, translating hand and finger movements into VR interactions; and/or a calibration module 1154 for alignment of virtual and physical elements, often including initial setup procedures, for calibrating the device and/or experimental setups based on user data, which can include setup, and/or guiding users through the process of defining their viewing and/or test area and/or calibrating controllers.

The UI module 1134 may generate interactive visual elements that allow users to navigate and interact with the highly realistic 3D virtual world. This includes creating menus and buttons that appear to exist within a 3D space, implementing gesture-based controls that feel natural in the virtual world, designing visual feedback that matches the aesthetic of the environment, and/or integrating information displays seamlessly with the surroundings. The UI module 1134 may utilize various implementation methods, such as game engines (e.g., Unity, Unreal Engine) for UI implementation and integration, and/or 3D modeling software for creating UI assets.

The processing may include processing on host computers for tethered VR headsets, may include on-device processing for standalone VR/AR headsets, and/or cloud processing for computationally intensive tasks. In various embodiments, the UI module 1134 enhances user immersion and presence by, for example, creating UI elements that look and feel like they belong in the photorealistic environment, implementing holographic displays or interactive physical objects, and/or supporting interaction through VR controllers or hand tracking. In some embodiments, the UI module 1134 adapts the UI to different types of virtual environments, ensuring consistency and usability across various scenarios. In some embodiments, the UI module 1134 also handles user input (e.g., in collaboration with an input module, described below) through multiple modalities, including hand tracking, eye tracking, and controller input, to facilitate seamless interaction with the generated UI.

In some embodiments, the rendering module 1138 integrates the VR user interface elements with the photorealistic environment, ensuring proper depth, occlusion, and lighting interactions. In some embodiments, the rendering module 1138 implements stereo rendering techniques to create a sense of depth and dimensionality for the UI elements when displayed on the HMD. In some embodiments, the rendering module 1138 applies distortion correction and lens-specific optimizations to ensure the UI is properly displayed on the HMD's optics.

In some embodiments, the rendering module 1138 utilizes techniques like foveated rendering to optimize UI rendering performance, particularly for resource-intensive photorealistic environments. In some embodiments, the rendering module 1138 handles dynamic UI updates and animations in real-time, maintaining consistent frame rates crucial for comfortable VR experiences. In some embodiments, the rendering module 1138 implements anti-aliasing and other image quality enhancements specific to HMD displays to ensure crisp, readable UI elements.

In various embodiments, the one or more scenarios 1142 can include real-world scenarios, dynamic real-world visual experiences, test sequences with progressively finer details, real-world motion and target recognition visual tasks, and/or various visual scenarios (including, for example, scenarios with different lighting conditions). In some embodiments, the simulation module 1140 may be further configured to generate and manage spatial task scenarios in the VR user interface, simulating environments that require spatial reasoning and navigation skills. In some embodiments, the simulation module 1140 may be further configured to generate and manage interactive visual map scenarios, allowing users to engage with and interpret complex visual information presented in map form within the virtual environment.

In some embodiments, the simulation module 1140 may be further configured to generate and manage test scenarios featuring multidimensional shapes, creating environments with complex geometric objects to assess spatial perception and shape recognition. In some embodiments, the simulation module 1140 may be further configured to generate and manage test scenarios with a dynamic grid of light points, simulating environments where users must track or interact with multiple moving light sources. In some embodiments, the simulation module 1140 may be further configured to generate and manage test scenarios with a progressively narrowing field of view, dynamically altering the visible area to assess peripheral vision and adaptation to restricted visual fields.

In some embodiments, the simulation module 1140 may be further configured to generate and manage detailed real-world scenarios, replicating everyday environments and situations to test visual function in familiar contexts. In some embodiments, the simulation module 1140 may be further configured to generate and manage test scenarios incorporating various visual corrections, allowing for the simulation and assessment of different corrective measures (e.g., simulated glasses or contact lenses) within the virtual environment.

In some embodiments, the simulation module 1140 may be further configured to utilize the PhysX engine or similar physics simulation tools to ensure realistic object behavior and interactions. In some embodiments, the simulation module 1140 integrates with the rendering module 1138 to accurately display these complex scenarios on the HMD, maintaining visual fidelity and realism. Additionally, the simulation module 1140 allows for customization and parametric control of these scenarios, enabling the creation of tailored visual experiences for specific testing or training purposes.

For eye testing purposes, some embodiments track eye movements and response times with high frequency and precision. In some embodiments, for eye movements, and specifically for saccades, rapid movements of the eye between fixation points are tracked at rates of at least 100-500 Hz. This high frequency helps capture the quick and brief nature of these movements accurately. For fixations, periods where the eyes are relatively stationary and focused on a single point are tracked at slightly lower rates, but typically in the range of 50-100 Hz, to ensure precise measurement of duration and stability. For smooth pursuit (e.g., movements where the eyes smoothly follow a moving object), eye movements are also tracked at high rates (100-200 Hz) to accurately capture the speed and trajectory of the eye movements.

In some embodiments, for response times, specifically for reaction time (e.g., the time it takes for a person to respond to a visual stimulus, such as pressing a button when a light appears), are tracked with millisecond accuracy. This typically means using sampling rates of 1000 Hz or higher to ensure precise measurement. For decision time, which may include, for example, the duration between recognizing a visual stimulus and making a decision based on, are tracked using high-frequency tracking, typically around 500-1000 Hz, to accurately capture the cognitive processing speed. High-frequency tracking ensures that no significant movement or response detail is missed, providing a more accurate and reliable assessment of visual function.

Real-world visual tasks involve rapid and complex eye movements, and high-frequency tracking allows for a more detailed analysis of how well the eyes can handle such tasks. Subtle abnormalities in eye movements or delays in response times can be early indicators of visual or neurological problems. High-frequency tracking helps in detecting these issues at an early stage. In some embodiments, for eye testing, continuous tracking of eye movements and response times is performed at high frequencies (e.g., ranging from 50 Hz to 1000 Hz) to ensure precise and comprehensive data collection. While both eye testing and VR games benefit from eye-tracking technology, the former requires much higher precision, frequency, and reliability for clinical and diagnostic purposes. In contrast, VR games prioritize user experience and real-time interaction, allowing for lower precision and frequency in tracking (e.g., 30-120 Hz).

The tracking module 1144 may be further configured to continuously track gaze direction and peripheral responses to one or more stimuli presented in the one or more spatial task scenarios, using the camera at high frequencies (e.g., 250-1000 Hz). This allows for precise measurement of how users visually navigate and respond to spatial environments. The tracking module 1144 may be further configured to continuously monitor gaze direction and responses to one or more stimuli appearing at multiple locations within the visual field, capturing data on visual attention distribution and reaction times across the entire field of view.

The tracking module 1144 may be further configured to track eye movements in response to one or more visual stimuli presented in various test scenarios, including scenarios with multidimensional shapes and dynamic grids of light points, at high frequencies (e.g., 500-1000 Hz) to capture rapid eye movements and micro-saccades. The tracking module 1144 may be further configured to monitor gaze direction and fixation points in response to one or more visual stimuli in test scenarios, providing detailed data on visual focus and attention patterns during complex visual tasks. The tracking module 1144 may be further configured to track gaze direction, convergence, and divergence in response to one or more visual stimuli in test scenarios, particularly those involving depth perception and 3D object interaction, at frequencies of 250 Hz or higher to capture binocular eye movements accurately.

The tracking module 1144 may be further configured to continuously monitor gaze direction, focus adjustments, and visual clarity in response to one or more stimuli in test scenarios, especially those involving progressive changes in visual acuity or field of view. This tracking occurs at high frequencies (e.g., 500-1000 Hz) to capture rapid focus changes and subtle eye movements. The tracking module 1144 may be further configured to integrate with the simulation module 1140 to synchronize eye tracking data with the specific one or more visual stimuli and environmental changes in each test scenario, ensuring precise temporal alignment between eye movements and presented one or more stimuli.

The tracking module 1144 may be further configured to process and/or analyze the high-frequency tracking data in real-time, enabling immediate assessment of visual performance across various spatial tasks and test scenarios. The tracking module 1144 may be further configured to utilize advanced algorithms to differentiate between various types of eye movements (saccades, smooth pursuit, vergence) and/or relate them to specific one or more stimuli and task requirements in the test scenarios. These features may enable the system to capture comprehensive, high-precision data on gaze direction, eye movements, and/or visual responses across a wide range of spatial tasks and/or test scenarios. These features support detailed analysis of visual function, attention patterns, and performance in complex virtual environments.

In some embodiments, the evaluation and/or measurement module 1150 may be further configured to evaluate peripheral vision performance based on gaze direction and peripheral responses. This may include, for example, analyzing reaction times and accuracy of responses to one or more stimuli presented in the peripheral visual field, measuring the extent of the functional visual field by tracking eye movements towards peripheral one or more stimuli, and/or quantifying the sensitivity of peripheral vision at various eccentricities from the central fixation point. In some embodiments, the evaluation and/or measurement module 1150 may be further configured to analyze gaze direction and responses to map out areas of visual field loss. This may include, for example, creating detailed visual field maps based on user responses to one or more stimuli presented at various locations, identifying patterns of missed one or more stimuli or delayed responses indicative of potential visual field defects, and/or comparing results against normative data to highlight areas of significant deviation.

In some embodiments, the evaluation and/or measurement module 1150 may be further configured to analyze user interaction with multidimensional shapes for assessing ocular health, based on eye movements. This may include, for example, evaluating the accuracy and speed of tracing complex 3D shapes with eye movements, assessing the stability of fixations and smoothness of pursuit movements when following multidimensional contours, and/or detecting abnormalities in eye movement patterns that may indicate underlying ocular health issues.

In some embodiments, the evaluation and/or measurement module 1150 may be further configured to analyze detection and identification of light points for assessing visual detection across a visual field, based on eye movements. This may include, for example, measuring reaction times and accuracy in detecting light points of varying intensities across the visual field, creating sensitivity maps showing detection thresholds at different locations in the visual field, and/or evaluating the uniformity of visual detection capabilities across the entire field of view.

In some embodiments, the evaluation and/or measurement module 1150 may be further configured to assessing peripheral vision across a visual field, based on gaze direction and fixation points. This may include, for example, analyzing the distribution of fixation points during free-viewing tasks to evaluate attention to peripheral areas, measuring saccade latency and/or accuracy towards suddenly appearing peripheral one or more stimuli, and/or quantifying the functional visual field by mapping the area within which one or more stimuli consistently elicit eye movements. In some embodiments, the evaluation and/or measurement module 1150 may be further configured to assess depth perception, stereopsis, and eye coordination for binocular vision based on gaze direction, convergence, and divergence. This may include, for example, evaluating the accuracy and speed of convergence and divergence movements in response to one or more stimuli at varying depths, measuring stereoacuity by analyzing eye movements during tasks requiring fine depth discrimination, and/or assessing the stability of binocular fixation and the coordination of eye movements during 3D tracking tasks.

In some embodiments, the evaluation and/or measurement module 1150 may be further configured to evaluate visual acuity, field of view, and comfort level with each prescription, based on gaze direction, focus adjustments, and visual clarity. This may include, for example, analyzing the speed and accuracy of focus adjustments when switching between near and far one or more stimuli, measuring the consistency of visual acuity across the entire prescribed field of view, assessing user comfort by analyzing blink rates, fixation durations, and overall eye movement patterns with different prescriptions, and/or comparing visual performance metrics across different simulated prescriptions to determine optimal correction.

In some embodiments, the evaluation and/or measurement module 1150 may be further configured to implement advanced data analysis algorithms to process the high-frequency eye tracking data and extract meaningful metrics for each of these specialized assessments. In some embodiments, the evaluation and/or measurement module 1150 may be further configured to generate comprehensive reports detailing the results of these assessments, including visualizations of visual field maps, depth perception capabilities, and/or prescription comparisons. In some embodiments, the evaluation and/or measurement module 1150 may be further configured to integrate with the simulation module 1140 to ensure precise correlation between the presented one or more visual stimuli and the measured eye movement responses across all these specialized tests.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some embodiments, the memory 1124 stores a subset of the modules and data structures identified above. Furthermore, in some embodiments, the memory 1124 stores additional modules or data structures not described above. Example details and/or operations of the modules, data structures, applications and/or procedures, are further described below, according to some embodiments.

Although FIG. 11A shows a computing device, FIG. 11A is intended more as a functional description of the various features that may be present rather than as a structural schematic of the implementations described herein. In practice, and as recognized by those of ordinary skill in the art, items shown separately could be combined and some items could be separated.

VR System for Testing Peripheral Vision Through User-Engaged Spatial Tasks

According to some embodiments, the vision test system 1100 described above is configured to implement a virtual vision test for peripheral vision. FIGS. 12A-12E show a flow diagram of an example process 1200 for implementing a virtual eye test for peripheral vision, according to some embodiments. The computer device 140 (e.g., the computing device described above in reference to FIGS. 11A-11C) generates (1200) (e.g., using the UI module 1134) a virtual reality (VR) user interface (UI) corresponding to a three-dimensional virtual environment (e.g., an environment 1136).

In some embodiments, game engines (e.g., platforms like Unity or Unreal Engine) are used to implement the UI and integrate it with the virtual environment. 3D modeling software can be used for creating assets that may be part of the UI in the photorealistic environment. In some embodiments, this step is performed on a host computer, whereby the main processing unit (CPU) and graphics card (GPU) of the computer connected to a VR/AR headset handles much of the heavy lifting for generating and rendering the UI. This can be useful for tethered VR headsets that rely on a powerful PC for processing. In some embodiments, this step is performed on the headset itself. Standalone VR/AR headsets have onboard processors that can handle some or all of the UI generation and rendering. This on-device processing provides responsive, low-latency interactions. Cloud processing can also be used for some aspects of UI generation.

For example, tasks requiring heavy computation might be offloaded to cloud servers and streamed to the headset. A combination of the above, with some elements pre-baked during development, some processed on a host PC, and some handled by the headset itself, can be used in some embodiments.

In some embodiments, the step of generating a VR UI corresponding to a photorealistic environment includes creating interactive visual elements that allow users to navigate and interact with a highly realistic 3D virtual world. Photorealistic virtual environment refers to a 3D digital space that looks and behaves as close to reality as possible. Advanced graphics, lighting, textures, and/or physics simulations can be used to create a highly detailed and lifelike virtual world. VR user interface is the set of visual elements, controls, and/or interaction methods that allow users to navigate, manipulate, and/or engage with the virtual environment. In VR, these interfaces are designed to be intuitive and immersive, often blending seamlessly with the virtual world. Generating the interface includes generating UI elements that are both functional and visually consistent with the photorealistic environment. In various embodiments, this includes menus and buttons that appear to exist within the 3D space, gesture-based controls that feel natural in the virtual world, visual feedback that matches the aesthetic of the environment, and/or information displays that integrate with the surroundings. The computer device 140 creates an interface that enhances the user's sense of presence and immersion in the virtual world. This often means making UI elements that look and feel like they belong in the photorealistic environment, such as holographic displays or physical objects that the user can interact with using VR controllers or hand tracking.

Eye testing using photorealistic environments offers several advantages compared to traditional methods. Photorealistic environments provide a more accurate and comprehensive assessment of visual function.

For example, photorealistic environments provide realistic simulation, mimic real-world conditions much more accurately than traditional eye charts or simple visual tests. This allows for a more accurate assessment of how well a person can see in everyday situations. These environments can change dynamically to simulate different lighting conditions, distances, and angles, providing a more comprehensive test of visual capabilities, including peripheral vision and depth perception.

Patients, especially children or those with attention difficulties, may find photorealistic environments more engaging than standard tests, leading to more reliable results as they are more likely to fully participate in the testing process. Traditional eye tests often focus on static images and high-contrast letters. Photorealistic environments, on the other hand, can be used to present complex, real-world visual tasks that can better assess functions like motion detection, contrast sensitivity, and/or color perception. Furthermore, the photorealistic environment can be customized to the specific needs or conditions of the patient, such as simulating the individual's workplace or home setting, providing a personalized and relevant assessment of their vision.

More complex and varied testing scenarios, which photorealistic environments can help simulate, can help in the early detection of visual problems that might not be apparent in traditional tests. This includes issues related to glare, night vision, and visual processing speeds. Advanced eye-tracking technology, specific examples of which are described herein, can be used in photorealistic environments to provide objective data on eye movements, fixation points, and response times, offering a more detailed analysis of visual function. For patients undergoing vision therapy or rehabilitation, photorealistic environments can provide a controlled yet realistic setting for practicing visual skills, making the training more effective and directly applicable to real-world tasks. Overall, eye testing using photorealistic environments described herein, represents a significant advancement in optometry and vision science, offering a richer, more detailed, and accurate assessment of visual health.

The computer device 140 renders (1204) (e.g., using the rendering module 1138) the VR user interface on the HMD 1102. In some embodiments, photorealistic environments are displayed by leveraging various techniques and technologies described herein, according to some embodiments. Some embodiments use photogrammetry to create highly detailed 3D models from a set of photographs. By capturing real-world objects or environments from multiple angles, photogrammetry helps reconstruct their geometry and computer textures with a high degree of realism. In some embodiments, these models are then imported into the VR environment (sometimes referred to as the photorealistic environment or three-dimensional virtual environment).

Some embodiments provide 360-degree photography and videography. In some embodiments, VR devices display panoramic 360-degree photos and videos, which provide an immersive and photorealistic representation of real-world environments. In some embodiments, these are captured using specialized camera rigs or stitched together from multiple camera feeds. Some embodiments use real-time ray tracing. Modern graphics hardware and rendering techniques like real-time ray tracing help simulate the behavior of light in a physically accurate manner. By accurately modeling the interaction of light with materials, surfaces, and objects, ray tracing produces highly photorealistic images and environments in real-time. Some embodiments provide high-resolution textures and models.

VR devices leverage high-resolution textures and detailed 3D models to create environments that closely resemble reality. In some embodiments, the environments are created using techniques like photogrammetry, 3D scanning, or manually by artists and designers. Some embodiments use physically based rendering (PBR). PBR includes simulating the behavior of materials and their interactions with light based on real-world physics principles. By accurately modeling materials and their properties, such as roughness, metallic properties, and reflectance, PBR produces highly realistic visuals in VR environments. Some embodiments use image-based rendering, which includes using real-world photographs or video footage as the basis for rendering virtual environments.

In some embodiments, by projecting and blending these images onto 3D geometry, a highly photorealistic environment is created. In some embodiments, VR devices capture real-world lighting information using techniques like light probes or environmental capture. This data can then be used to accurately simulate and recreate realistic lighting conditions within the virtual environment. By combining the techniques described herein and leveraging the latest advancements in graphics hardware and rendering algorithms, VR devices can provide highly immersive and photorealistic virtual experiences that closely resemble real-world environments.

Photorealistic environments used for eye testing can differ significantly from those used in VR games in several aspects, including design, functionality, and application. Photorealistic environments for eye testing are designed for precision, control, and repeatability to assess visual functions accurately, while those for VR games focus on creating immersive, interactive, and enjoyable experiences for entertainment. In contrast to VR games, eye testing requires clinical precision.

Accordingly, some embodiments provide highly controlled and repeatable conditions for accurate diagnosis and assessment of visual functions. In some embodiments, specific scenarios are tailored to simulate real-world conditions that are relevant for visual testing, such as different lighting conditions, contrast levels, and visual tasks like reading or recognizing objects. Environments are kept consistent across tests to ensure reliable results. This includes controlled variations in one or more visual stimuli to test specific aspects of vision. Eye testing also requires precision tracking. Accordingly, some embodiments utilize high-precision eye-tracking to measure fine details of eye movements, fixations, and/or response times. Some embodiments collect accurate data for clinical analysis, including metrics, such as saccadic latency, fixation stability, and smooth pursuit accuracy. Some embodiments include standardized visual tests, such as visual acuity tests, contrast sensitivity tests, and visual field tests.

Referring to FIG. 12A, the computer device 140 simulates (1206) (e.g., using the simulation module 1140) one or more spatial task scenarios (e.g., the scenarios 1142) in the VR user interface. Referring next to FIG. 12B, in some embodiments, the one or more spatial task scenarios require (1214) detection and reaction to the one or more stimuli appearing in a peripheral field of view. In some embodiments, the one or more spatial task scenarios include (1216) one or more tasks selected from the group consisting of: identifying objects that appear at the edges of visual field, tracking multiple moving targets across a wide area, and navigating through complex environments that require peripheral awareness to avoid obstacles.

In some embodiments, the one or more spatial task scenarios include (1218) one or more tasks for assessing different aspects of peripheral vision, including field extent, reaction time to peripheral one or more stimuli, and the ability to process and respond to peripheral information while maintaining central focus. Central focus refers to the ability of a user to concentrate on a specific point or task located in the center of their visual field while simultaneously being aware of and reacting to peripheral one or more stimuli. In the context of VR testing, central focus may be used for evaluating how well an individual can maintain attention on a central visual task, such as reading or identifying objects, while also processing and responding to one or more stimuli that appear in the peripheral regions of their vision. The central focus may be useful for tasks requiring visual and cognitive coordination, where the user must balance attention between central and peripheral visual fields.

In some embodiments, the one or more spatial task scenarios include (1220) a task for identifying peripheral objects for assessing field extent, a task for tracking multiple moving targets for assessing reaction time, and a task for navigation requiring peripheral vision to assess the ability to process and respond to peripheral information. In some embodiments, simulating the one or more spatial task scenarios includes (1222) changing scenarios every few seconds (e.g., every 5 seconds) to a minute. Duration of each scenario may be a few seconds (e.g., 2-3 seconds) to a minute. At least 5-10 scenarios may be simulated. In some embodiments, simulating the one or more spatial task scenarios includes (1224) one or more tasks that progressively challenge different aspects of peripheral vision with parameters comprising object size, speed, and trajectory.

Referring back to FIG. 12A, the computer device 140, while simulating (1208) the one or more real-world scenarios, in real time, continuously tracks (1210) (e.g., using the tracking module 1144), using the camera, gaze direction and peripheral responses (e.g., the eye movements 1146, the response times 1148) to one or more visual stimuli presented in the one or more spatial task scenarios. Referring to FIG. 12F, in some embodiments, the computer device 140 performs the tracking using (1226) one or more infrared cameras capable of capturing detailed eye movements and peripheral responses with high accuracy and minimal latency. The required accuracy may be within 0.5 to 1 degree of the true gaze direction to ensure that even slight eye movements are precisely captured. The latency may be minimal, ideally less than 10 milliseconds, to ensure that eye movements and reactions to peripheral one or more stimuli are recorded in real time. Such high accuracy and low latency may be useful for creating a realistic and effective VR environment where peripheral vision and central focus are simultaneously evaluated.

Referring back to FIG. 12A, the computer device 140, while simulating the one or more real-world scenarios, in real time, evaluates (1212) (e.g., using the evaluation/measurement module 1150) the gaze direction and peripheral responses for peripheral vision performance (e.g., the peripheral vision performance 1156). Referring to FIG. 12D, in some embodiments, evaluating for peripheral vision performance includes evaluating (1228) extent by measuring a maximum angle at which objects are detected while focusing on a central point.

In some embodiments, evaluating for peripheral vision performance includes evaluating (1230) accuracy by assessing correctness and reaction time to one or more stimuli in the peripheral areas. The peripheral area is defined as the part of the visual field that lies outside the central focus, typically beyond 30 degrees from the central point of gaze. The maximum angle in step 1228 refers to both horizontal and vertical angles. In some embodiments, peripheral vision is assessed in a 360-degree field surrounding the central focus point, taking into account one or more visual stimuli from all directions, although horizontal angles may be more emphasized depending on the specific test scenario.

Referring to FIG. 12E, in some embodiments, the computer device 140 further compiles (1232) results of the evaluation into a comprehensive report that highlights peripheral vision capabilities, identifying any deficiencies that could indicate conditions, including conditions, such as, but not limited to, glaucoma, retinitis pigmentosa, or other visual field defects. In some embodiments, the computer device 140 further establishes (1234) baseline performance metrics by comparing user data with profiles of individuals with normal vision and those with known conditions affecting peripheral vision. Normal vision refers to a level of visual performance that includes 20/20 visual acuity, a full visual field (approximately 180 degrees horizontally and 135 degrees vertically), and normal contrast sensitivity and color perception. Normal vision is typically defined in the absence of any significant visual impairments or only requiring minimal correction through lenses. For VR testing, profiles of individuals with normal vision may be used as a baseline to compare against those with known visual conditions, providing a standard against which deviations are measured.

VR Technique for Assessing Visual Field Loss with Interactive Visual Maps

According to some embodiments, the vision test system 1100 described above is configured to implement a virtual eye test for assessing visual field loss with interactive visual maps. FIGS. 13A-13F show a flow diagram of an example process 1300 for implementing a virtual eye test for assessing visual field loss with interactive visual maps, according to some embodiments.

The computer device 140 (e.g., the computing device described above in reference to FIGS. 11A-11C) generates (1302) (e.g., using the UI module 1134) a VR user interface corresponding to a three-dimensional virtual environment.

The computer device 140 also renders (1304) (e.g., using the rendering module 1138) the VR user interface on the HMD 312A. Example details of the three-dimensional virtual environment and rendering the VR user interface are described above in reference to FIG. 12B, according to some embodiments.

The computer device 140 also simulates (1302) (e.g., using the simulation module 1140) one or more interactive visual map scenarios (e.g., the scenarios 1142) in the VR user interface. Referring to FIG. 13B, in some embodiments, one or more interactive visual map scenarios include (1314) tasks selected from the group consisting of: identifying visual targets appearing randomly on a map, following moving objects across different regions of a visual field, and responding to changes in a visual environment. In some embodiments, the one or more interactive visual map scenarios include (1318) tasks that require detection and reaction to one or more stimuli at edges and within central and peripheral areas of vision.

In some embodiments, visual maps for the one or more interactive visual map scenarios include (1320) graphical representations of a visual field, illustrating areas of normal vision, reduced sensitivity, and blind spots. In some embodiments, visual maps for the one or more interactive visual map scenarios include (1322) interactive visual maps that adapt to user responses, presenting a stimulus at various locations, to thereby map out areas of sensitivity and loss. In some embodiments, simulating the one or more interactive visual map scenarios includes (1324) displaying one or more visual stimuli in a predetermined manner, thereby ensuring coverage of an entire visual field. In some embodiments, simulating the one or more interactive visual map scenarios includes (1326) displaying one or more visual stimuli in a randomized way to prevent prediction.

Referring next to FIG. 13C, in some embodiments, simulating the one or more interactive visual map scenarios includes (1328) generating interactive visual maps, which comprises: calibrating (1330) to a user's visual field and eye-tracking data; presenting (1332) one or more visual stimuli in a predetermined manner across the visual field; recording (1334) user responses to the one or more visual stimuli, in real time; and processing the user responses to generate a visual field map. Calibration may include adjusting various system components to align with the user's specific visual field characteristics. The components being calibrated may include the eye-tracking sensors, which follow eye movements across the entire visual field, and the display settings, ensuring that one or more stimuli are correctly positioned and sized relative to the user's unique vision.

The calibration process may include initial tests where the user's responses to known one or more visual stimuli are recorded, and the system may adjust to ensure accurate tracking and simulation during the actual test. This calibration may be used for providing reliable data on visual field loss. Specific one or more visual stimuli useful for assessing visual field loss include bright light points, moving objects, and shapes of varying contrast and size. These one or more stimuli are designed to test different regions of the visual field, including central and peripheral areas, under various conditions such as different brightness levels and contrasts. The one or more stimuli is detectable within the user's visual capabilities but challenging enough to identify areas of visual field loss effectively. User responses may be recorded in real-time as users detect and react to one or more visual stimuli presented in the VR environment. The system may track the speed, accuracy, and frequency of correct detections across different parts of the visual field. This data may be then processed to create a visual field map, which highlights areas of normal vision, reduced sensitivity, and complete vision loss (blind spots). The map is typically color-coded or shaded to indicate the severity and location of visual field impairments.

Referring back to FIG. 13A, the method also includes, while simulating the one or more interactive visual map scenarios, in real-time (1308), continuously tracking (1310) (e.g., using the tracking module 1144), using the camera, gaze directions and responses to one or more visual stimuli appearing at a plurality of locations within a visual field.

Referring next too FIG. 13D, in some embodiments, tracking the gaze direction and responses to one or more stimuli includes (1338) tracking, using one or more eye-tracking sensors, gaze direction, fixation stability, saccadic movements, and pupil reactions. In some embodiments, the tracking is performed using (1340) one or more infrared cameras capable of capturing detailed eye movements and peripheral responses with high accuracy and minimal latency. For assessing visual field loss, the eye-tracking sensors may include an accuracy within 0.5 degrees of the true gaze direction and a latency of less than 10 milliseconds. These specifications help ensure that the system captures the user's responses to one or more stimuli across the visual field with high precision, enabling accurate mapping of visual field performance.

The method also includes analyzing (1310) (e.g., using the evaluation/measurement module 1150) the gaze direction and responses to map out areas of visual field loss (e.g., the visual field loss 1158). Referring next to FIG. 13E, in some embodiments, analyzing the gaze direction and responses includes (1342) evaluating an ability to perceive and respond to one or more visual stimuli across a field of view. In some embodiments, analyzing the gaze direction and responses includes (1344) comparing user performance to baseline metrics, identifying delayed, inaccurate, or absent responses, to map visual field loss.

Figure 13F:
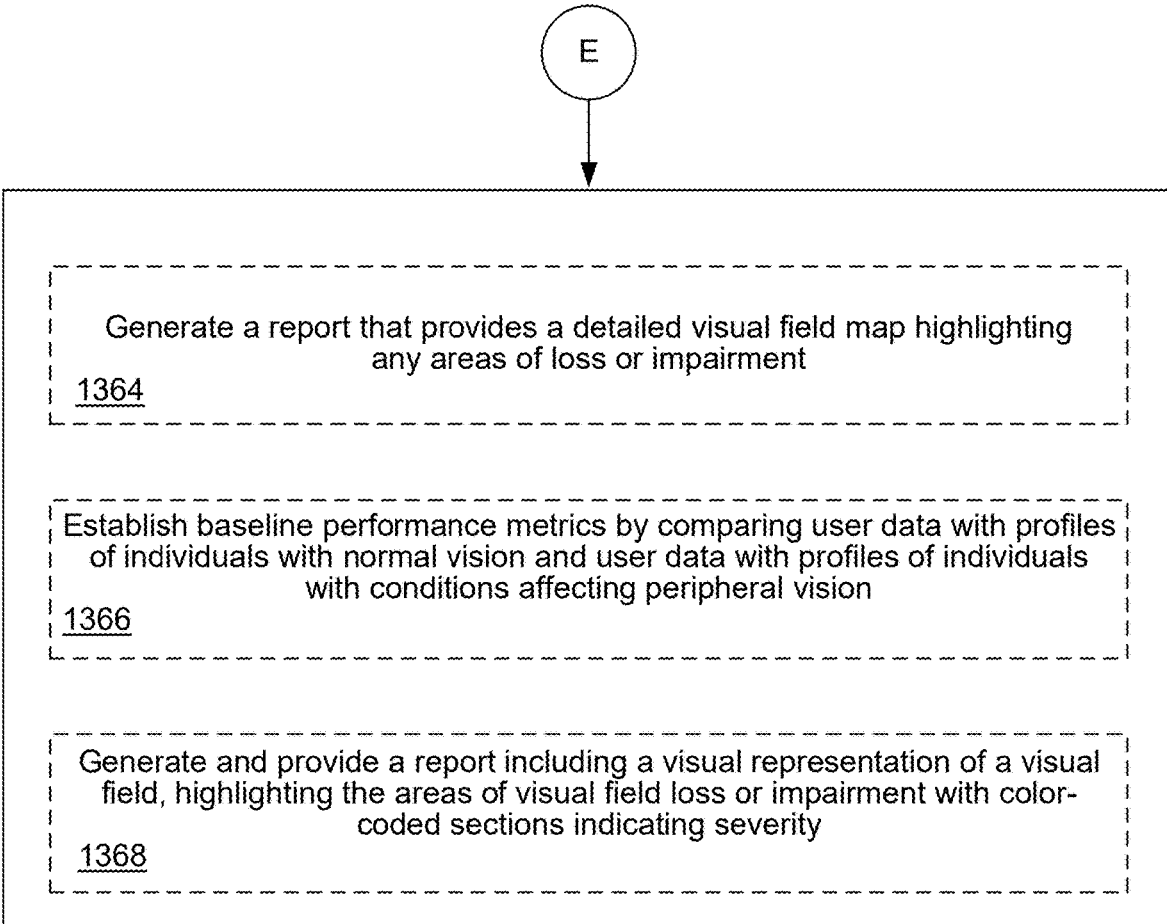

Referring next to FIG. 13F, in some embodiments, the computer device 140 further generates (1364) a report that provides a detailed visual field map highlighting any areas of loss or impairment. In some embodiments, the computer device 140 further establishes (1366) baseline performance metrics by comparing user data with profiles of individuals with normal vision and user data with profiles of individuals with conditions affecting peripheral vision. Conditions that affect peripheral vision may include (i) glaucoma, which is characterized by progressive damage to the optic nerve, leading to gradual loss of peripheral vision and potentially resulting in tunnel vision if untreated, (ii) retinitis pigmentosa, which is a genetic disorder causing retinal degeneration, which primarily affects peripheral vision and can lead to night blindness and narrowing of the visual field, or (iii) stroke, which may result in homonymous hemianopia, where a person loses half of their visual field in each eye, significantly impacting peripheral vision on one side. In some embodiments, the computer device 140 further generates and provides (1368) a report comprising a visual representation of a visual field, highlighting the areas of visual field loss or impairment with color-coded sections indicating severity.

VR Method for Assessing Ocular Health by Analyzing User Interaction with Multidimensional Shapes According to some embodiments, the vision test system 1100 described above is configured to implement a virtual eye test for assessing ocular health by analyzing user interaction with multidimensional shapes. FIGS. 14A-14E show a flow diagram of an example process 1400 for implementing a virtual eye test for assessing ocular health by analyzing user interaction with multidimensional shapes, according to some embodiments.

The computer device 140 (e.g., the computing device described above in reference to FIGS. 11A-11C) generates (1402) (e.g., using the UI module 1134) a VR user interface corresponding to a three-dimensional virtual environment (e.g., the environment 1136).

The computer device 140 also renders (1404) (e.g., using the rendering module 1138) the VR user interface on the HMD 312A. Example details of the three-dimensional virtual environment and rendering the VR user interface are described above in reference to FIG. 12B, according to some embodiments.

The computer device 140 also simulates (1406) (e.g., using the simulation module 1140) one or more test scenarios (e.g., the scenario 1142) in the VR user interface. Referring to FIG. 14B, in some embodiments, simulating the one or more test scenarios includes generating (1414) a plurality of interactive 3D shapes within the virtual environment. In some embodiments, generating the interactive 3D shapes includes selecting (1416) one or more shapes from a group consisting of polyhedra, tesseracts, and custom objects. In some embodiments, the shapes are selected based on the specific aspects of ocular health being assessed.

For example, polyhedra may be used for tasks that evaluate depth perception, while more complex shapes like tesseracts or custom-designed objects may be chosen to assess spatial reasoning or higher-order visual processing.

The selection process may be driven by the diagnostic objectives of the test, ensuring that each shape type serves a particular purpose in assessing the user's visual capabilities. In some embodiments, generating the interactive 3D shapes includes generating (1418) one or more interactive shapes programmed to rotate, resize and align in space. In some embodiments, the plurality of interactive 3D shapes allows (1420) users to manipulate the shapes through gaze direction and hand movements. In some embodiments, hand movements are tracked using motion sensors embedded in VR controllers and/or by cameras that capture hand gestures. These sensors monitor the position, movement, and orientation of the hands in real-time. This data may be synchronized with eye-tracking information to assess how well the user can interact with 3D shapes using both their gaze and manual manipulation. This dual tracking is useful for evaluating coordination between eye and hand movements in complex visual tasks.

In some embodiments, the plurality of interactive 3D shapes includes (1422) symmetric shapes. Symmetric patterns are useful for assessing the user's ability to recognize and process symmetry, which is an aspect of spatial reasoning and visual processing. The ability to perceive and interact with symmetric shapes tests the user's depth perception, eye coordination, and/or spatial awareness. Difficulties in recognizing or manipulating these patterns helps indicate visual or neurological issues, such as strabismus or amblyopia, making symmetry a useful metric in these tests.

Referring next to FIG. 14C, simulating the one or more test scenarios includes generating and displaying (1424) a plurality of interactive tasks, including manipulating 3D shapes to fit into predetermined patterns, matching shapes based on depth cues, and performing precision tasks that require fine eye-hand coordination. Examples of predetermined patterns include aligning objects within a grid to form a symmetric pattern, and matching shapes to a predefined template. Example depth cues include overlap, where one object partially obscures another, providing information about relative depth, and relative size, where smaller objects appear further away, requiring the user to judge distance. Example tasks requiring fine eye-hand coordination include precisely placing a 3D object within a target area, and rotating and aligning shapes to fit into a moving slot.

In some embodiments, simulating the one or more test scenarios includes allowing (1426) a user to rotate, resize and align shapes. In some embodiments, simulating the one or more test scenarios includes providing (1428) depth cues via overlap and relative size for distance estimation. Overlap refers to the visual phenomenon where one object partially blocks another, suggesting that the blocked object is further away. Relative size is based on the principle that objects of the same size appear smaller when they are further away. In the VR environment, these cues help users estimate the distance between objects, which is useful for tasks that require accurate depth perception.

In some embodiments, the one or more test scenarios include (1430) one or more precision tasks requiring fine alignment and exact matching of shapes. Fine alignment and exact matching may be measured by tracking how closely a user can position an object relative to a reference point or within a designated space. Some embodiments measure the degree of deviation from perfect alignment, the time taken to achieve this alignment, and/or the precision in matching shapes to patterns. High-precision sensors and algorithms may be used to ensure that even minor discrepancies are detected, allowing for detailed analysis of the user's visual coordination.

In some embodiments, the one or more test scenarios include (1432) one or more tasks revealing strabismus, amblyopia, convergence insufficiency, and other similar issues, through user performance metrics. These tasks reveal issues through performance metrics such as accuracy, reaction time, and consistency. For instance, strabismus may be indicated by inconsistent alignment of shapes due to eye misalignment. Amblyopia could manifest as slower reaction times and inaccuracies in tasks requiring detailed visual processing. Convergence insufficiency may be detected if the user struggles with tasks that require close-up focus and binocular coordination. Other similar issues could include esotropia (inward turning of the eye) or exotropia (outward turning of the eye).

Figure 14D:
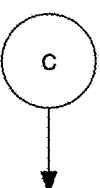

Referring back to FIG. 14A, the computer device 140 also, while simulating the one or more test scenarios, in real-time (1408), continuously tracks (1410) (e.g., using the tracking module 1144), using the camera, eye movements (e.g., the eye movements 1146) in response to one or more visual stimuli presented in the test scenarios. Referring next to FIG. 14D, in some embodiments, tracking eye movements includes using (1434) one or more eye-tracking sensors to monitor gaze direction, fixation points, and saccadic movements. In some embodiments, tracking eye movements includes mapping (1436) gaze direction, fixation points and saccadic movements to visual acuity, depth perception, and eye coordination. A metrics map is a detailed representation that correlates eye movements, such as gaze direction, fixation points, and saccadic movements, with visual performance outcomes like visual acuity, depth perception, and eye coordination. This map provides visual and/or data-driven insights into how the user's eyes move in response to different one or more stimuli, helping identification of areas of dysfunction or deviations from typical visual behavior.

The computer device 140 also analyzes (1412) (e.g., using the evaluation/measurement module 1150) user interaction with the multidimensional shapes for assessing ocular health (e.g., the ocular health 1160), based on the eye movements. Referring to FIG. 14E, in some embodiments, analyzing user interaction with the multidimensional shapes includes assessing (1438) visual acuity via clarity of shape edges at different sizes. In some embodiments, analyzing user interaction with the multidimensional shapes includes assessing (1440) depth perception via accurate perception of shape dimensions.

In some embodiments, analyzing user interaction with the multidimensional shapes includes assessing (1442) eye coordination via smooth and coordinated eye movements.

Smooth and coordinated eye movements refer to the eyes' ability to follow moving objects fluidly (smooth pursuit) and to work together in synchrony (binocular coordination). These movements may be measured by tracking the eye's path across various tasks, noting any jerky or uncoordinated actions. Example metrics include the speed, accuracy, and synchronization of both eyes during tasks requiring precise movement. Any irregularities may indicate underlying ocular or neurological conditions. In some embodiments, analyzing user interaction with the multidimensional shapes includes assessing (1444) pattern matching and obstacle navigation, for ocular health tracking. In some embodiments, analyzing the user interaction includes assessing (1446) ocular health parameters including visual acuity, depth perception, and eye coordination. In some embodiments, analyzing the user interaction includes analyzing (1448) accuracy, response time, and consistency of the user interactions.

VR-Based Visual Field Testing Using a Grid of Light Points

According to some embodiments, the vision test system 1100 described above is configured to perform visual field testing. FIGS. 15A-15E show a flow diagram of an example process 1500 for implementing a virtual eye test for visual field, according to some embodiments.

The computer device 140 (e.g., the computing device described above in reference to FIGS. 11A-11C) generates (1502) (e.g., using the UI module 1134) a VR user interface corresponding to a three-dimensional virtual environment (e.g., the environment 1136). The computer device 140 also renders (1504) (e.g., using the rendering module 1138) the VR user interface on the HMD 312A. Example details of the three-dimensional virtual environment and rendering the VR user interface are described above in reference to FIG. 12B, according to some embodiments.

The computer device 140 also simulates (1506) (e.g., using the simulation module 1140) one or more test scenarios (e.g., the scenarios 1142) with a dynamic grid of light points in the VR user interface. Referring next to FIG. 15B, in some embodiments, one or more visual stimuli in the one or more test scenarios includes (1514) light points that appear randomly across a defined grid. In some embodiments, the one or more test scenarios include (1516) scenarios where light points of different intensities and sizes appear at random locations within a grid. Example characteristics of a grid in visual field testing include shape, size, duration and updates. Grids may include rectangular or circular grids that cover the full visual field. Grids may vary from small, central areas (covering 10 degrees) to larger ones encompassing up to 180 degrees horizontally and 135 degrees vertically. For duration, light points may appear for as little as 200 milliseconds to as long as 5 seconds, depending on the sensitivity of the test. The grids may update dynamically, with light points appearing in different locations to ensure comprehensive coverage of the visual field.

In some embodiments, the one or more test scenarios include (1518) one or more scenarios to test different aspects of the visual field, including central and peripheral vision, under a plurality of lighting conditions. In some embodiments, simulating the one or more test scenarios includes calibrating (1520) using a control group of users with predetermined visual field profiles to establish baseline performance metrics and validating accuracy of visual field assessment, prior to assessing the visual detection across the visual field. In some embodiments, the one or more test scenarios require (1522) identification of light points within milliseconds (e.g., within 100 milliseconds) to a few seconds (e.g., 5 seconds).

Referring to FIG. 15C, simulating the one or more test scenarios includes generating (1524) an interactive grid of light points by calibrating to a user's visual field, presenting a dynamic grid, and displaying one or more light points randomly in the dynamic grid. In some embodiments, the dynamic grid includes (1526) uniform and random grids. In some embodiments, the one or more test scenarios include generating and displaying (1528) a plurality of light points having varying intensities and sizes. Example intensities for light points range from low-luminance levels around 10 cd/m² to high levels of 1000 cd/m², while example sizes range from 0.1° to 2° in visual angle, depending on the aspect of vision being tested. These variations allow the system to assess sensitivity to both small, dim objects and larger, brighter ones across the visual field.

Referring back to FIG. 15A, the computer device 140 also, while simulating the one or more test scenarios, in real-time (1508) (e.g., using the tracking module 1144), using the camera, eye movements (e.g., the eye movements 1146) in response to one or more visual stimuli presented in the one or more test scenarios. Referring to FIG. 15D, in some embodiments, continuously tracking the eye movements includes continuously monitoring (1530) gaze direction and fixation points, while recording responses to each light point. In some embodiments, continuously tracking the eye movements includes mapping (1532) gaze direction and fixation points via high-precision eye-tracking sensors that capture accuracy and speed of visual detection. In some embodiments, the computer device 140 further continuously tracks (1534) a predetermined gesture or pressing a button when detecting a light point and recording reaction time and accuracy, in addition to tracking gaze direction and fixation points.

Referring back to FIG. 15A, the computer device 140 also analyzes (1512) (e.g., using the evaluation/measurement module 1150) detection and identification of light points for assessing visual detection across a visual field (e.g., the visual field test results 1162), based on the eye movements. Referring next to FIG. 15E, in some embodiments, assessing visual detection across the visual field includes analyzing (1536) accuracy and speed of visual detection across the visual field, in real time. In some embodiments, assessing visual detection across the visual field includes mapping (1538) the visual field, identifying any areas with reduced sensitivity or blind spots.

In some embodiments, assessing visual detection across the visual field includes mapping (1540) the visual field for glaucoma and retinal detachment. Specific conditions like glaucoma and retinal detachment may be mapped by analyzing patterns of visual field loss.

For example, glaucoma typically results in peripheral vision loss that gradually progresses towards the center, often identified as areas where light points are detected later or not at all. Retinal detachment may manifest as a sudden loss of vision in specific regions of the visual field, corresponding to the detached portion of the retina.

VR System for Testing Peripheral Vision Through a Progressively Narrowing Field of View According to some embodiments, the vision test system 1100 described above is configured to test peripheral vision through a progressively narrowing field of view. FIGS. 16A-16D show a flow diagram of an example process 1600 for testing peripheral vision through a progressively narrowing field of view, according to some embodiments.

The computer device 140 (e.g., the computing device described above in reference to FIGS. 11A-11C) generates (1602) (e.g., using the UI module 1134) a VR user interface corresponding to a three-dimensional virtual environment (e.g., the environment 1136).

The computer device 140 also renders (1604) (e.g., using the rendering module 1138) the VR user interface on the HMD 312A. Example details of the three-dimensional virtual environment and rendering the VR user interface are described above in reference to FIG. 12B, according to some embodiments.

The computer device 140 also simulates (1606) (e.g., using the simulation module 1140), in the VR user interface, one or more test scenarios (e.g., the scenarios 1142) with a progressively narrowing field of view in the VR user interface. Referring to FIG. 16B, in some embodiments, simulating the one or more test scenarios includes adjusting (1614) a visible area in real-time, thereby simulating a constricting visual field to challenge peripheral vision capabilities. In some embodiments, the one or more test scenarios include (1616) one or more scenarios where objects or light points appear at edges of a visual field and move towards a center as a visible area decreases.

In some embodiments, simulating the one or more test scenarios includes calibrating (1618) using a control group of users with predetermined peripheral vision profiles to establish baseline performance metrics and validating accuracy of visual field assessment, prior to assessing the visual detection across the visual field. In some embodiments, calibration includes adjusting display settings (e.g., to ensure the narrowing field of view is accurately simulated), eye-tracking sensors (e.g., to maintain precise tracking as the field of view changes), and/or baseline measurements from a control group. The calibration process may begin with initial tests where the user's responses to controlled one or more stimuli are recorded. The system may then adjust based on this data to ensure accurate simulation of peripheral vision challenges during the actual test.

In some embodiments, the one or more test scenarios include (1620) a field of view that narrows in a controlled manner, with a predetermined progression based on test objectives and a speed that challenges a user without causing excessive strain. Example for predetermined progression includes the field of view narrowing by a predetermined amount (e.g., 5 degrees) periodically (e.g., every second) until reaching a minimum size (e.g., 20 degrees), testing the user's peripheral awareness. Test objectives may include evaluating how quickly a user detects one or more stimuli as the field of view narrows, and determining the point at which peripheral vision fails. Progression speeds may range from 1 to 10 degrees per second. Progressing faster than 10 degrees per second may cause excessive strain, for example, particularly if maintained for extended periods, as it forces the eyes to continually readjust.

Figure 16C:
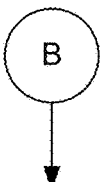

Referring back to FIG. 16A, the computer device 140 also, while simulating the one or more test scenarios, in real-time (1608), continuously tracks (1610) (e.g., using the tracking module 1144), using the camera, gaze direction and fixation points (e.g., the eye movements 1146). Referring next to FIG. 16C, in some embodiments, continuously tracking the gaze direction and fixation points includes tracking (1622) reaction time, accuracy, and a point at which one or more stimuli are no longer detected.

Figure 16D:
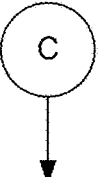
Figure 17A:
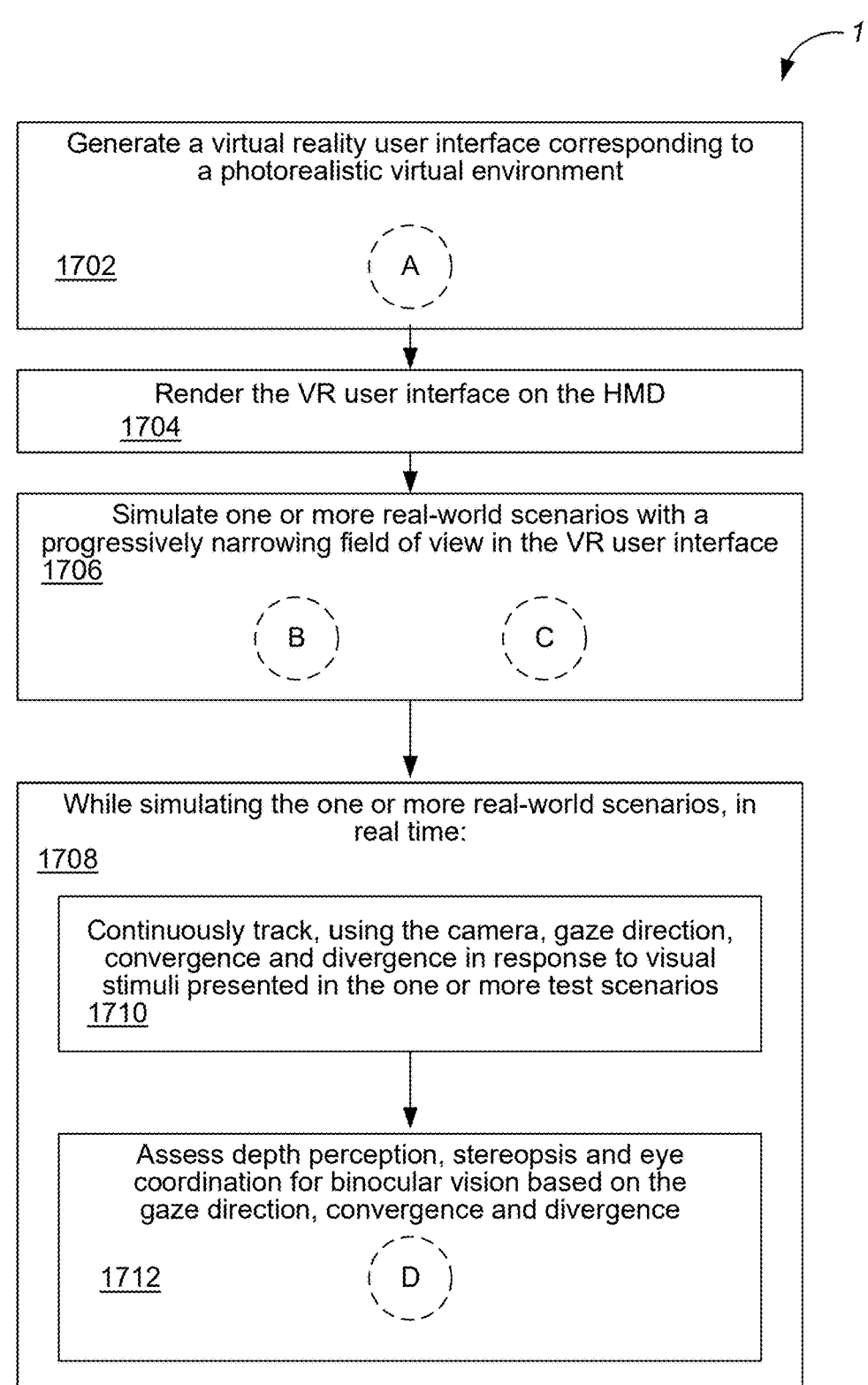

Referring back to FIG. 16A, the computer device 140 also assesses (1612) (e.g., using the evaluation/measurement module 1150) peripheral vision (e.g., the peripheral vision performance 1156) based on the gaze direction and fixation points. Referring next to FIG. 16D, in some embodiments, analyzing peripheral vision includes generating (1624) a detailed map of peripheral vision, identifying any areas with reduced sensitivity or blind spots.

VR Method for Testing Binocular Vision with 3D Objects in Naturalistic Environments According to some embodiments, the vision test system 1100 described above is configured for testing binocular vision. FIGS. 17A-17E show a flow diagram of an example process 1700 for binocular vision, according to some embodiments.

The computer device 140 (e.g., the computing device described above in reference to FIGS. 11A-11C) generates (1702) (e.g., using the UI module 1134) a VR user interface corresponding to a photorealistic virtual environment (e.g., the environment 1136). Referring to FIG. 17B, in some embodiments, the photorealistic virtual environment includes (1714) one or more scenes selected from the group consisting of: a virtual living room, park, and city street, which provide a realistic context for visual challenges.

Referring back to FIG. 17A, the computer device 140 also renders (1704) (e.g., using the rendering module 1138) the VR user interface on the HMD 312A. Example details of the photorealistic virtual environment and rendering the VR user interface are described above in reference to FIG. 12B, according to some embodiments.

The computer device 140 also simulates (1706) (e.g., using the simulation module 1140), in the VR user interface, one or more real-world scenarios (e.g., the scenarios 1142) with a progressively narrowing field of view, in the VR user interface. Referring to FIG. 17C, in some embodiments, the one or more real-world scenarios include (1716) a plurality of interactive tasks selected from the group consisting of: reaching for and manipulating virtual objects, judging distances between objects, and navigating through complex environments that require accurate depth perception.

Examples of complex environments include a virtual living room (e.g., users may be required to pick up objects at varying distances, such as a remote on a table versus a book on a shelf), a park (e.g., tasks may include navigating through trees or around benches, requiring accurate depth perception to avoid obstacles), or a city street (e.g., crossing roads or moving through crowds, where precise depth perception is essential to judge distances and avoid collisions).

In some embodiments, the one or more real-world scenarios include (1718) scenarios where users interact with virtual objects, judge spatial relationships, and navigate through virtual environments that require precise depth perception and eye coordination. In some embodiments, simulating the one or more real-world scenarios include calibrating (1720) using a control group of users with predetermined binocular vision profiles to establish baseline performance metrics and validating accuracy of visual field assessment, prior to assessing the depth perception, stereopsis and eye coordination. Examples of predetermined binocular vision profiles include normal binocular vision (a baseline profile for individuals without visual impairments), and convergence insufficiency (a profile characterized by difficulty maintaining binocular focus on close objects). Components being calibrated may include eye-tracking sensors (for accurate tracking of convergence and divergence), display settings (to ensure proper rendering of 3D objects), and/or one or more visual stimuli tailored to the user's binocular capabilities. Calibration may include comparing user responses to known profiles and adjusting the VR environment to ensure accurate assessments.

Referring next to FIG. 17D, in some embodiments, simulating the one or more real-world scenarios includes (1722) one or more tasks for testing depth perception, stereopsis, and eye coordination. In some embodiments, the one or more tasks for depth perception testing require (1724) distinguishing between objects at different distances, one or more tasks. In some embodiments, the one or more tasks for stereopsis testing require (1726) assessing a three-dimensional structure of objects. In some embodiments, the one or more tasks for eye coordination testing require (1728) tracking objects that move independently in the environment.

Referring back to FIG. 17A, the computer device 140 also, while simulating the one or more real-world scenarios, in real-time (1708), tracks (1710) (e.g., using the tracking module 1144), using the camera, gaze direction, convergence and divergence (e.g., the eye movements 1146) in response to one or more visual stimuli presented in the one or more test scenarios.

The computer device 140 also assesses (1712) (e.g., using the evaluation/measurement module 1150) depth perception, stereopsis and eye coordination for binocular vision (e.g., the binocular vision 1164) based on the gaze direction, convergence and divergence. Referring next to FIG. 17E, in some embodiments, assessing depth perception, stereopsis and eye coordination includes recording (1730) the gaze direction to ensure correct focus, and monitoring convergence and divergence to assess an ability of eyes to work together. In some embodiments, assessing depth perception, stereopsis and eye coordination includes computing (1732) one or more metrics including a distance at which the eyes converge or diverge, reaction times, and stability.

Some embodiments provide variable depth cues, including adjustments in lighting and texture gradients to enhance or diminish depth perception. Some embodiments provide interactive object manipulation, including simulating real-world physics for object interaction, adding complexity to depth perception tasks.

VR Platform for Simulating and Assessing Effects of Prescription Glasses on Diverse Visual Fields According to some embodiments, the vision test system 1100 described above is configured to implement a virtual eye test for testing effects of prescription glasses. FIGS. 18A-18D show a flow diagram of an example process 1800 for implementing a virtual eye test for testing effects of prescription glasses, according to some embodiments.

The computer device 140 (e.g., the computing device described above in reference to FIGS. 11A-11C) generates (1802) (e.g., using the UI module 1134) a VR user interface corresponding to a three-dimensional virtual environment (e.g., the environment 1136). In some embodiments, the three-dimensional virtual environment allows (1838) manipulation of light levels and visual challenges in real-time.

The computer device 140 also renders (1804) (e.g., using the rendering module 1138) the VR user interface on the HMD 312A. Example details of the three-dimensional virtual environment and rendering the VR user interface are described above in reference to FIG. 12B, according to some embodiments.

The computer device 140 also simulates (1806) (e.g., using the simulation module 1140), in the VR user interface, one or more test scenarios (e.g., the scenarios 1142) with visual corrections in the VR user interface. Referring next to FIG. 18B, in some embodiments, simulating the one or more test scenarios includes adjusting (1814) a visual field to replicate effects of different lens prescriptions. In some embodiments, simulating the one or more test scenarios includes generating and displaying (1816) simulations that recreate optical effects of different prescriptions, including changes in focal length, magnification, and distortion. In some embodiments, the one or more test scenarios includes (1818) one or more scenarios where users experience the impact of various prescription strengths and types, including single vision, bifocal and progressive fields, on their visual fields.

In some embodiments, the one or more test scenarios includes (1820) one or more scenarios to test adaptation to and functioning with different prescriptions, when engaging in reading, driving, or performing everyday activities in the virtual environment. In some embodiments, simulating the one or more test scenarios includes (1822) calibrating using a control group of users with predetermined prescription needs to establish baseline performance metrics and validating accuracy of the simulation, prior to evaluating the visual acuity, field of view, and comfort level.

Examples of predetermined prescription needs include myopia (nearsighted prescriptions requiring simulations that create blurriness at a distance), and presbyopia (age-related difficulty focusing on close objects, simulated with adjustments to focal lengths). Components calibrated may include lens distortion effects in the VR environment (to accurately replicate prescription-induced visual changes), display settings (to match the user's visual experience with the simulated prescription), and/or baseline visual performance. Calibration may include aligning the simulated prescription effects with the user's real-world vision to ensure accuracy. In some embodiments, the one or more test scenarios includes (1824) reading text at different distances for assessing clarity and comfort, navigating a virtual city for evaluating visual performance while moving through complex environments, or performing everyday tasks including cooking, driving, and office work to gauge real-world effectiveness of prescriptions.

Referring back to FIG. 18A, the computer device 140 also, while simulating the one or mor test scenarios, in real-time (1808), tracks (1810) (e.g., using the tracking module 1144), using the camera, gaze direction, focus adjustments and visual clarity (e.g., the eye movements 1146) to one or more visual stimuli presented in the one or more test scenarios.

The computer device 140 also evaluates (1812) (e.g., using the evaluation/measurement module 1150) visual acuity, field of view, and comfort level with each prescription (e.g., the effects of prescription glasses 1166) based on the gaze direction, focus adjustments and visual clarity. Referring next to FIG. 18C, in some embodiments, evaluating the visual acuity, field of view, and comfort level includes evaluating (1826) visual acuity by measuring clarity of vision at various distances. In some embodiments, evaluating the visual acuity, field of view, and comfort level includes assessing (1828) field of view by tracking the extent of the visual field with different lens prescriptions. In some embodiments, evaluating the visual acuity, field of view, and comfort level includes correlating (1830) user feedback on comfort with objective data on gaze stability and focus adjustments.

In some embodiments, evaluating the visual acuity, field of view, and comfort level includes detecting (1832) visual distortions through deviations in expected gaze patterns and increased correction attempts by the user. In some embodiments, evaluating the visual acuity, field of view, and comfort level includes detecting (1834) discomfort as indicated by frequent adjustments, prolonged fixation on certain areas, or user-reported discomfort. Frequent adjustments refer to the user's repeated need to shift their head or refocus their eyes to maintain clarity or comfort while using a simulated prescription. This behavior could indicate discomfort or difficulty adapting to the prescription, signaling that the visual correction may not be optimal for the user.

Figure 18D:
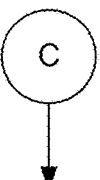

Referring next to FIG. 18D, in some embodiments, the computer device 140 also generates (1836) a report outlining visual performance with each prescription, highlighting any issues including visual distortions, discomfort, or suboptimal correction, and providing one or more recommendations for further optometric consultation if necessary.

Some embodiments include dynamic adjustment features, such as real-time modifications to visual effects based on tracking indicators of user discomfort. Some embodiments include customizable simulations, such as enabling optometrists to tailor the VR experience to specific prescription types or visual conditions, thereby offering a more personalized assessment.

Example Vision Test Process

Figure 19:
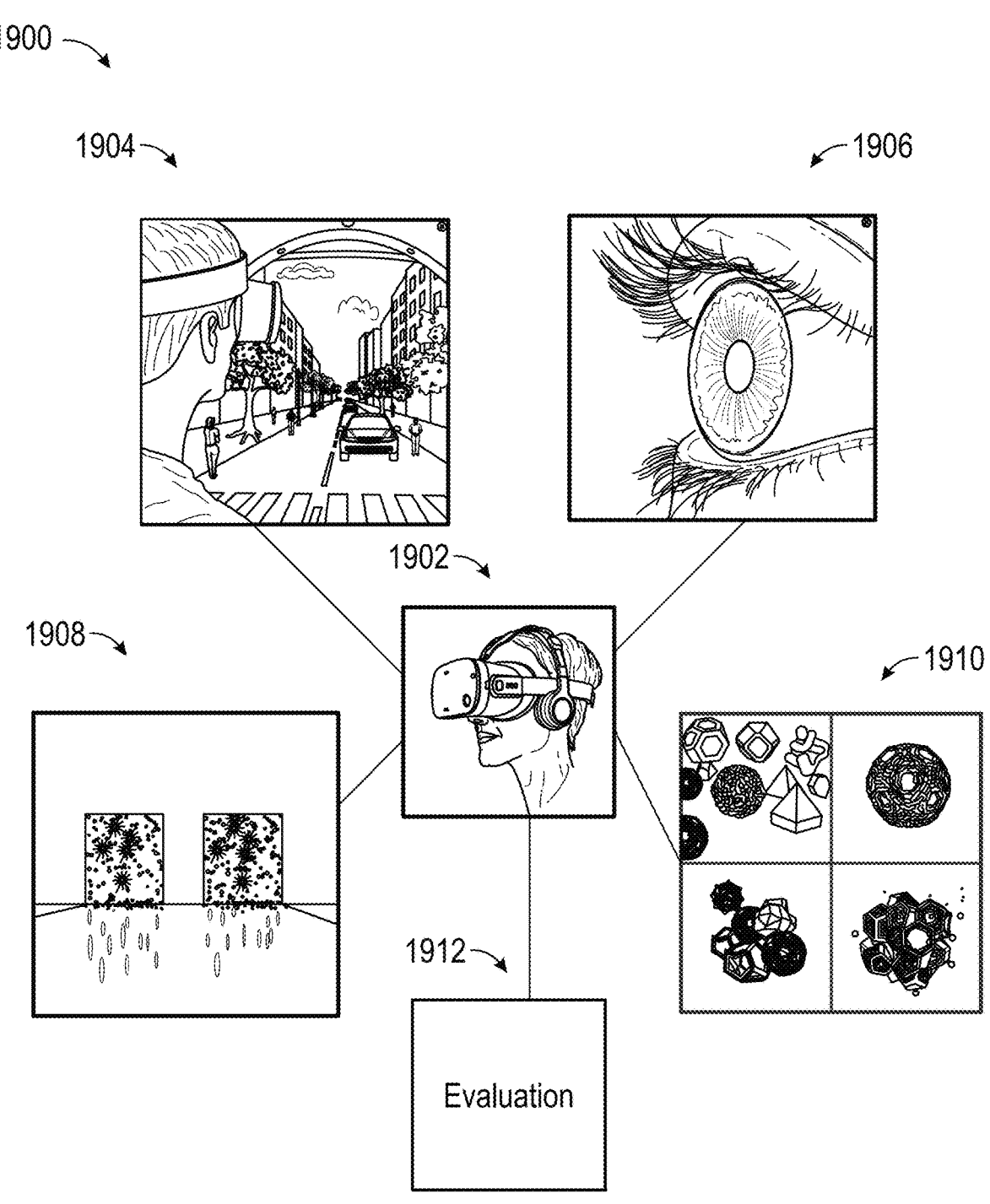
FIG. 19 is a schematic diagram showing an example vision test, in accordance with some embodiments.

FIG. 19 is a schematic diagram showing an example vision test 1900, in accordance with some embodiments. The illustration 1902 shows a person wearing a VR headset (HMD). The VR headset may include eye-tracking cameras. As shown in the illustration 1904, the user's view through the HMD may show a photorealistic virtual environment.

The environment may be a busy urban street scene with pedestrians, vehicles, and varying light conditions, an example of which is shown in the illustration 1910. The illustration 1906 shows a close-up of an eye that may be tracked by the eye-tracking cameras, which may track eye movements, such as saccades, fixations, and smooth pursuit. The illustration 1908 shows example scenarios that may be displayed in the HMD for evaluation response. Based on responses, the system may perform various evaluations (e.g., in step 1912).

Example VR Peripheral Vision Test with Spatial Tasks

Figure 20A:
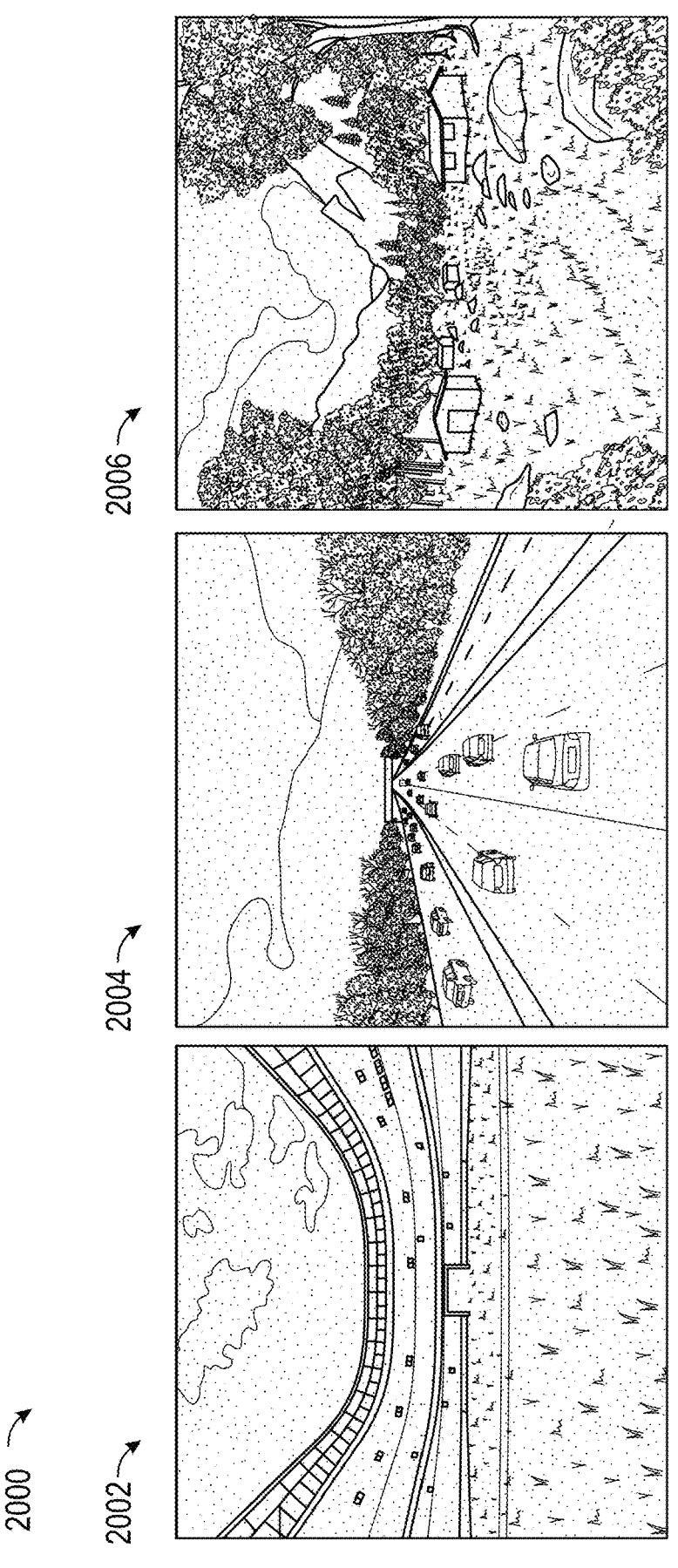
FIG. 20A shows illustrations of example visual scenarios for VR peripheral vision test with spatial tasks, according to some embodiments.

FIG. 20A shows illustrations of example visual scenarios 2000 for VR peripheral vision test with spatial tasks, according to some embodiments. Illustration 2002 shows objects appearing at the edges of a visual field. Illustration 2004 shows multiple moving targets across a wide area. Illustration 2006 shows a complex environment with obstacles requiring peripheral awareness. A person wearing a VR headset (HMD) with visible infrared eye-tracking cameras may view a 3D virtual environment with spatial task scenarios. Some embodiments track gaze direction and/or peripheral responses, based on which the system may obtain a readout of reaction times to peripheral one or more stimuli and/or visual field extent measurement.

FIG. 20B is a block diagram of example components 2008 for VR peripheral vision test with spatial tasks, according to some embodiments. Some embodiments may include a progression of tests 2010, which may include, for example, a simple peripheral object identification, tracking multiple moving targets, navigation task requiring peripheral vision, and/or advanced scenario with smaller, faster objects 2012. Some embodiments include a visual field map 2014, which may include, for example, a circular representation of the visual field, color-coded areas showing peripheral vision performance, and/or indicators for maximum detection angles 2016.

Some embodiments include an analysis interface 2018, which may include, for example, real-time evaluation of accuracy and reaction times, comparison to baseline metrics, and/or identification of potential visual field defects 2020. Some embodiments include a results summary, which may include, for example, an overall assessment of peripheral vision capabilities, highlighted areas of potential deficiencies, and/or suggestions for further evaluation if needed 2024.

Example VR Visual Field Loss Assessment with Interactive Maps

Figure 21A:
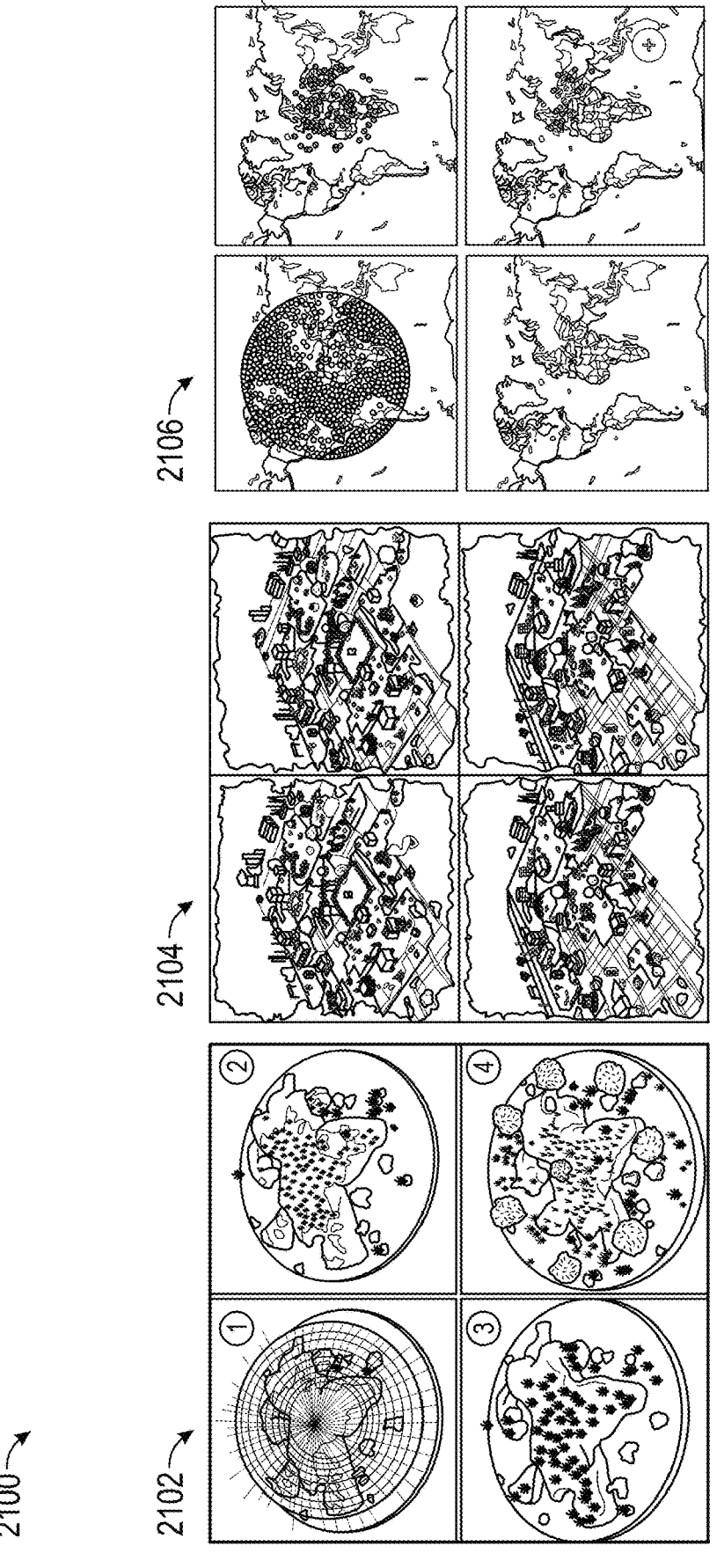
FIG. 21A shows illustrations of example visual scenarios for VR visual field loss assessment with interactive maps, according to some embodiments.

FIG. 21A shows illustrations of example visual scenarios 2100 for VR visual field loss assessment with interactive maps, according to some embodiments. Illustrations 2102, 2104, and 2106 show various interactive maps, which may include, for example, a 360-degree visual field representation, visual targets appearing randomly on a map, moving objects traversing different regions, and/or areas of a map changing in response to user interaction. A person wearing a VR headset (HMD) with high-precision infrared eye-tracking cameras may view and/or interact with the interactive maps. Some embodiments track gaze direction, fixation stability, and/or saccadic movements, based on which the system may obtain a readout of response times to one or more stimuli at different locations.

FIG. 21B is a block diagram of example components 2108 for VR visual field loss assessment with interactive maps, according to some embodiments. Some embodiments include a progression of test 2110, which may include, for example, an initial calibration to user's visual field, a presentation of one or more stimuli across the visual field, a real-time recording of user responses, and/or a generation of a visual field map 2112. Some embodiments include an interactive visual field map 2114, which may include, for example, a dynamic representation of the user's visual field, color-coded areas showing normal vision, reduced sensitivity, and potential blind spots, and/or real-time updates based on user responses 2116.

Some embodiments include an analysis interface 2118, which may include, for example, an evaluation of perception and response across the field of view, a comparison of user performance to baseline metrics, and/or an identification of delayed, inaccurate, or absent responses 2120. Some embodiments include a results report 2122, which may include, for example, a detailed visual field map, color-coded representation of visual field loss or impairment, and/or severity indicators for affected areas 2124.

Example VR Ocular Health Assessment with Multidimensional Shapes

FIGS. 22A and 22B show example visual scenarios for VR ocular health assessment, according to some embodiments. Illustration 2200 (FIG. 22A) and illustration 2202 (FIG. 22B) show multidimensional shapes. Various 3D shapes (e.g., polyhedra, tesseracts, custom objects) may be shown in a view visible to a person wearing a VR headset (HMD) with eye-tracking sensors. The shapes may be interactive shapes, which allow rotating, resizing, and/or aligning in space. Complex patterns may require shape manipulation and matching. Some embodiments track eye movements, such as gaze direction, fixation points, and saccadic movements. Some embodiments obtain a readout of response times and/or accuracy for shape interactions, and/or visual acuity and depth perception measurements.

FIG. 22C is a block diagram of example components 2204 for VR ocular health assessment, according to some embodiments. Some embodiments include different tasks 2206, which may include, for example, manipulating 3D shapes to fit predetermined patterns, matching shapes based on depth cues, and/or performing precision tasks requiring fine eye-hand coordination 2208. Some embodiments include an ocular health analysis 2210, which may include, for example, visual acuity assessment based on shape edge clarity, depth perception evaluation from shape dimension accuracy, eye coordination measurement from movement smoothness, and/or pattern matching and obstacle navigation performance 2212.

Some embodiments include a user interaction metrics 2214, which may include, for example, accuracy scores for shape manipulation tasks, response time graphs for various interactions, and/or consistency indicators for repeated tasks 2216. Some embodiments include a results summary 2218, which may include, for example, an overall assessment of ocular health parameters, an identification of potential issues (e.g., strabismus, amblyopia), and/or recommendations for further evaluation if needed 2220.

Example VR-Based Visual Field Testing Using a Grid of Light Points

Figure 23A:
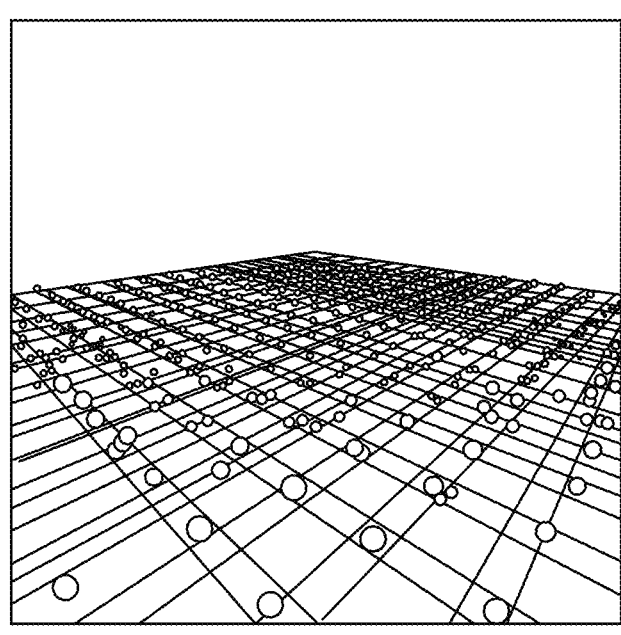
FIGS. 23A and 23B show example visual scenarios for VR-based visual field testing using a grid of light points, according to some embodiments.
Figure 23B:
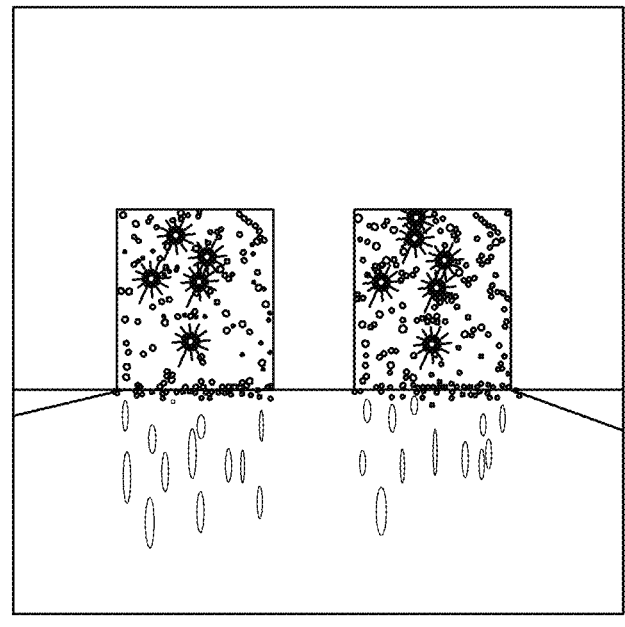

FIGS. 23A and 23B show example visual scenarios for VR-based visual field testing using a grid of light points, according to some embodiments. Illustration 2300 (FIG. 23A) and illustration 2302 (FIG. 23B) show different examples of grid of light points. Various embodiments show a dynamic grid of light points, light points of varying intensities and sizes, and/or different lighting conditions to test central and peripheral vision. Some embodiments track eye movements, which may include, for example, gaze direction and/or fixation points, based on which the system may obtain a readout of response times to light point one or more stimuli, and/or visual field map being generated in real-time.

FIG. 23C is a block diagram of example components 2304 for VR ocular health assessment, according to some embodiments. Some embodiments include a progression of test 2306, which may include, for example, calibration to a user's visual field, a presentation of light points in uniform grid, a presentation of light points in random grid, and/or user responding to light points.

Some embodiments include a visual field analysis 2310, which may include, for example, a real-time mapping of visual field, a color-coded representation of detection accuracy and speed, and/or indicators for potential areas of reduced sensitivity or blind spots 2312. Some embodiments include performance metrics 2314, which may include, for example, reaction time graph for light point detection, accuracy percentage across different areas of the visual field, and/or comparison to baseline metrics 2316. Some embodiments include results summary 2318, which may include, for example, an overall assessment of visual field performance, an identification of potential issues (e.g., glaucoma, retinal detachment), and/or recommendations for further evaluation if needed.

Example VR System for Testing Peripheral Vision Through a Progressively Narrowing Field of View FIGS. 24A and 24B show example visual scenarios for VR system for testing peripheral vision through a progressively narrowing field of view, according to some embodiments. Illustration 2400 (FIG. 24A) and illustration 2402 (FIG. 24B) show different examples of progressively narrowing field of views. Various embodiments show a 3D virtual environment with a progressively narrowing field of view, objects or light points appearing at the edges of a visual field, and/or a visible area decreasing in a controlled manner. Some embodiments track eye movements, which may include, for example, gaze direction and/or fixation points, based on which the system may obtain a readout of response times and/or accuracy for detecting peripheral one or more stimuli and/or visual field extent measurement in real-time.

FIG. 24C is a block diagram of example components 2404 for VR system for testing peripheral vision through a progressively narrowing field of view, according to some embodiments. Some embodiments include a progression of test 2406, which may include, for example, a full field of view, a slightly narrowed field of view, a significantly narrowed field of view, and/or a maximally narrowed field of view 2408. Some embodiments include a peripheral vision map 2410, which may include, for example, a circular representation of a visual field, color-coded areas showing peripheral vision performance, and/or indicators for areas of reduced sensitivity or blind spots 2412. Some embodiments include performance analysis 2414, which may include, for example, reaction time graph for peripheral one or more stimuli detection, accuracy percentage at different field of view sizes, and/or point at which one or more stimuli are no longer detected 2416. Some embodiments include results summary 2418, which may include, for example, an overall assessment of peripheral vision capabilities, a comparison to baseline metrics, and/or recommendations for further evaluation if needed 2420.

Figure 25A:
FIG. 25A shows an example visual scenario for VR system for testing binocular vision with 3D objects in naturalistic environments, according to some embodiments.

Example VR System for Testing Binocular Vision with 3D Objects in Naturalistic Environments FIG. 25A shows an example visual scenario 2500 for VR system for testing binocular vision with 3D objects in naturalistic environments, according to some embodiments. A person may wear a VR headset (HMD) with eye-tracking cameras capable of measuring convergence and divergence. The user's view through the HMD may show a photorealistic virtual environment, which may include, for example, a virtual living room scene, a park environment, or a city street setting. Some embodiments track gaze direction, convergence, and/or divergence, based on which the system may obtain a readout of depth perception measurements, and/or stereopsis assessment data.

FIG. 25B is a block diagram of example components 2502 for VR system for testing binocular vision with 3D objects in naturalistic environments, according to some embodiments. Some embodiments include different tasks 2504, which may include, for example, reaching for and manipulating virtual objects, judging distances between objects, navigating through a complex environment, and/or tracking independently moving objects 2506. Some embodiments include binocular vision analysis 2508, which may include, for example, a graph showing convergence and divergence patterns, measurements of distances at which eyes converge/diverge, and/or reaction time and stability metrics for eye movements 2510.

Some embodiments include depth perception and stereopsis 2512, which may include, for example, 3D structure recognition scores, accuracy in distance judgment tasks, and/or comparison to baseline metrics 2514. Some embodiments include a results summary 2516, which may include, for example, an overall assessment of binocular vision capabilities, an evaluation of depth perception, stereopsis, and eye coordination, and/or recommendations for further evaluation if needed 2518.

Figure 26A:
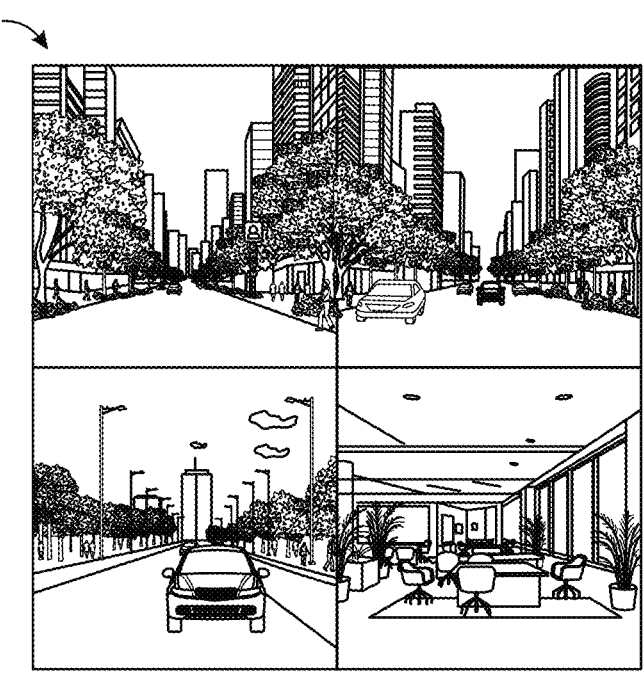
FIGS. 26A and 26B show example visual scenarios for VR system for simulating and assessing effects of prescription glasses on diverse visual fields, according to some embodiments.
Figure 26B:
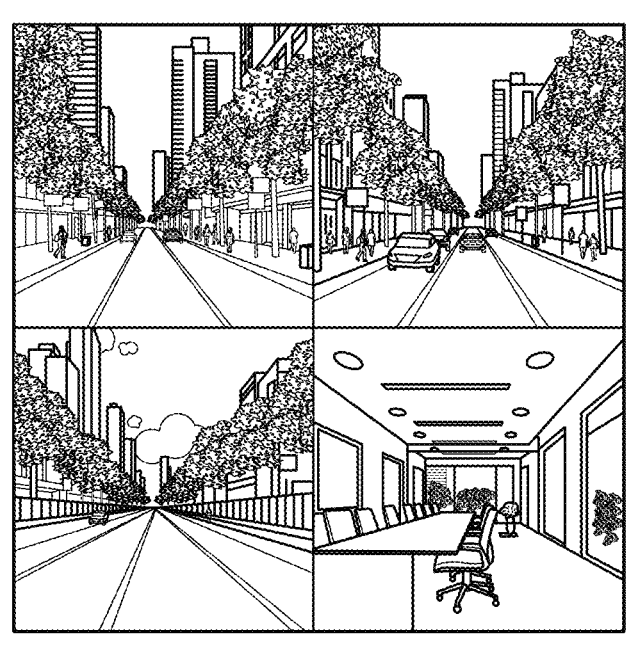

Example VR Platform for Simulating and Assessing Effects of Prescription Glasses on Diverse Visual Fields FIGS. 26A and 26B show example visual scenarios for VR system for simulating and assessing effects of prescription glasses on diverse visual fields, according to some embodiments. Illustration 2600 (FIG. 26A) and illustration 2602 (FIG. 26B) show different test scenarios. Various embodiments may show, for example, reading text at different distances, navigating a virtual city, simulated driving scenario, and/or an office work environment. Some embodiments track eye movements, which may include, for example, focus adjustments, based on which the system may obtain a readout of visual acuity measurements at various distances, and/or field of view assessment data.

FIG. 26C is a block diagram of example components 2604 for VR system for simulating and assessing effects of prescription glasses on diverse visual fields, according to some embodiments. Some embodiments include different prescription simulations 2606, which may include, for example, single vision lens effects, bifocal lens simulation, progressive lens adaptation, and/or various prescription strengths 2608. Some embodiments include visual performance analysis 2610, which may include, for example, visual acuity scores at different distances, field of view measurements with different prescriptions, comfort level indicators (e.g., gaze stability, adjustment frequency), and/or detection of visual distortions or discomfort 2612.

Some embodiments include adaptive prescription interface 2614, which may include, for example, real-time adjustment controls for prescription parameters, a comparison of performance across different prescriptions, and/or optimization suggestions based on user performance 2616. Some embodiments include results and/or recommendations 2618, which may include, for example, a summary of visual performance with each prescription, highlighted issues (e.g., distortions, discomfort, suboptimal correction), and/or recommendations for further optometric consultation 2620.

Illustration of Subject Technology as Clauses

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

Clause 1. A method of implementing a virtual vision test for peripheral vision, comprising: at an electronic device including a head-mounted display (HMD) and a camera: generating a virtual reality (VR) user interface corresponding to a three-dimensional virtual environment; rendering the VR user interface on the HMD; simulating one or more spatial task scenarios in the VR user interface; and while simulating the one or more spatial task scenarios, in real time: continuously tracking, using the camera, gaze direction and peripheral responses to one or more stimuli presented in the one or more spatial task scenarios; and evaluating the gaze direction and peripheral responses for peripheral vision performance.

Clause 2. The method of Clause 1, wherein the one or more spatial task scenarios require detection and reaction to the one or more stimuli appearing in a peripheral field of view.

Clause 3. The method of any of Clauses 1 or 2, wherein the one or more spatial task scenarios comprise one or more tasks selected from the group consisting of: identifying objects that appear at the edges of visual field, tracking multiple moving targets across a wide area, and navigating through complex environments that require peripheral awareness to avoid obstacles.

Clause 4. The method of any of Clauses 1-3, wherein the one or more spatial task scenarios comprise one or more tasks for assessing different aspects of peripheral vision, including field extent, reaction time to peripheral one or more stimuli, and the ability to process and respond to peripheral information while maintaining central focus.

Clause 5. The method of any of Clauses 1-4, wherein the one or more spatial task scenarios comprise a task for identifying peripheral objects for assessing field extent, a task for tracking multiple moving targets for assessing reaction time, and a task for navigation requiring peripheral vision to assess the ability to process and respond to peripheral information.

Clause 6. The method of any of Clauses 1-5, wherein simulating the one or more spatial task scenarios comprise changing scenarios every few seconds to a minute, wherein duration of each scenario is a few seconds to a minute, wherein at least 5-10 scenarios are simulated.

Clause 7. The method of any of Clauses 1-6, wherein simulating the one or more spatial task scenarios comprise one or more tasks that progressively challenge different aspects of peripheral vision with parameters comprising object size, speed, and trajectory.

Clause 8. The method of any of Clauses 1-7, wherein the tracking is performed using one or more infrared cameras capable of capturing detailed eye movements and peripheral responses with high accuracy and minimal latency.

Clause 9. The method of any of Clauses 1-8, wherein evaluating for peripheral vision performance comprises evaluating extent by measuring a maximum angle at which objects are detected while focusing on a central point.

Clause 10. The method of any of Clauses 1-9, wherein evaluating for peripheral vision performance comprises evaluating accuracy by assessing correctness and reaction time to one or more stimuli in the peripheral areas.

Clause 11. The method of any of Clauses 1-10, further comprising compiling results of the evaluation into a comprehensive report that highlights peripheral vision capabilities, identifying any deficiencies that could indicate conditions, including glaucoma, retinitis pigmentosa, or other visual field defects.

Clause 12. The method of any of Clauses 1-11, further comprising establishing baseline performance metrics by comparing user data with profiles of individuals with normal vision and those with known conditions affecting peripheral vision.

Clause 13. The method of any of Clauses 1-12, wherein the three-dimensional virtual environment comprises a photorealistic representation of real-world conditions, including varied lighting conditions and complex visual elements.

Clause 14. The method of any of Clauses 1-13, further comprising using foveated rendering to optimize rendering performance by providing the highest resolution and detail in the area where the user is directly focusing, while reducing resolution and detail in the peripheral regions.

Clause 15. The method of any of Clauses 1-14, wherein evaluating the gaze direction and peripheral responses includes analyzing saccades at rates of at least 100-500 Hz and fixations at rates of 50-100 Hz.

Clause 16. The method of any of Clauses 1-15, further comprising dynamically adjusting the difficulty of the spatial task scenarios based on real-time analysis of the user's performance using artificial intelligence algorithms.

Clause 17. The method of any of Clauses 1-16, wherein evaluating peripheral vision performance includes generating a 360-degree visual field map that color-codes areas showing peripheral vision performance and indicates maximum detection angles.

Clause 18. The method of any of Clauses 1-17, further comprising simulating various visual corrections within the virtual environment to assess the impact of different corrective measures on peripheral vision performance.

Clause 19. A method of implementing a virtual vision test for assessing visual field loss with interactive visual maps, comprising: at an electronic device including a head-mounted display and a camera: generating a virtual reality (VR) user interface corresponding to a three-dimensional virtual environment; rendering the VR user interface on the HMD; simulating one or more interactive visual map scenarios in the VR user interface; and while simulating the one or more interactive visual map scenarios, in real time: continuously tracking, using the camera, gaze direction and responses in response to one or more stimuli appearing at a plurality of locations within a visual field; and analyzing the gaze direction and responses to map out areas of visual field loss.

Clause 20. The method of Clause 19, wherein the one or more interactive visual map scenarios comprise tasks selected from the group consisting of: identifying visual targets appearing randomly on a map, following moving objects across different regions of a visual field, and responding to changes in a visual environment.

Clause 21. The method of any of Clauses 19 or 20, wherein the one or more interactive visual map scenarios comprise tasks that require detection and reaction to one or more stimuli at edges and within central and peripheral areas of vision.

Clause 22. The method of any of Clauses 19-21, wherein visual maps for the one or more interactive visual map scenarios comprise graphical representations of a visual field, illustrating areas of normal vision, reduced sensitivity, and blind spots.

Clause 23. The method of any of Clauses 19-22, wherein visual maps for the one or more interactive visual map scenarios comprise interactive visual maps that adapt to user responses, presenting a stimulus at various locations, to thereby map out areas of sensitivity and loss.

Clause 24. The method of any of Clauses 19-23, wherein simulating the one or more interactive visual map scenarios comprises displaying one or more visual stimuli in a predetermined manner, thereby ensuring coverage of an entire visual field.

Clause 25. The method of any of Clauses 19-24, wherein simulating the one or more interactive visual map scenarios comprises displaying one or more visual stimuli in a randomized way to prevent prediction.

Clause 26. The method of any of Clauses 19-25, wherein simulating the one or more interactive visual map scenarios comprises generating interactive visual maps, which comprises: calibrating to a user's visual field and eye-tracking data; presenting one or more visual stimuli in a predetermined manner across the visual field; recording user responses to the one or more visual stimuli, in real time; and processing the user responses to generate a visual field map.

Clause 27. The method of any of Clauses 19-26, wherein tracking the gaze direction and responses to one or more stimuli comprises tracking, using one or more eye-tracking sensors, gaze direction, fixation stability, saccadic movements, and pupil reactions.

Clause 28. The method of any of Clauses 19-27, wherein the tracking is performed using one or more infrared cameras capable of capturing detailed eye movements and peripheral responses with high accuracy and minimal latency.

Clause 29. The method of any of Clauses 19-28, wherein analyzing the gaze direction and responses comprises evaluating an ability to perceive and respond to one or more visual stimuli across a field of view.

Clause 30. The method of any of Clauses 19-29, wherein analyzing the gaze direction and responses comprises comparing user performance to baseline metrics, identifying delayed, inaccurate, or absent responses, to map out visual field loss.

Clause 31. The method of any of Clauses 19-30, further comprising generating a report that provides a detailed visual field map highlighting any areas of loss or impairment.

Clause 32. The method of any of Clauses 19-31, further comprising establishing baseline performance metrics by comparing user data with profiles of individuals with normal vision and user data with profiles of individuals with conditions affecting peripheral vision.

Clause 33. The method of any of Clauses 19-32, further comprising generating and providing a report comprising a visual representation of a visual field, highlighting the areas of visual field loss or impairment with color-coded sections indicating severity.

Clause 34. The method of any of Clauses 19-33, wherein simulating the one or more interactive visual map scenarios comprises generating a 360-degree visual field representation that adapts in real-time based on user responses to one or more visual stimuli presented at various locations within the visual field.

Clause 35. The method of any of Clauses 19-34, further comprising calibrating the virtual reality user interface to the user's specific visual field characteristics by adjusting eye-tracking sensors and display settings to ensure accurate positioning and sizing of one or more stimuli relative to the user's unique vision.

Clause 36. The method of any of Clauses 19-35, wherein analyzing the gaze direction and responses comprises creating a dynamic visual field map that is color-coded to indicate areas of normal vision, reduced sensitivity, and complete vision loss, with real-time updates based on the user's ongoing responses to one or more visual stimuli.

Clause 37. A method of implementing a virtual eye test for assessing ocular health by analyzing user interaction with multidimensional shapes, comprising: at an electronic device including a head-mounted display and a camera: generating a virtual reality (VR) user interface corresponding to a three-dimensional virtual environment; rendering the VR user interface on the HMD; simulating one or more test scenarios with multidimensional shapes in the VR user interface; and while simulating the one or more test scenarios, in real time: continuously tracking, using the camera, eye movements in response to one or more visual stimuli presented in the one or more test scenarios; and analyzing user interaction with the multidimensional shapes for assessing ocular health, based on the eye movements.

Clause 38. The method of Clause 37, wherein simulating the one or more test scenarios comprises generating a plurality of interactive 3D shapes within the virtual environment.

Clause 39. The method of any of Clauses 37 or 38, wherein generating the interactive 3D shapes comprises selecting one or more shapes from a group consisting of polyhedra, tesseracts, and custom objects.

Clause 40. The method of any of Clauses 37-39, generating the interactive 3D shapes comprises generating one or more interactive shapes programmed to rotate, resize and align in space.

Clause 41. The method of any of Clauses 37-40, wherein the plurality of interactive 3D shapes allows users to manipulate the shapes through gaze direction and hand movements.

Clause 42. The method of any of Clauses 37-41, wherein the plurality of interactive 3D shapes comprises symmetric shapes.

Clause 43. The method of any of Clauses 37-42, wherein simulating the one or more test scenarios comprises generating and displaying a plurality of interactive tasks, including manipulating 3D shapes to fit into predetermined patterns, matching shapes based on depth cues, and performing precision tasks that require fine eye-hand coordination.

Clause 44. The method of any of Clauses 37-43, wherein simulating the one or more test scenarios comprises allowing a user to rotate, resize and align shapes.

Clause 45. The method of any of Clauses 37-44, simulating the one or more test scenarios comprises providing depth cues via overlap and relative size for distance estimation.

Clause 46. The method of any of Clauses 37-45, wherein the one or more test scenarios comprise one or more precision tasks requiring fine alignment and exact matching of shapes.

Clause 47. The method of any of Clauses 37-46, wherein the one or more test scenarios comprise one or more tasks revealing strabismus, amblyopia, convergence insufficiency, and other similar issues, through user performance metrics.

Clause 48. The method of any of Clauses 37-47, wherein tracking eye movements comprises using one or more eye-tracking sensors to monitor gaze direction, fixation points, and saccadic movements.

Clause 49. The method of any of Clauses 37-48, wherein tracking eye movements comprises mapping gaze direction, fixation points and saccadic movements to visual acuity, depth perception, and eye coordination.

Clause 50. The method of any of Clauses 37-49, wherein analyzing user interaction with the multidimensional shapes comprises assessing visual acuity via clarity of shape edges at different sizes.

Clause 51. The method of any of Clauses 37-50, wherein analyzing user interaction with the multidimensional shapes comprises assessing depth perception via accurate perception of shape dimensions.

Clause 52. The method of any of Clauses 37-51, wherein analyzing user interaction with the multidimensional shapes comprises assessing eye coordination via smooth and coordinated eye movements.

Clause 53. The method of any of Clauses 37-52, wherein analyzing user interaction with the multidimensional shapes comprises assessing pattern matching and obstacle navigation, for ocular health tracking.

Clause 54. The method of any of Clauses 37-53, wherein analyzing the user interaction comprises assessing ocular health parameters including visual acuity, depth perception, and eye coordination.

Clause 55. The method of any of Clauses 37-54, wherein analyzing the user interaction comprises analyzing accuracy, response time, and consistency of the user interactions.

Clause 56. A method of implementing a virtual eye test for visual field testing, comprising: at an electronic device including a head-mounted display and a camera: generating a virtual reality (VR) user interface corresponding to a three-dimensional virtual environment; rendering the VR user interface on the HMD; simulating one or more test scenarios with a dynamic grid of light points in the VR user interface; and while simulating the one or more test scenarios, in real time: continuously tracking, using the camera, eye movements in response to one or more visual stimuli presented in the one or more test scenarios; and analyzing detection and identification of light points for assessing visual detection across a visual field, based on the eye movements.

Clause 57. The method of Clause 56, wherein the one or more visual stimuli comprises light points that appear randomly across a defined grid.

Clause 58. The method of any of Clauses 56 or 57, wherein the one or more test scenarios comprise scenarios where light points of different intensities and sizes appear at random locations within a grid.

Clause 59. The method of any of Clauses 56-58, wherein the one or more test scenarios comprise one or more scenarios to test different aspects of the visual field, including central and peripheral vision, under a plurality of lighting conditions.

Clause 60. The method of any of Clauses 56-59, wherein simulating the one or more test scenarios comprises calibrating using a control group of users with predetermined visual field profiles to establish baseline performance metrics and validating accuracy of visual field assessment, prior to assessing the visual detection across the visual field.

Clause 61. The method of any of Clauses 56-60, wherein the one or more test scenarios require identification of light points within milliseconds to a few seconds.

Clause 62. The method of any of Clauses 56-61, wherein simulating the one or more test scenarios comprises generating an interactive grid of light points by calibrating to a user's visual field, presenting a dynamic grid, and displaying one or more light points randomly in the dynamic grid.

Clause 63. The method of any of Clauses 56-62, wherein the dynamic grid comprises uniform and random grids.

Clause 64. The method of any of Clauses 56-63, wherein the one or more test scenarios comprise generating and displaying a plurality of light points having varying intensities and sizes.

Clause 65. The method of any of Clauses 56-64, wherein continuously tracking the eye movements comprises continuously monitoring gaze direction and fixation points, while recording responses to each light point.

Clause 66. The method of any of Clauses 56-65, wherein continuously tracking the eye movements comprises mapping gaze direction and fixation points via high-precision eye-tracking sensors that capture accuracy and speed of visual detection.

Clause 67. The method of any of Clauses 56-66, further comprising continuously tracking a predetermined gesture or pressing a button when detecting a light point and recording reaction time and accuracy, in addition to tracking gaze direction and fixation points.

Clause 68. The method of any of Clauses 56-67, wherein assessing visual detection across the visual field comprises analyzing accuracy and speed of visual detection across the visual field, in real time.

Clause 69. The method of any of Clauses 56-68, wherein assessing visual detection across the visual field comprises mapping out the visual field, identifying any areas with reduced sensitivity or blind spots.

Clause 70. The method of any of Clauses 56-69, wherein assessing visual detection across the visual field comprises mapping out the visual field for glaucoma and retinal detachment.

Clause 71. The method of any of Clauses 56-70, wherein the dynamic grid of light points covers a visual field range of up to 180 degrees horizontally and 135 degrees vertically, with light points appearing for durations between 200 milliseconds to 5 seconds.

Clause 72. The method of any of Clauses 56-71, wherein the light points have intensities ranging from 10 cd/m$^2$ to 1000 cd/m$^2$ and sizes ranging from 0.1° to 2° in visual angle, allowing assessment of sensitivity to both small, dim objects and larger, brighter ones across the visual field.

Clause 73. The method of any of Clauses 56-72, further comprising generating a color-coded visual field map in real-time, representing detection accuracy and speed across different areas of the visual field, and comparing the results to baseline metrics for immediate performance assessment.

Clause 74. A method of implementing a virtual eye test for peripheral vision testing, comprising: at an electronic device including a head-mounted display and a camera: generating a virtual reality (VR) user interface corresponding to a three-dimensional virtual environment; rendering the VR user interface on the HMD; simulating one or more test scenarios with a progressively narrowing field of view in the VR user interface; and while simulating the one or more test scenarios, in real time: continuously tracking, using the camera, gaze direction and fixation points in response to one or more visual stimuli presented in the one or more test scenarios; and assessing peripheral vision across a visual field, based on the gaze direction and fixation points.

Clause 75. The method of Clause 74, wherein simulating the one or more test scenarios comprises adjusting a visible area in real-time, thereby simulating a constricting visual field to challenge peripheral vision capabilities.

Clause 76. The method of any of Clauses 74 or 75, wherein the one or more test scenarios comprise one or more scenarios where objects or light points appear at edges of a visual field and move towards a center as a visible area decreases.

Clause 77. The method of any of Clauses 74-76, wherein simulating the one or more test scenarios comprises calibrating using a control group of users with predetermined peripheral vision profiles to establish baseline performance metrics and validating accuracy of visual field assessment, prior to assessing the visual detection across the visual field.

Clause 78. The method of any of Clauses 74-77, wherein the one or more test scenarios comprise a field of view that narrows in a controlled manner, with a predetermined progression based on test objectives and a speed that challenges a user without causing excessive strain.

Clause 79. The method of any of Clauses 74-78, wherein continuously tracking the gaze direction and fixation points comprises tracking reaction time, accuracy, and a point at which one or more stimuli are no longer detected.

Clause 80. The method of any of Clauses 74-79, wherein analyzing peripheral vision comprises generating a detailed map of peripheral vision, identifying any areas with reduced sensitivity or blind spots.

Clause 81. The method of any of Clauses 74-80, wherein the progressively narrowing field of view decreases by a predetermined amount every second until reaching a minimum size.

Clause 82. The method of any of Clauses 74-81, wherein the field of view narrows at a rate between 1 to 10 degrees per second.

Clause 83. The method of any of Clauses 74-82, further comprising calibrating display settings to ensure accurate simulation of the narrowing field of view.

Clause 84. The method of any of Clauses 74-83, further comprising calibrating eye-tracking sensors to maintain precise tracking as the field of view changes.

Clause 85. The method of any of Clauses 74-84, wherein assessing peripheral vision includes evaluating how quickly a user detects one or more stimuli as the field of view narrows.

Clause 86. The method of any of Clauses 74-85, wherein assessing peripheral vision includes determining the point at which peripheral vision fails.

Clause 87. The method of any of Clauses 74-86, further comprising generating a color-coded circular representation of the visual field showing peripheral vision performance.

Clause 88. The method of any of Clauses 74-87, further comprising generating a reaction time graph for peripheral one or more stimuli detection.

Clause 89. The method of any of Clauses 74-88, further comprising calculating an accuracy percentage at different field of view sizes.

Clause 90. The method of any of Clauses 74-89, further comprising comparing the user's peripheral vision performance to baseline metrics.

Clause 91. The method of any of Clauses 74-90, further comprising providing recommendations for further evaluation based on the peripheral vision assessment.

Clause 92. A method of implementing a virtual eye test for binocular vision, comprising: at an electronic device including a head-mounted display and a camera: generating a virtual reality (VR) user interface corresponding to a photorealistic virtual environment; rendering the VR user interface on the HMD; simulating one or more real-world scenarios in the VR user interface; and while simulating the one or more real-world scenarios, in real time: continuously tracking, using the camera, gaze direction, convergence and divergence in response to one or more visual stimuli presented in the one or more test scenarios; and assessing depth perception, stereopsis and eye coordination for binocular vision based on the gaze direction, convergence and divergence.

Clause 93. The method of Clause 92, wherein the photorealistic virtual environment comprises one or more scenes selected from the group consisting of: a virtual living room, park, and city street, which provide a realistic context for visual challenges.

Clause 94. The method of any of Clauses 92 or 93, wherein the one or more real-world scenarios comprise a plurality of interactive tasks selected from the group consisting of: reaching for and manipulating virtual objects, judging distances between objects, and navigating through complex environments that require accurate depth perception.

Clause 95. The method of any of Clauses 92-94, wherein the one or more real-world scenarios comprise scenarios where users interact with virtual objects, judge spatial relationships, and navigate through virtual environments that require precise depth perception and eye coordination.

Clause 96. The method of any of Clauses 92-95, simulating the one or more real-world scenarios comprise calibrating using a control group of users with predetermined binocular vision profiles to establish baseline performance metrics and validating accuracy of visual field assessment, prior to assessing the depth perception, stereopsis and eye coordination.

Clause 97. The method of any of Clauses 92-96, simulating the one or more real-world scenarios comprises one or more tasks for testing depth perception, stereopsis, and eye coordination.

Clause 98. The method of Clause 97, wherein the one or more tasks for depth perception testing require distinguishing between objects at different distances, one or more tasks.

Clause 99. The method of Clause 97, wherein the one or more tasks for stereopsis testing require assessing a three-dimensional structure of objects.

Clause 100. The method of Clause 97, wherein the one or more tasks for eye coordination testing require tracking objects that move independently in the environment.

Clause 101. The method of any of Clauses 92-100, wherein assessing depth perception, stereopsis and eye coordination comprises recording the gaze direction to ensure correct focus, and monitoring convergence and divergence to assess an ability of eyes to work together.

Clause 102. The method of any of Clauses 92-101, wherein assessing depth perception, stereopsis and eye coordination comprises computing one or more metrics including a distance at which the eyes converge or diverge, reaction times, and stability.

Clause 103. The method of any of Clauses 92-102, further comprising providing variable depth cues by adjusting lighting and texture gradients to enhance or diminish depth perception in the virtual environment.

Clause 104. The method of any of Clauses 92-103, wherein simulating the one or more real-world scenarios includes simulating real-world physics for object interaction to add complexity to depth perception tasks.

Clause 105. The method of any of Clauses 92-104, wherein assessing depth perception, stereopsis and eye coordination includes generating a graph showing convergence and divergence patterns in response to the one or more visual stimuli.

Clause 106. The method of any of Clauses 92-105, further comprising calculating 3D structure recognition scores based on the user's performance in stereopsis testing tasks.

Clause 107. The method of any of Clauses 92-106, wherein the predetermined binocular vision profiles include a normal binocular vision profile and a convergence insufficiency profile.

Clause 108. The method of any of Clauses 92-107, further comprising calibrating eye-tracking sensors to ensure accurate tracking of convergence and divergence movements specific to the user's binocular capabilities.

Clause 109. The method of any of Clauses 92-108, further comprising generating an overall assessment of binocular vision capabilities, including evaluations of depth perception, stereopsis, and eye coordination, and providing recommendations for further evaluation if needed.

Clause 110. A method of implementing a virtual eye test for testing effects of prescription glasses, comprising: at an electronic device including a head-mounted display and a camera: generating a virtual reality (VR) user interface corresponding to a three-dimensional virtual environment; rendering the VR user interface on the HMD; simulating one or more test scenarios with visual corrections in the VR user interface; and while simulating the one or more test scenarios, in real time: continuously tracking, using the camera, gaze direction, focus adjustments and visual clarity, in response to one or more visual stimuli presented in the one or more test scenarios; and evaluating visual acuity, field of view, and comfort level with each prescription, based on the gaze direction, focus adjustments and visual clarity.

Clause 111. The method of Clause 110, wherein simulating the one or more test scenarios comprises adjusting a visual field to replicate effects of different lens prescriptions.

Clause 112. The method of any of Clauses 110 or 111, wherein simulating the one or more test scenarios comprises generating and displaying simulations that recreate optical effects of different prescriptions, including changes in focal length, magnification, and distortion.

Clause 113. The method of any of Clauses 110-112, wherein the one or more test scenarios comprises one or more scenarios where users experience the impact of various prescription strengths and types, including single vision, bifocal and progressive fields, on their visual fields.

Clause 114. The method of any of Clauses 110-113, wherein the one or more test scenarios comprises one or more scenarios to test adaptation to and functioning with different prescriptions, when engaging in reading, driving, or performing everyday activities in the virtual environment.

Clause 115. The method of any of Clauses 110-114, wherein simulating the one or more test scenarios comprises calibrating using a control group of users with predetermined prescription needs to establish baseline performance metrics and validating accuracy of the simulation, prior to evaluating the visual acuity, field of view, and comfort level.

Clause 116. The method of any of Clauses 110-115, wherein the one or more test scenarios comprises reading text at different distances for assessing clarity and comfort, navigating a virtual city for evaluating visual performance while moving through complex environments, or performing everyday tasks including cooking, driving, and office work to gauge real-world effectiveness of prescriptions.

Clause 117. The method of any of Clauses 110-116, wherein evaluating the visual acuity, field of view, and comfort level comprises evaluating visual acuity by measuring clarity of vision at various distances.

Clause 118. The method of any of Clauses 110-117, wherein evaluating the visual acuity, field of view, and comfort level comprises assessing field of view by tracking the extent of the visual field with different lens prescriptions.

Clause 119. The method of any of Clauses 110-118, wherein evaluating the visual acuity, field of view, and comfort level comprises correlating user feedback on comfort with objective data on gaze stability and focus adjustments.

Clause 120. The method of any of Clauses 110-119, wherein evaluating the visual acuity, field of view, and comfort level comprises detecting visual distortions through deviations in expected gaze patterns and increased correction attempts by the user.

Clause 121. The method of any of Clauses 110-120, wherein evaluating the visual acuity, field of view, and comfort level comprises detecting discomfort as indicated by frequent adjustments, prolonged fixation on certain areas, or user-reported discomfort.

Clause 122. The method of any of Clauses 110-121, further comprising generating a report outlining visual performance with each prescription, highlighting any issues including visual distortions, discomfort, or suboptimal correction, and providing one or more recommendations for further optometric consultation if necessary.

Clause 123. The method of any of Clauses 110-122, further comprising dynamically adjusting visual effects in real-time based on tracking indicators of user discomfort during the test scenarios.

Clause 123. The method of any of Clauses 110-123, wherein simulating the one or more test scenarios includes enabling customization of the VR experience to specific prescription types or visual conditions, allowing for personalized assessment.

Clause 124. The method of any of Clauses 110-123, further comprising generating a visual performance analysis that includes visual acuity scores at different distances and field of view measurements with different prescriptions.

Clause 125. The method of any of Clauses 110-124, further comprising providing an adaptive prescription interface that allows real-time adjustment of prescription parameters and compares performance across different prescriptions.

Clause 126. The method of any of Clauses 110-125, wherein evaluating visual acuity, field of view, and comfort level includes generating optimization suggestions based on user performance with different simulated prescriptions.

Clause 127. A system for implementing a virtual vision test, comprising: a head-mounted display including a display, one or more lenses, and one or more cameras; one or more processors; and memory storing one or more programs configured to be executed by the one or more processors, the one or more programs including instructions for: a user interface module configured to generate a virtual reality (VR) user interface corresponding to a three-dimensional virtual environment; a rendering module configured to render the VR user interface on the HMD, integrating VR user interface elements with the three-dimensional virtual environment; a simulation module configured to simulate one or more spatial task scenarios in the VR user interface, including generating and managing environments that require spatial reasoning and navigation skills; a tracking module configured to: continuously track, using at least one of the one or more cameras, gaze direction and peripheral responses to one or more stimuli presented in the one or more spatial task scenarios at high frequencies, monitor gaze direction and responses to one or more stimuli appearing at multiple locations within the visual field, and track eye movements in response to one or more visual stimuli presented in various test scenarios, including scenarios with multidimensional shapes and dynamic grids of light points; and an evaluation module configured to: evaluate peripheral vision performance based on the gaze direction and peripheral responses, analyze gaze direction and responses to map out areas of visual field loss, analyze user interaction with multidimensional shapes for assessing ocular health, based on the eye movements, analyze detection and identification of light points for assessing visual detection across a visual field, based on the eye movements, and assess depth perception, stereopsis, and eye coordination for binocular vision based on the gaze direction, convergence and divergence.

Clause 128. A system for implementing a virtual vision test, comprising: a head-mounted display including a display, one or more lenses, and one or more cameras; one or more processors; and memory storing one or more programs configured to be executed by the one or more processors, the one or more programs including instructions for performing the method of any of Clauses 1-126.

In some embodiments, any of the above clauses herein may depend from any one of the independent clauses or any one of the dependent clauses. In one aspect, any of the clauses (e.g., dependent or independent clauses) may be combined with any other one or more clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

Further Considerations

As used herein, the word "module" refers to logic embodied in hardware or firmware, or to a collection of software instructions, possibly having entry and exit points, written in a programming language, such as, for example C++. A software module may be compiled and linked into an executable program, installed in a dynamic link library, or may be written in an interpretive language such as BASIC. It will be appreciated that software modules may be callable from other modules or from themselves, and/or may be invoked in response to detected events or interrupts. Software instructions may be embedded in firmware, such as an EPROM or EEPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

It is contemplated that the modules may be integrated into a fewer number of modules. One module may also be separated into multiple modules. The described modules may be implemented as hardware, software, firmware or any combination thereof. Additionally, the described modules may reside at different locations connected through a wired or wireless network, or the Internet.

In general, it will be appreciated that the processors can include, by way of example, computers, program logic, or other substrate configurations representing data and instructions, which operate as described herein. In other embodiments, the processors can include controller circuitry, processor circuitry, processors, general purpose single-chip or multi-chip microprocessors, digital signal processors, embedded microprocessors, microcontrollers and the like.

Furthermore, it will be appreciated that in one embodiment, the program logic may advantageously be implemented as one or more components. The components may advantageously be configured to execute on one or more processors. The components include, but are not limited to, software or hardware components, modules such as software modules, object-oriented software components, class components and task components, processes methods, functions, attributes, procedures, subroutines, segments of program code, drivers, firmware, microcode, circuitry, data, databases, data structures, tables, arrays, and variables.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

As used herein, the term "about" is relative to the actual value stated, as will be appreciated by those of skill in the art, and allows for approximations, inaccuracies and limits of measurement under the relevant circumstances. In one or more aspects, the terms "about," "substantially," and "approximately" may provide an industry-accepted tolerance for their corresponding terms and/or relativity between items.

As used herein, the term "comprising" indicates the presence of the specified integer(s), but allows for the possibility of other integers, unspecified. This term does not imply any particular proportion of the specified integers. Variations of the word "comprising," such as "comprise" and "comprises," have correspondingly similar meanings.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the detailed description contains many specifics, these should not be construed as limiting the scope of the subject technology but merely as illustrating different examples and aspects of the subject technology. It should be appreciated that the scope of the subject technology includes other embodiments not discussed in detail above. Various other modifications, changes and variations may be made in the arrangement, operation and details of the method and apparatus of the subject technology disclosed herein without departing from the scope. In addition, it is not necessary for a device or method to address every problem that is solvable (or possess every advantage that is achievable) by different embodiments of the disclosure in order to be encompassed within the scope of the disclosure. The use herein of "can" and derivatives thereof shall be understood in the sense of "possibly" or "optionally" as opposed to an affirmative capability.

What is claimed is:

1. A method of implementing a virtual eye test for visual field testing, comprising:

at an electronic device including a head-mounted display and a camera:

generating a virtual reality (VR) user interface corresponding to a three-dimensional virtual environment;

rendering the VR user interface on the HMD;

simulating one or more test scenarios with a dynamic grid of light points in the VR user interface; and while simulating the one or more test scenarios, in real time:

continuously tracking, using the camera, eye movements in response to one or more visual stimuli presented in the one or more test scenarios; and analyzing detection and identification of light points for assessing visual detection across a visual field, based on the eye movements;

wherein simulating the one or more test scenarios comprises calibrating using a control group of users with predetermined visual field profiles to establish baseline performance metrics and validating accuracy of visual field assessment, prior to assessing the visual detection across the visual field.

2. The method of claim 1, wherein the one or more visual stimuli comprises light points that appear randomly across a defined grid.

3. The method of claim 1, wherein the one or more test scenarios comprise scenarios where light points of different intensities and sizes appear at random locations within a grid.

4. The method of claim 1, wherein the one or more test scenarios comprise one or more scenarios to test different aspects of the visual field, including central and peripheral vision, under a plurality of lighting conditions.

5. The method of claim 1, wherein the one or more test scenarios require identification of light points within milliseconds to a few seconds.

6. The method of claim 1, wherein simulating the one or more test scenarios comprises generating an interactive grid of light points by calibrating to a user's visual field, presenting a dynamic grid, and displaying one or more light points randomly in the dynamic grid.

7. The method of claim 1, wherein the dynamic grid comprises uniform and random grids.

8. The method of claim 1, wherein the one or more test scenarios comprise generating and displaying a plurality of light points having varying intensities and sizes.

9. The method of claim 1, wherein continuously tracking the eye movements comprises continuously monitoring gaze direction and fixation points, while recording responses to each light point.

10. The method of claim 1, wherein continuously tracking the eye movements comprises mapping gaze direction and fixation points via high-precision eye-tracking sensors that capture accuracy and speed of visual detection.

11. The method of claim 1, further comprising continuously tracking a predetermined gesture or pressing a button when detecting a light point and recording reaction time and accuracy, in addition to tracking gaze direction and fixation points.

12. The method of claim 1, wherein assessing visual detection across the visual field comprises analyzing accuracy and speed of visual detection across the visual field, in real time.

13. The method of claim 1, wherein assessing visual detection across the visual field comprises mapping out the visual field, identifying any areas with reduced sensitivity or blind spots.

14. The method of claim 1, wherein assessing visual detection across the visual field comprises mapping out the visual field for glaucoma and retinal detachment.

15. The method of claim 1, wherein the dynamic grid of light points covers a visual field range of up to 180 degrees horizontally and 135 degrees vertically, with light points appearing for durations between 200 milliseconds to 5 seconds.

16. The method of claim 1, wherein the light points have intensities ranging from 10 cd/m$^2$ to 1000 cd/m$^2$ and sizes ranging from 0.1° to 2° in visual angle, allowing assessment of sensitivity to both small, dim objects and larger, brighter ones across the visual field.

17. The method of claim 1, further comprising generating a color-coded visual field map in real-time, representing detection accuracy and speed across different areas of the visual field, and comparing the results to baseline metrics for immediate performance assessment.

18. A method of implementing a virtual eye test for visual field testing, comprising:

at an electronic device including a head-mounted display and a camera:

generating a virtual reality (VR) user interface corresponding to a three-dimensional virtual environment;

rendering the VR user interface on the HMD;

simulating one or more test scenarios with a dynamic grid of light points in the VR user interface, the dynamic grid of light points covering a visual field range of up to 180 degrees horizontally and 135 degrees vertically, with light points appearing for durations between 200 milliseconds to 5 seconds; and while simulating the one or more test scenarios, in real time:

continuously tracking, using the camera, eye movements in response to one or more visual stimuli presented in the one or more test scenarios;

analyzing detection and identification of light points for assessing visual detection across a visual field, based on the eye movements.

19. The method of claim 18, wherein the light points have intensities ranging from 10 cd/m$^2$ to 1000 cd/m$^2$ and sizes ranging from 0.1° to 2° in visual angle, allowing assessment of sensitivity to both small, dim objects and larger, brighter ones across the visual field.

20. A method of implementing a virtual eye test for visual field testing, comprising:

at an electronic device including a head-mounted display and a camera:

generating a virtual reality (VR) user interface corresponding to a three-dimensional virtual environment;

rendering the VR user interface on the HMD;

simulating one or more test scenarios with a dynamic grid of light points in the VR user interface; and while simulating the one or more test scenarios, in real time:

continuously tracking, using the camera, eye movements in response to one or more visual stimuli presented in the one or more test scenarios;

analyzing detection and identification of light points for assessing visual detection across a visual field, based on the eye movements; and generating a color-coded visual field map in real-time, representing detection accuracy and speed across different areas of the visual field, and comparing the results to baseline metrics for immediate performance assessment.

* * * * *